(12) United States Patent
Winzer et al.

(10) Patent No.: US 11,901,947 B2
(45) Date of Patent: Feb. 13, 2024

(54) COMMUNICATION SYSTEM EMPLOYING OPTICAL FRAME TEMPLATES

(71) Applicant: Nubis Communications, Inc., Aberdeen, NJ (US)

(72) Inventors: Peter Johannes Winzer, Aberdeen, NJ (US); Krishan Kumar Sabnani, Westfield, NJ (US)

(73) Assignee: Nubis Communications, Inc., Aberdeen, NJ (US)

(*) Notice: Subject to any disclaimer, the term of this patent is extended or adjusted under 35 U.S.C. 154(b) by 0 days.

(21) Appl. No.: 17/720,111

(22) Filed: Apr. 13, 2022

(65) Prior Publication Data
US 2022/0337322 A1 Oct. 20, 2022

Related U.S. Application Data

(60) Provisional application No. 63/316,551, filed on Mar. 4, 2022, provisional application No. 63/272,025, filed on Oct. 26, 2021, provisional application No. 63/245,005, filed on Sep. 16, 2021, provisional application No. 63/245,011, filed on Sep. 16, 2021, provisional application No. 63/225,779, filed on Jul. 26, 2021, provisional application No. 63/223,685, filed on Jul. 20, 2021, provisional application No. 63/212,013, filed on Jun. 17, 2021, provisional application No. 63/210,437, filed on Jun. 14, 2021, provisional application No. 63/208,759, filed on Jun.
(Continued)

(51) Int. Cl.
H04B 10/516 (2013.01)
H04J 14/02 (2006.01)
H04B 10/50 (2013.01)

(52) U.S. Cl.
CPC ......... *H04B 10/516* (2013.01); *H04B 10/505* (2013.01); *H04J 14/0298* (2013.01)

(58) Field of Classification Search
None
See application file for complete search history.

(56) References Cited

U.S. PATENT DOCUMENTS 5,416,861 A 5/1995 Koh et al.
5,442,475 A 8/1995 Bausman et al.
(Continued)

FOREIGN PATENT DOCUMENTS

JP H9-222622 8/1997

OTHER PUBLICATIONS

Invitation to Pay Additional Fees in International Appln. No. PCT/US2022/71703, dated Jun. 16, 2022, 3 pages.
(Continued)

*Primary Examiner* — David W Lambert
(74) *Attorney, Agent, or Firm* — Fish & Richardson P.C.

(57) ABSTRACT

An apparatus includes baseband processing circuitry configured to generate a baseband signal that is transmitted to a first network element and a second network element, and an optical power supply configured to generate a first optical signal and a second optical signal, transmit the first optical signal to the first network element, and transmit the second optical signal to the second network element. The first optical signal and the second optical signal include information that enables synchronization of the first and second network elements.

21 Claims, 22 Drawing Sheets

Related U.S. Application Data 9, 2021, provisional application No. 63/192,852, filed on May 25, 2021, provisional application No. 63/178,501, filed on Apr. 22, 2021, provisional application No. 63/175,021, filed on Apr. 14, 2021.

(56) References Cited

U.S. PATENT DOCUMENTS

| | | | |
|---|---|---|---|
| 5,790,293 | A | 8/1998 | Frigo |
| 6,587,242 | B1 | 7/2003 | Shake et al. |
| 6,895,189 | B1 | 5/2005 | Bedrosian |
| 6,959,152 | B2 | 10/2005 | Fujiwara et al. |
| 7,106,970 | B2 | 9/2006 | Fujiwara et al. |
| 10,164,759 | B1* | 12/2018 | Volpe .................... H04J 3/0688 |
| 11,153,670 | B1 | 10/2021 | Winzer |
| 2003/0071122 | A1 | 4/2003 | Tsikos et al. |
| 2008/0107419 | A1 | 5/2008 | Won |
| 2009/0170543 | A1 | 7/2009 | Mostafa et al. |
| 2016/0226619 | A1* | 8/2016 | Hua ....................... H04B 10/27 |
| 2017/0111716 | A1* | 4/2017 | Wellbrock ............ H04J 14/029 |
| 2018/0091334 | A1* | 3/2018 | Lozhkin ........... H04B 10/25753 |
| 2018/0191431 | A1* | 7/2018 | Moision ................ H04L 1/1864 |
| 2020/0382214 | A1 | 12/2020 | Ori |
| 2021/0286140 | A1 | 9/2021 | Winzer |
| 2021/0294052 | A1 | 9/2021 | Winzer |
| 2021/0345025 | A1 | 11/2021 | Winzer |
| 2021/0376950 | A1 | 12/2021 | Winzer |

OTHER PUBLICATIONS

U.S. Appl. No. 17/592,232, Winzer, filed Feb. 3, 2022.

Agrawal et al., "A 8x5 GB/s Source-Synchronous Receiver with Clock Generator Phase Error Correction," 2008 IEEE Custom integrated Circuits Conference (CICC), Sep. 2008, pp. 459-462.

Bhatnagar et al., "Optical Interconnection and Clocking for Electronic Chips," Proceedings of the 8th World Multiconference on Systemics, Cybernetics and Informatics (SCI 2004), Jul. 18-21, 2004 Orlando, USA, pp. 1-5.

Delfyett et al., "Optical Clock Distribution Using a Mode-Locked Semiconductor Laser Diode System," IEEE/OSA J_Lightwave Technology, Dec. 1991, vol. 9, No. 12, pp. 1646-1649.

Goodman et al., "Optical Interconnections for VLSI Systems," Proc. IEEE, Jul. 1984, vol. 72, No. 7, pp. 850-866.

Liboiron-Ladouceur et al., "Bit-Parallel Message Exchange and Data Recovery in Optical Packet Switched Interconnection Networks," IEEE Photonics Technology Letters, Mar. 15, 2006, vol. 18, No. 6, pp. 779-781.

Lin, "Synchronization Requirements for 5G: An Overview of Standards or Specifications for Cellular Networks," IEEE Vehicular Technology Magazine, Jun. 29, 2018, 10 pages.

Mule et al., "Electrical and Optical Clock Distribution Networks for Gigascale Microprocessors," IEEE Transactions on Very Large Scale Integration (VLSI) Systems, Oct. 2002, vol. 10, No. 5, pp. 582-594.

Omri et al., "Synchronization Procedure in 5G NR Systems," IEEE Access, Mar. 28, 2019, 10 pages.

PCT International Search Report and Written Opinion in International Appln. No. PCT/US2021/27306, dated Aug. 16, 2021, 15 pages.

PCT Invitation to Pay Additional Fees in International Appln. PCT/US2021/27306, dated Jun. 17, 2021, 2 pages.

Raj et al., "50Gb/s Hybrid Integrated Si-Photonic Optical Link in 16nm FinFET," 2020 European Conference on Optical Communications (ECOC), Jan. 2020, 4 pages.

Raj et al., "Design of a 50-GB/s Hybrid Integrated Si-Photonic Optical Link in 16-nm FinFET," IEEE Journal of Solid-State Circuits, Apr. 2020, 55:1086-1095.

Sohanpal et al., "Clock and Data Recovery-Free Data Communications Enabled by Multi-Core Fiber With Low Thermal Sensitivity of Skew," IEEE/OSA J. Lightwave Technol., Apr. 1, 2020, vol. 38, No. 7, pp. 1636-1643.

Winzer et al., "107-GB/s Optical Signal Generation Using Electronic Time-Division Multiplexing," IEEE/OSA J. Lightwave Technology, Aug. 2006, vol. 24, No. 8, pp. 3107-3113.

International Preliminary Report on Patentability in International Appln. No. PCT/US2021/027306, dated Oct. 27, 2022, 12 pages.

Doran et al., "Nonlinear-optical loop mirror," Opt. Lett., Jan. 1988, 13(1):56-58.

International Search Report and Written Opinion in International Appln. No. PCT/US2022/071703, dated Aug. 15, 2022, 15 pages.

\* cited by examiner

103

200

300

103

103

103

610

610

880

880

880

880

1001

1000

COMMUNICATION SYSTEM EMPLOYING OPTICAL FRAME TEMPLATES

CROSS-REFERENCE TO RELATED APPLICATIONS

This application claims priority to U.S. provisional patent application 63/175,021, filed on Apr. 14, 2021, U.S. provisional patent application 63/208,759, filed on Jun. 9, 2021, U.S. provisional patent application 63/178,501, filed on Apr. 22, 2021, U.S. provisional patent application 63/192,852, filed on May 25, 2021, U.S. provisional patent application 63/210,437, filed on Jun. 14, 2021, U.S. provisional application 63/212,013, filed on Jun. 17, 2021, U.S. provisional patent application 63/223,685, filed on Jul. 20, 2021, U.S. provisional patent application 63/225,779, filed on Jul. 26, 2021, U.S. provisional patent application 63/245,005, filed on Sep. 16, 2021, U.S. provisional patent application 63/245,011, filed on Sep. 16, 2021, U.S. provisional patent application 63/272,025, filed on Oct. 26, 2021, and U.S. provisional patent application 63/316,551, filed on Mar. 4, 2022. The entire contents of the above applications are incorporated by reference.

BACKGROUND

Field

Various example embodiments relate to optical communication equipment and, more specifically but not exclusively, to optical power supplies.

Description of the Related Art

This section introduces aspects that can help facilitate a better understanding of the disclosure. Accordingly, the statements of this section are to be read in this light and are not to be understood as admissions about what is in the prior art or what is not in the prior art.

As the input/output (I/O) capacities of electronic processing chips increase, electrical signals may not provide sufficient I/O capacity across the limited size of a practically viable electronic chip package. A feasible alternative can be to interconnect electronic chip packages using optical signals, which can typically be delivered with a much higher I/O capacity per unit area compared to electrical I/Os.

As the capacity and complexity of multi-antenna wireless systems increase, optical interfaces to antenna sites and to remote radio heads are increasingly gaining importance.

SUMMARY OF THE INVENTION

Disclosed herein are various embodiments of an optical communication system comprising an optical communication device and an optical power supply configured to generate a sequence of optical frame templates directed to the optical communication device. The optical communication device can use the received optical frame templates as a light source for generating data-loaded optical frames and/or can extract from the optical frame templates control information encoded therein using one or more headers thereof.

According to an example embodiment disclosed above, provided is an apparatus comprising: a light source; and an electronic controller connected to cause the light source to produce a sequence of optical frame templates, each of the optical frame templates comprising a respective frame header, and a respective frame body; wherein each frame body comprises a respective optical pulse train; and wherein the light source and the electronic controller are configured to imprint control information onto light of at least some of the optical frame templates using time intervals corresponding to the respective frame headers of the sequence.

In some embodiments of the above apparatus, said at least some of the optical frame templates include are at least three optical frame templates.

In some embodiments of any of the above apparatus, said at least some of the optical frame templates are copies of one another.

In some embodiments of any of the above apparatus, none of the respective frame bodies of the sequence of optical frame templates carry payload data.

In some embodiments of any of the above apparatus, the sequence of optical frame templates has a first time duration; each of the respective frame headers has a second time duration; each of the respective frame bodies has a third time duration, a sum of the second and third time durations being smaller than the first time duration; and each of the respective optical pulse trains has a period of a fourth time duration that is smaller than a smaller one of the second and third time durations.

In some embodiments of any of the above apparatus, the fourth time duration is at most 100 ps.

In some embodiments of any of the above apparatus, the third time duration is at least 10 longer than the fourth time duration.

In some embodiments of any of the above apparatus, the third time duration is at least 100 longer than the fourth time duration.

In some embodiments of any of the above apparatus, the third time duration is at least 1000 longer than the fourth time duration.

In some embodiments of any of the above apparatus, the second time duration is at most 10% of the third time duration.

In some embodiments of any of the above apparatus, the second time duration is at most 1% of the third time duration.

In some embodiments of any of the above apparatus, the first time duration is at least 10 times longer than the third time duration.

In some embodiments of any of the above apparatus, the first time duration is an integer multiple of the sum of the second and third time durations.

In some embodiments of any of the above apparatus, the sum of the second and third time durations is an integer multiple of the fourth time duration.

In some embodiments of any of the above apparatus, the sequence of optical frame templates is periodic with a period equal to the sum of the second and third time durations.

In some embodiments of any of the above apparatus, the apparatus further comprises a reference clock, the reference clock comprising at least one of: a high-precision clock, a receiver capable of obtaining a reference clock from a Global Positioning System, and a device connectable to a stratum clock of a synchronous optical network.

In some embodiments of any of the above apparatus, the second and third time durations are derived from the reference clock.

In some embodiments of any of the above apparatus, the fourth time duration is derived from the reference clock.

In some embodiments of any of the above apparatus, the respective optical pulse trains of at least two optical frame templates of the sequence are frame-synchronized.

In some embodiments of any of the above apparatus, the respective optical pulse trains of at least two optical frame templates are synchronized with one another.

In some embodiments of any of the above apparatus, the respective optical pulse train of at least one optical frame template extends into the respective frame header thereof.

In some embodiments of any of the above apparatus, the light source and the electronic controller are configured to imprint the control information using digital changes of an optical-field parameter; and the optical-field parameter is selected from a parameter set consisting of: an intensity of light, a phase of light, a carrier frequency of light, and a polarization of light.

In some embodiments of any of the above apparatus, the control information comprises at least one of: a clock frequency, a clock phase, a synchronization time stamp, a frame delimiter, a frame counter, status information, a heartbeat signal, and a control command for a network element.

In some embodiments of any of the above apparatus, the light source comprises one or more of: a continuous-wave laser, an optical modulator, a directly modulated laser, an actively mode-locked laser, a passively mode-locked laser, and an optical switch.

In some embodiments of any of the above apparatus, the optical modulator comprises one or more of: an intensity modulator, a phase modulator, a polarization modulator, and a frequency shifter.

In some embodiments of any of the above apparatus, the apparatus further comprises an optical splitter configured to split the sequence of optical frame templates into two or more portions.

In some embodiments of any of the above apparatus, the light source comprises: a first optical pulse source configured to emit light at a first carrier frequency; a second optical pulse source configured to emit light at a second carrier frequency different from the first carrier frequency; and an optical switch configured to select either the light emitted by the first optical pulse source or the light emitted by the second optical pulse source.

In some embodiments of any of the above apparatus, a difference between the first carrier frequency and the second carrier frequency is greater than a pulse-repetition rate of the respective optical pulse train.

In some embodiments of any of the above apparatus, the apparatus further comprises an optical modulator configured to load different respective payload-data sequences into the respective frame bodies of different ones of the optical frame templates.

In some embodiments of any of the above apparatus, the optical modulator and the light source are optically connected by way of at least one optical fiber.

In some embodiments of any of the above apparatus, the at least one optical fiber has a length of at least one meter.

In some embodiments of any of the above apparatus, the apparatus includes: baseband processing circuitry configured to generate a baseband signal that is transmitted to a first remote radio head and a second remote radio head, wherein the first and second remote radio heads are configured to convert the baseband signal to radio frequency signals, and transmit the radio frequency signals to generate directional wireless beams.

In some embodiments of any of the above apparatus, the apparatus includes: an optical power supply that includes the light source and the electronic controller, in which the optical power supply is configured to transmit the sequence of optical frame templates or a first optical synchronization signal derived from the sequence of optical frame templates to the first remote radio head. The optical power supply is further configured to transmit the sequence of optical frame templates or a second optical synchronization signal derived from the sequence of optical frame templates to the second remote radio head.

In some embodiments of any of the above apparatus, the first and second remote radio heads are configured to operate in combination to generate directional wireless beams.

In some embodiments of any of the above apparatus, the sequence of optical frame templates provides phase synchronization information to the first and second remote radio heads.

In some embodiments of any of the above apparatus, the sequence of optical frame templates provides frequency synchronization information to the first and second remote radio heads.

In some embodiments of any of the above apparatus, the apparatus includes a first transponder configured to modulate the sequence of optical frame templates or a copy of the sequence of optical frame templates to generate a first modulated signal, and send the first modulated signal to the first remote radio head; and a second transponder configured to modulate the sequence of optical frame templates or a copy of the sequence of optical frame templates to generate a second modulated signal, and send the second modulated signal to the second remote radio head.

According to another example embodiment disclosed above, provided is an apparatus comprising: a first optical interface connectable to receive a sequence of optical frame templates, each of the optical frame templates comprising a respective frame header and a respective frame body, the frame body comprising a respective optical pulse train; an optical splitter connected to the first optical interface; an optical modulator connected to a first output of the optical splitter and configured to load data into the respective frame bodies to convert the sequence of optical frame templates into a corresponding sequence of loaded optical frames; and an optical receiver connected to a second output of the optical splitter and configured to extract control information from the respective frame headers.

In some embodiments of the above apparatus, the extracted information comprises at least one of: a clock frequency, a clock phase, a synchronization time stamp, a frame delimiter, a frame counter, status information, a heartbeat signal, and a control command for a network element.

In some embodiments of any of the above apparatus, the optical modulator is configured to modulate one or more of: an intensity of light, a phase of light, a carrier frequency of light, and a polarization of light.

In some embodiments of any of the above apparatus, the optical modulator is configured to modulate at a symbol rate equal to a pulse-repetition rate of the respective optical pulse train.

In some embodiments of any of the above apparatus, the optical modulator is configured to modulate individual pulses of the respective optical pulse train.

In some embodiments of any of the above apparatus, the optical receiver comprises one or more of: a p-i-n photodetector, an avalanche photodetector, a coherent receiver, electronic processing circuitry, and one or more optical elements configured to convert encoded optical signals into optical signals detectable using intensity detection.

In some embodiments of any of the above apparatus, the one or more optical elements comprise one or more of: a polarization filter, a polarization splitter, a delay interferometer, a wavelength filter, a wavelength demultiplexer, and a spatial-mode demultiplexer.

In some embodiments of any of the above apparatus, the apparatus further comprises a second optical interface connectable to receive another sequence of loaded optical frames; and a second optical receiver connected to the second optical interface and configured to extract information from said another sequence.

In some embodiments of any of the above apparatus, the extracted information comprises at least one of: a clock frequency, a clock phase, a synchronization time stamp, a frame delimiter, a frame counter, status information, a heartbeat signal, and a control command for a network element.

According to yet another example embodiment, provided is an apparatus comprising a control system configured to synchronize two or more network elements, the control system comprising: a first port configured to receive a first local time information from a first network element; a second port configured to receive a second local time information from a second network element; a processor configured to compute, from the first and second local time information, one or more global time values; and a third port configured to transmit the one or more global time values to the first network element or to a third network element different from the first and second network elements.

In some embodiments of the above apparatus, the first local time information and the second local time information each comprise two respective local time values, said local time values being associated with a same time stamp extracted by each of the first and second network elements from respective sequences of optical frame templates and loaded optical frames received thereat.

In some embodiments of any of the above apparatus, the first local time information and the second local time information each represent a function of two local time values, said local time values being associated with a same time stamp extracted by each of the first and second network elements from respective sequences of optical frame templates and loaded optical frames received thereat.

In some embodiments of any of the above apparatus, the control system is configured to compute a sum of the received first local time information and the received second local time information.

In some embodiments of any of the above apparatus, the control system is configured to compute a difference of the received first local time information and the received second local time information.

In some embodiments of any of the above apparatus, the processor is a distributed processor having parts thereof located at different computers.

In some embodiments of any of the above apparatus, the processor is physically integrated into one or more network elements.

In a general aspect, an apparatus includes baseband processing circuitry configured to generate a baseband signal that is transmitted to a first network element and a second network element. The apparatus includes an optical power supply configured to generate a first optical signal and a second optical signal, transmit the first optical signal to the first network element, and transmit the second optical signal to the second network element. The first optical signal and the second optical signal include information that enables synchronization of the first and second network elements.

Implementations can include one or more of the following features. The first optical signal can include optical pulses, and the second optical signal can include optical pulses.

The first network element can include a first remote radio head, the second network element can include a second remote radio head, and the first and second optical signals can include information that enables the first and second remote radio heads to synchronize respective local oscillators.

The first and second remote radio heads can be configured to: use the first and second optical signals to synchronize the respective local oscillators, convert the baseband signal to radio frequency signals using mixers that are associated with the respective local oscillators, and transmit the radio frequency signals to generate directional wireless beams.

The optical power supply can include: a light source; and an electronic controller configured to control the light source to produce a sequence of optical frame templates and imprint control information onto light of at least some of the optical frame templates.

Each of the optical frame templates can include a respective frame header, and a respective frame body. Each frame body can include a respective optical pulse train.

The frame bodies of the at least some of the optical frame templates can be copies of one another.

In some examples, none of the respective frame bodies of the sequence of optical frame templates carry payload data.

The sequence of optical frame templates can have a first time duration. Each of the respective frame headers can have a second time duration. Each of the respective frame bodies can have a third time duration, and a sum of the second and third time durations can be smaller than the first time duration. Each of the respective optical pulse trains can have a period of a fourth time duration that is smaller than a smaller one of the second and third time durations. The third time duration can be at least 10 longer than the fourth time duration. The second time duration can be at most 10% of the third time duration. The first time duration can be at least 10 times longer than the third time duration.

The respective optical pulse trains of at least two optical frame templates of the sequence can be frame-synchronized.

The respective optical pulse trains of at least two optical frame templates can be synchronized with one another.

The respective optical pulse train of at least one optical frame template can extend into the respective frame header thereof.

The light source and the electronic controller can be configured to imprint the control information using digital changes of an optical-field parameter. The optical-field parameter can be selected from a parameter set consisting of: an intensity of light, a phase of light, a carrier frequency of light, and a polarization of light.

The control information can include at least one of: a clock frequency, a clock phase, a synchronization time stamp, a frame delimiter, a frame counter, status information, a heartbeat signal, and a control command for a network element.

The light source can include: a first optical pulse source configured to emit light at a first optical carrier frequency; a second optical pulse source configured to emit light at a second optical carrier frequency different from the first optical carrier frequency; and an optical switch configured to select either the light emitted by the first optical pulse source or the light emitted by the second optical pulse source.

The apparatus can include an optical modulator configured to load different respective payload-data sequences into the respective frame bodies of different ones of the optical frame templates.

The first network element can include a first server computer in a first data center, and the second network element can include a second server computer in the first data center or a second data center.

In another general aspect, an apparatus includes: a first optical interface connectable to receive a sequence of optical frame templates, each of the optical frame templates including a respective frame header and a respective frame body, the frame body including a respective optical pulse train. The apparatus includes an optical splitter connected to the first optical interface; and an optical modulator connected to a first output of the optical splitter and configured to load data into the respective frame bodies to convert the sequence of optical frame templates into a corresponding sequence of loaded optical frames. The apparatus includes an optical receiver connected to a second output of the optical splitter and configured to extract control information from the respective frame headers.

Implementations can include one or more of the following features. The extracted information can include at least one of: a clock frequency, a clock phase, a synchronization time stamp, a frame delimiter, a frame counter, status information, a heartbeat signal, and a control command for a network element.

The optical modulator can be configured to modulate at a symbol rate equal to a pulse-repetition rate of the respective optical pulse train.

The apparatus can include a second optical interface connectable to receive another sequence of loaded optical frames; and a second optical receiver connected to the second optical interface and configured to extract information from said another sequence.

The extracted information can include at least one of: a clock frequency, a clock phase, a synchronization time stamp, a frame delimiter, a frame counter, status information, a heartbeat signal, and a control command for a network element.

In another general aspect, an apparatus includes a control system configured to synchronize two or more network elements, the control system including: a first port configured to receive a first local time information from a first network element; and a second port configured to receive a second local time information from a second network element. The control system includes a processor configured to compute, from the first and second local time information, one or more global time values. The control system includes a third port configured to transmit the one or more global time values to the first network element or to a third network element different from the first and second network elements.

Implementations can include one or more of the following features. The first local time information and the second local time information can each include two respective local time values, the local time values can be associated with a same time stamp extracted by each of the first and second network elements from respective sequences of optical frame templates and loaded optical frames received thereat.

The control system can be configured to compute a sum of the received first local time information and the received second local time information.

The control system can be configured to compute a difference of the received first local time information and the received second local time information.

The sequence of optical frame templates can provide phase synchronization information to the first and second remote radio heads.

The sequence of optical frame templates can provide frequency synchronization information to the first and second remote radio heads.

The apparatus can include a first transponder configured to modulate the sequence of optical frame templates or a copy of the sequence of optical frame templates to generate a first modulated signal, and send the first modulated signal to the first remote radio head. The apparatus can include a second transponder configured to modulate the sequence of optical frame templates or a copy of the sequence of optical frame templates to generate a second modulated signal, and send the second modulated signal to the second remote radio head.

In another general aspect, a system includes: an optical power supply module configured to generate a first optical signal, a second optical signal, a third optical signal, and a fourth optical signal. The optical power supply module is configured to transmit the first optical signal to a first network element, and transmit the second optical signal to a second network element. The system includes a first transponder configured to modulate the third optical signal to generate a first modulated signal, and transmit the first modulated signal to the first network element. The system includes a second transponder configured to modulate the fourth optical signal, and transmit the second modulated signal to the second network element. The first and second optical signals include information that enables synchronization of the first and second network elements.

Implementations can include one or more of the following features. The first network element can include a first remote radio head, the second network element can include a second remote radio head, and the first and second optical signals can include information that enables the first and second network elements to synchronize respective local oscillators and operate in combination to generate directional wireless beams.

The system can include the first and second remote radio heads.

The first optical signal can include a first sequence of optical pulses.

The second optical signal can include a second sequence of optical pulses.

The third optical signal can include a third sequence of optical pulses.

The fourth optical signal can include a fourth sequence of optical pulses.

The system can include: a baseband processing unit configured to generate baseband signals that are transmitted to the first and second remote radio heads. The baseband processing unit can include an electronic controller configured to control the optical power supply module to produce the sequence of optical pulses.

The optical power supply can be part of the baseband processing unit.

The optical power supply module can be configured to transmit optical signals to the first remote radio head through a first optical fiber, the first transponder can be configured to transmit optical signals to the first remote radio head through a second optical fiber, and the first remote radio head can be configured to transmit optical signals to the first transponder through a third optical fiber.

The optical power supply module can be configured to transmit optical signals to the first remote radio head through a first optical fiber, the first transponder can be configured to transmit optical signals to the first remote radio head through a second optical fiber, and the first remote radio head can be configured to transmit optical signals to the first transponder through the second optical fiber.

The optical power supply module can be configured to transmit optical signals to the first remote radio head through a first optical fiber, the first transponder can be configured to transmit optical signals to the first remote radio head through the first optical fiber, and the first remote radio head can be configured to transmit optical signals to the first transponder through a second optical fiber.

The optical power supply module can be configured to transmit optical signals to the first remote radio head through a first optical fiber, the first transponder can be configured to transmit optical signals to the first remote radio head through a second optical fiber, and the first remote radio head can be configured to transmit optical signals to the first transponder through the first optical fiber.

The optical power supply module can be configured to transmit optical signals to the first remote radio head through a first optical fiber, the first transponder can be configured to transmit optical signals to the first remote radio head through the first optical fiber, and the first remote radio head can be configured to transmit optical signals to the first transponder through the first optical fiber.

The optical power supply module can be configured to transmit optical signals with a first wavelength to the first remote radio head, and the first transponder can be configured to transmit optical signals with a second wavelength to the first remote radio head, and the first wavelength is different from the second wavelength.

The optical power supply module can include: a light source; and an electronic controller connected to cause the light source to produce the sequences of optical pulses.

The optical power supply module can include: a light source; and an electronic controller connected to cause the light source to produce a sequence of optical frame templates, each of the optical frame templates can include a respective frame header, and a respective frame body. Each frame body can include a sequence of optical pulses. The light source and the electronic controller can be configured to imprint control information onto light of at least some of the optical frame templates using time intervals corresponding to the respective frame headers of the sequence.

The optical power supply can include an optical splitter to split an initial sequence of optical pulses into at least two of the first, second, third, and fourth sequences of optical pulses.

The optical power supply can include a first light source, a second light source, and an optical switch. The first light source can be configured to generate light having a first wavelength, and the second light source can be configured to generate light having a second wavelength. The optical switch can have a first input optically coupled to the first light source and a second input optically coupled to the second light source, and the optical switch can be configured to switch one of the inputs to one of its outputs that are optically coupled to the first network element and the first transponder.

The first network element can include a first server computer in a first data center, and the second network element can include a second server computer in the first data center or a second data center.

In another general aspect, a system includes: an optical power supply module configured to generate a first optical signal and a second optical signal; a first remote radio head that is configured to receive the first optical signal; and a second remote radio head that is configured to receive the second optical signal. The first and second remote radio heads use the first and second optical signals to synchronize local oscillators and operate in combination to generate directional wireless beams.

Implementations can include one or more of the following features. The first optical signal can include a first sequence of optical pulses.

The second optical signal can include a second sequence of optical pulses.

The optical power supply can include an optical splitter to split an initial optical signal to generate the first and second optical signals.

The system can include baseband processing circuitry configured to generate a baseband signal that is transmitted to the first remote radio head and the second remote radio head. The first and second remote radio heads can be configured to convert the baseband signal to radio frequency signals, and transmit the radio frequency signals to generate the directional wireless beams.

In another general aspect, a system includes: a first remote radio head configured to receive a first optical signal from an optical power supply. The first remote radio head includes an optical receiver configured to extract synchronization information contained in the first optical signal. The first remote ratio head is configured to use the synchronization information to synchronize a first local oscillator and operate in combination with a second remote radio head to generate directional wireless beams.

Implementations can include one or more of the following features. The first remote radio head can be configured to convert a baseband signal to a first radio frequency signal. The first remote radio head can include an antenna configured to transmit the first radio frequency signal.

In another general aspect, a method includes: providing a first optical signal from an optical power supply to a first remote radio head; and providing a first optical signal from the optical power supply to a second remote radio head. The method includes at the first remote radio head, using the first optical signal to synchronize a first local oscillator. The method includes at the second remote radio head, using the second optical signal to synchronize a second local oscillator. The method includes operating the first and second remote radio heads in combination to generate directional wireless beams.

Implementations can include one or more of the following features. The method can include: at the first remote radio head, converting a baseband signal to a first radio frequency signal, and transmitting the first radio frequency signal. The method includes, at the second remote radio head, converting the baseband signal to a second radio frequency signal, and transmitting the second radio frequency signal. The baseband signal can include information intended to be transmitted to a user device, and the first and second radio frequency signals can be configured to constructively combine at the user device.

In another general aspect, a system includes an optical power supply module configured to generate a sequence of optical pulses, in which the optical power supply module is configured to transmit the sequence of optical pulses or a first optical synchronization signal derived from the sequence of optical pulses to a first remote radio head. The optical power supply module is configured to transmit the sequence of optical pulses or a second optical synchronization signal derived from the sequence of optical pulses to a second remote radio head. The system includes a first transponder configured to modulate the sequence of optical pulses or a copy of the sequence of optical pulses to generate a first modulated signal, and transmit the first modulated signal to the first remote radio head. The system includes a second transponder configured to modulate the sequence of optical pulses or a copy of the sequence of optical pulses to generate a second modulated signal, and transmit the second modulated signal to the second remote radio head. The first and second remote radio heads are configured to use the sequence of optical pulses, the first optical synchronization signal, and/or the second optical synchronization signal to synchronize local oscillators and operate in combination to generate directional wireless beams.

Implementations can include one or more of the following features. The system can include the first and second remote radio heads.

The system can include: a baseband processing unit configured to generate baseband signals that are transmitted to the first and second remote radio heads. The baseband processing unit can include an electronic controller configured to control the optical power supply module to produce the sequence of optical pulses.

The optical power supply module can be configured to transmit optical signals to the first remote radio head through a first optical fiber, the first transponder can be configured to transmit optical signals to the first remote radio head through a second optical fiber, and the first remote radio head can be configured to transmit optical signals to the first transponder through a third optical fiber.

The optical power supply module can be configured to transmit optical signals to the first remote radio head through a first optical fiber, the first transponder can be configured to transmit optical signals to the first remote radio head through a second optical fiber, and the first remote radio head can be configured to transmit optical signals to the first transponder through the second optical fiber.

The optical power supply module can be configured to transmit optical signals to the first remote radio head through a first optical fiber, the first transponder can be configured to transmit optical signals to the first remote radio head through the first optical fiber, and the first remote radio head can be configured to transmit optical signals to the first transponder through a second optical fiber.

The optical power supply module can be configured to transmit optical signals to the first remote radio head through a first optical fiber, the first transponder can be configured to transmit optical signals to the first remote radio head through a second optical fiber, and the first remote radio head can be configured to transmit optical signals to the first transponder through the first optical fiber.

The optical power supply module can be configured to transmit optical signals to the first remote radio head through a first optical fiber, the first transponder can be configured to transmit optical signals to the first remote radio head through the first optical fiber, and the first remote radio head can be configured to transmit optical signals to the first transponder through the first optical fiber.

The optical power supply module can be configured to transmit optical signals with a first wavelength to the first remote radio head, the first transponder can be configured to transmit optical signals with a second wavelength to the first remote radio head, and the first wavelength is different from the second wavelength.

The optical power supply module can include: a light source; and an electronic controller connected to cause the light source to produce the sequence of optical pulses.

The optical power supply module can include: a light source, and an electronic controller connected to cause the light source to produce a sequence of optical frame templates, each of the optical frame templates including a respective frame header, and a respective frame body. Each frame body can include a sequence of optical pulses. The light source and the electronic controller can be configured to imprint control information onto light of at least some of the optical frame templates using time intervals corresponding to the respective frame headers of the sequence.

In another general aspect, a method includes:
at a first device, receiving time stamp signals from at least three network elements, in which the network elements are coordinated based on optical signals received from an optical power supply; and
determining a position of the first device based on the time stamp signals.

Implementations can include one or more of the following features. A first network element can receive a first optical signal from the optical power supply, a second network element can receive a second optical signal from the optical power supply, the first network element can use the first optical signal to synchronize a first local clock, the second network element can use the second optical signal to synchronize a second local clock, the first network element can generate the first time stamp signal using the first local clock, and the second network element can generate the second time stamp signal using the second local clock.

The first optical signal can include a first sequence of optical pulses, and the second optical signal can include a second sequence of optical pulses.

The first device can determine the position of the first device based on the time stamp signals.

The first device can send first information about the timing at which the time stamp signals are received at the first device and second information included in the time stamp signals to a control device, and the control device can determine the position of the first device based on the first information and the second information.

The method can include:
determining a reference time based on an optical signal from the optical power supply;
determining a relative time delay between the reference time and each of the time stamp signals;
wherein determining the position of the first device comprises determining the position of the first device based on the time stamp signals and information about the relative time delays between the reference time and the time stamp signals.

The first device can determine the position of the first device based on the time stamp signals and information about the relative time delays between the reference time and the time stamp signals.

The first device can send first information about the timing at which the time stamp signals are received at the first device and second information included in the time stamp signals to a control device, and the control device can determine the position of the first device based on the first information, the second information, and the information about the relative time delays between the reference time and the time stamp signals.

The network elements can include remote radio heads that use the optical signals received from the optical power supply to synchronize local clocks.

The remote radio heads can be configured to convert baseband signals to radio frequency signals using mixers that are associated with the respective local clocks, and the radio frequency signals include the time stamp signals.

The first device can include at least one of a cellular phone, a laptop computer, a tablet computer, a camera, a smart watch, a smart headset, a smart goggle, smart eyeglasses, a radio, a positioning device, a map service device, a robot, a vehicle configured to move on land, a robot, a vehicle configured to move in air, a vehicle configured to move in or on water, a navigation device, or a driving direction guidance device.

Each of at least some of the time stamp signals can include a time stamp and a network element identifier.

The method can include:
determining distances between the first device and each of the network elements based on the time stamp signals transmitted from the respective network elements; and
determining the position of the first device based on the distances between the first device and each of the network elements.

Determining distances between the first device and each of the network elements can includes:
determining a first distance between the first device and a first network element based on a first time stamp signal transmitted from the first network element;
determining a second distance between the first device and a second network element based on a second time stamp signal transmitted from the second network element; and
determining a third distance between the first device and a third network element based on a third time stamp signal transmitted from the third network element;
wherein determining the position of the first device comprises determining the position of the first device based on the first distance, the second distance, and the third distance.

The method can include:
determining time delays for the time stamp signals to travel from respective network elements to the first device based on the respective time stamp signals;
determining distances between the first device and each of the network elements based on the time delays for the time stamp signals to travel from respective network elements to the first device; and
determining the position of the first device based on the distances between the first device and each of the network elements.

The method can include:
determining relative time delays between receiving time stamps from pairs of network elements; and
determining the position of the first device based on the relative time delays between receiving time stamps from the pairs of network elements.

Determining relative time delays between receiving time stamps from pairs of network elements can include:
determining a first relative time delay between receiving a first time stamp from a first network element and receiving a second time stamp from a second network element; and
determining a second relative time delay between receiving the first time stamp from the first network element and receiving a third time stamp from a third network element;
wherein determining the position of the first device comprises determining the position of the first device based on the first relative time delay and the second relative time delay.

The method can include:
solving formulas that describe hyperbolae based on the relative time delays between receiving time stamps from pairs of network elements; and
determining coordinates of an intersection of the hyperbolae, in which the intersection of the hyperbolae represents the position of the first device.

In another general aspect, a method includes:
at a first device, receiving a first time stamp signal from a first remote radio head;
at the first device, receiving a second time stamp signal from a second remote radio head;
at the first device, receiving a third time stamp signal from a third remote radio head;
determining a first distance between the first device and the first remote radio head based on the first time stamp;
determining a second distance between the first device and the second remote radio head based on the second time stamp;
determining a third distance between the first device and the third remote radio head based on the third time stamp;
determining coordinates of the first device based on coordinates of the first remote radio head, coordinates of the second remote radio head, coordinates of the third remote radio head, the first distance, the second distance, and the third distance;
wherein at least one of:
(i) the first time stamp, the second time stamp, and the third time stamp are time synchronized using optical signals provided by an optical power supply to the first remote radio head, the second remote radio head, and the third remote radio head, or
(ii) a synchronized time reference is established using optical signals provided by an optical power supply to the first remote radio head, the second remote radio head, and the third remote radio head.

Implementations can include one or more of the following features. The first device can include a mobile device.

The mobile device can include at least one of a cellular phone, a laptop computer, a tablet computer, a camera, a smart watch, a smart headset, smart eyeglasses, a radio, a positioning device, a robot, a vehicle configured to move on land, a vehicle configured to move in air, a vehicle configured to move in or on water, a navigation device, or a vehicle driving guidance device.

In another general aspect, a method includes:
at a first device, receiving a first time stamp signal from a first remote radio head;
at the first device, receiving a second time stamp signal from a second remote radio head;
at the first device, receiving a third time stamp signal from a third remote radio head;
determining a first distance between the first device and the first remote radio head based on the first time stamp, and a first delay of the first time stamp relative to a time reference;
determining a second distance between the first device and the second remote radio head based on the second time stamp, and a second delay of the second time stamp relative to the time reference;
determining a third distance between the first device and the third remote radio head based on the third time stamp, and a third delay of the third time stamp relative to the time reference;
determining coordinates of the first device based on coordinates of the first remote radio head, coordinates of the second remote radio head, coordinates of the third remote radio head, the first distance, the second distance, and the third distance;

wherein the first delay, the second delay, and the third delay are determined using optical signals provided by an optical power supply to the first remote radio head, the second remote radio head, and the third remote radio head.

Implementations can include one or more of the following features. The first device can include a mobile device.

The mobile device can include at least one of a cellular phone, a laptop computer, a tablet computer, a camera, a smart watch, a smart headset, smart eyeglasses, a radio, a positioning device, a robot, a vehicle configured to move on land, a vehicle configured to move in air, a vehicle configured to move in or on water, a navigation device, or a vehicle driving guidance device.

In another general aspect, a method includes:
at a first device, receiving a first time stamp signal from a first remote radio head;
at the first device, receiving a second time stamp signal from a second remote radio head;
at the first device, receiving a third time stamp signal from a third remote radio head;
determining a first time delay for the first time stamp signal to travel from the first remote radio head to the first device;
determining a second time delay for the second time stamp signal to travel from the second remote radio head to the first device;
determining a third time delay for the first time stamp signal to travel from the third remote radio head to the first device;
determining a first distance between the first device and the first remote radio head based on the first time delay;
determining a second distance between the first device and the second remote radio head based on the second time delay;
determining a third distance between the first device and the third remote radio head based on the third time delay;
determining coordinates of the first device based on coordinates of the first remote radio head, coordinates of the second remote radio head, coordinates of the third remote radio head, the first distance, the second distance, and the third distance;
wherein the first time stamp, the second time stamp, and the third time stamp are time synchronized using optical signals provided by an optical power supply to the first remote radio head, the second remote radio head, and the third remote radio head.

Implementations can include one or more of the following features. The first device can include a mobile device.

The mobile device can include at least one of a cellular phone, a laptop computer, a tablet computer, a camera, a smart watch, a smart headset, smart eyeglasses, a radio, a positioning device, a map service device, a robot, a vehicle configured to move on land, a robot, a vehicle configured to move in air, a vehicle configured to move in or on water, a navigation device, or a vehicle driving guidance device.

In another general aspect, a method includes:
at a first device, receiving a first time stamp signal from a first remote radio head;
at the first device, receiving a second time stamp signal from a second remote radio head;
at the first device, receiving a third time stamp signal from a third remote radio head;
determining a first time delay for the first time stamp signal to travel from the first remote radio head to the first device;
determining a second time delay for the second time stamp signal to travel from the second remote radio head to the first device;
determining a third time delay for the first time stamp signal to travel from the third remote radio head to the first device;
determining a first distance between the first device and the first remote radio head based on the first time delay, and a first time stamp delay of the first time stamp relative to a time reference;
determining a second distance between the mobile device and the second remote radio head based on the second time delay, and a second time stamp delay of the second time stamp relative to the time reference;
determining a third distance between the mobile device and the third remote radio head based on the third time delay, and a third time stamp delay of the third time stamp relative to the time reference;
determining coordinates of the mobile device based on coordinates of the first remote radio head, coordinates of the second remote radio head, coordinates of the third remote radio head, the first distance, the second distance, and the third distance;
wherein the first time stamp delay, the second time stamp delay, and the third time stamp delay are determined using optical signals provided by an optical power supply to the first remote radio head, the second remote radio head, and the third remote radio head.

In another general aspect, a method includes:
from at least three network elements, transmitting time stamp signals to a first device, in which the network elements are synchronized based on optical signals received from an optical power supply;
receiving from the first device timing information representing timing of when the first device received the time stamp signals;
determining coordinates of the first device based on the timing information representing timing of when the first device received the time stamp signals.

Implementations can include one or more of the following features. The method can include:
at a first network element, receiving a first optical signal from the optical power supply, using the first optical signal to synchronize a first local clock, and generating the first time stamp signal using the first local clock; and
at a second network element, receiving a second optical signal from the optical power supply, using the second optical signal to synchronize a second local clock, and generating the second time stamp signal using the second local clock.

The first optical signal can include a first sequence of optical pulses, and the second optical signal can include a second sequence of optical pulses.

The network elements can include remote radio heads that use the optical signals received from the optical power supply to synchronize local clocks.

The remote radio heads can be configured to convert baseband signals to radio frequency signals using mixers that are associated with the respective local clocks, and the radio frequency signals can include the time stamp signals.

The first device can include at least one of a cellular phone, a laptop computer, a tablet computer, a camera, a smart watch, a smart headset, a smart goggle, smart eyeglasses, a radio, a positioning device, a map service device, a robot, a vehicle configured to move on land, a robot, a vehicle configured to move in air, a vehicle configured to move in or on water, a navigation device, or a driving direction guidance device.

Particular embodiments of the subject matter described in this specification can be implemented to realize one or more of the following advantages. Massively spatially parallel optical interconnect systems that multiplex information onto relatively few wavelengths and use a relatively large number of parallel spatial paths for chip-to-chip interconnections can benefit from having distributed pulsed optical signals that serve both as an optical power supply to provide light for local modulation and as a clock reference within a corresponding island of synchronicity.

Furthermore, efficient distributed computing can benefit from accurate synchronization of network and compute elements and time stamping. In one example, accurate synchronization of network elements allows for circuit switching or synchronous cell switching in addition to or instead of asynchronous packet switching, which can help to reduce or avoid packet buffering, packet loss, and/or random packet delays at network elements. In another example, accurate time stamping of data in a distributed database system can facilitate efficient database processing.

In a multi-antenna wireless system that includes optical links between the baseband processing unit and the remote radio heads, distributing pulsed optical signals that serve both as an optical power supply to provide light for local modulation and as a clock reference for remote radio heads can help improve directional beam steering and/or beam shaping.

The details of one or more embodiments of the subject matter described in this specification are set forth in the accompanying drawings and the description below. Other features, aspects, and advantages of the invention will become apparent from the description, the drawings, and the claims.

Unless otherwise defined, all technical and scientific terms used herein have the same meaning as commonly understood by one of ordinary skill in the art to which this invention belongs. In case of conflict with patent applications or patent application publications incorporated herein by reference, the present specification, including definitions, will control.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION OF SOME EMBODIMENTS

Emerging optical interconnects aim to co-package and even co-integrate optical transponders with electronic processing chips, which necessitates transponder solutions that consume relatively low power and that are sufficiently robust against significant temperature variations as may be found within an electronic processing chip package. Of significant interest are massively spatially parallel optical interconnect solutions that multiplex information onto relatively few wavelengths and use a relatively large number of parallel spatial paths for chip-to-chip interconnection. In such systems, it can be beneficial to place the light source outside the package housing the corresponding photonic and electronic processing chips. It can further be beneficial to distribute pulsed optical signals both as an optical power supply to provide light for local modulation and as a clock reference within a corresponding island of synchronicity.

Furthermore, efficient distributed computing can benefit from accurate synchronization of network and compute elements and time stamping therein. In one example, accurate synchronization of network elements allows for circuit switching or synchronous cell switching in addition to or instead of asynchronous packet switching, which can help to reduce or avoid packet buffering, packet loss, and/or random packet delays at network elements. In another example, accurate time stamping of data in a distributed database system can facilitate efficient database processing.

Figure 1:
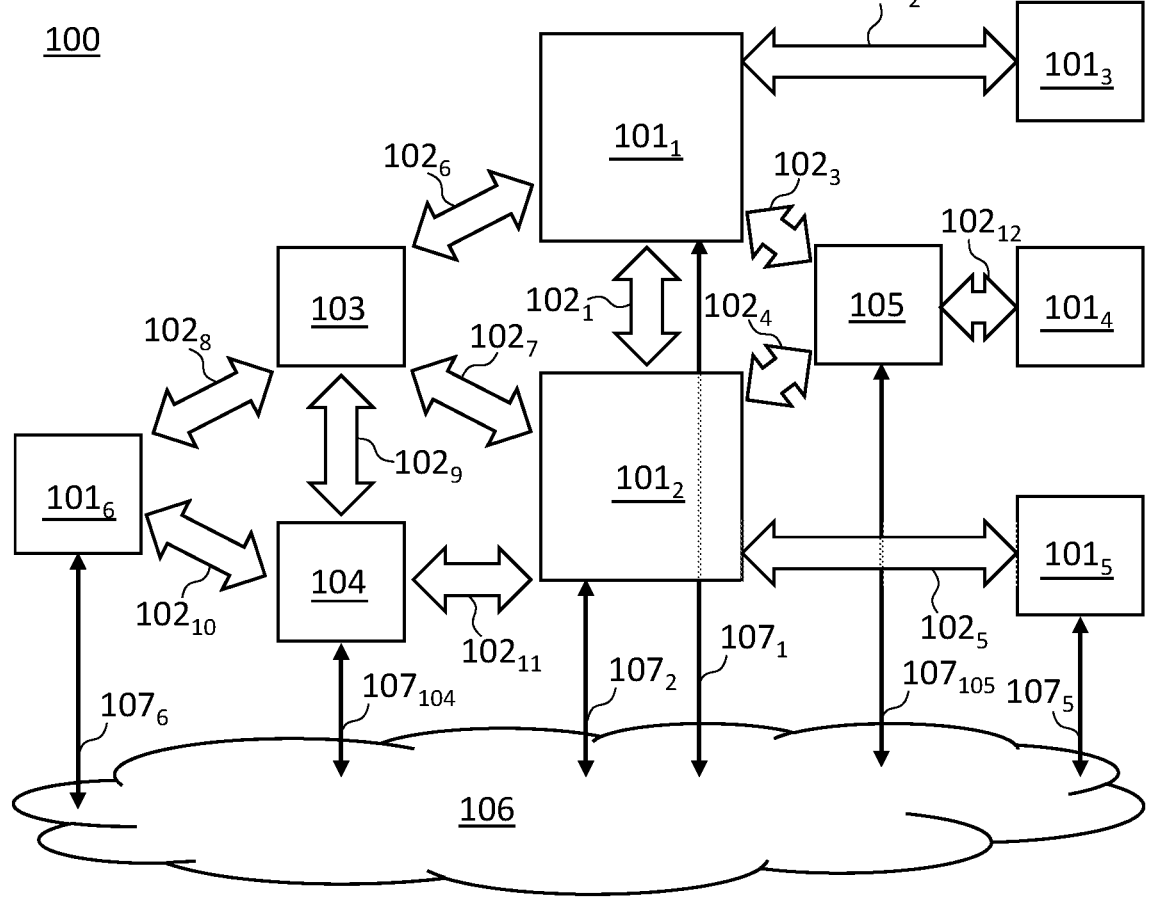
FIG. 1 shows a block diagram of a communication system in which at least some embodiments can be practiced.

FIG. 1 shows a block diagram of a communication system 100 in which at least some embodiments can be practiced. As shown, system 100 comprises nodes $101_1$-$101_6$, which in some embodiments can each comprise one or more of: optical communication devices, electronic and/or optical switching devices, electronic and/or optical routing devices, network control devices, traffic control devices, synchronization devices, computing devices, data storage devices, wireless digital, analog, or mixed-signal processing devices, wireless antenna elements, and radio-frequency oscillators generating wireless carrier frequencies. Nodes $101_1$-$101_6$ can be suitably interconnected by optical fiber links $102_1$-$102_{12}$ establishing communication paths between the communication devices within the nodes. System 100 can also comprise one or more optical power supply modules 103 producing continuous-wave (CW) light or producing one or more trains of optical pulses for use in one or more of the optical communication devices of the nodes $101_1$-$101_6$. For illustration purposes, only one such optical power supply module 103 is shown in FIG. 1. A person of ordinary skill in the art will understand that some embodiments can have more than one optical power supply module 103 appropriately distributed over system 100 and that such multiple power supply modules can be synchronized, e.g., using some of the techniques disclosed herein.

Some end-to-end communication paths can pass through an optical power supply module 103 (e.g., see the communication path between nodes $101_2$ and $101_6$). For example, the communication path between nodes $101_2$ and $101_6$ can be jointly established by optical fiber links $102_7$ and $102_8$, whereby light from optical power supply module 103 is multiplexed onto optical fiber links $102_7$ and $102_8$.

Some end-to-end communication paths can pass through one or more optical multiplexing units 104 (e.g., see the communication path between nodes $101_2$ and $101_6$). For example, the communication path between nodes $101_2$ and $101_6$ can be jointly established by optical fiber links $102_{10}$ and $102_{11}$. Multiplexing unit 104 is also connected, through link $102_9$, to receive light from optical power supply module 103 and, as such, can be operated to multiplex said received light onto optical fiber links $102_{10}$ and $102_{11}$.

Some end-to-end communication paths can pass through one or more optical switching units 105 (e.g., see the communication path between nodes $101_1$ and $101_4$). For example, the communication path between nodes $101_1$ and $101_4$ can be jointly established by optical fiber links $102_3$ and $102_{12}$, whereby light from optical fiber links $102_3$ and $102_4$ is either statically or dynamically directed to optical fiber link $102_{12}$.

As used herein, the term "network element" refers to any element that generates, modulates, processes, or receives light within system 100 for the purpose of communication. Example network elements include a node 101, an optical power supply module 103, an optical multiplexing unit 104, and an optical switching unit 105.

Some light distribution paths can pass through one or more network elements. For example, optical power supply module 103 can supply light to node $101_4$ via optical fiber links $102_7$, $102_4$, and $102_{12}$, letting the light pass through network elements $101_2$ and 105.

System 100 can further comprise a control system 106 configured to exchange control signals on links 107 with at least some of the network elements. Control system 106 can perform local or distributed computations based on information received from one or more network elements. In some embodiments, control system 106 can be physically integrated with one or more of network elements. In some embodiments, control system 106 can communicate the results of these computations to one or more network elements. In some configurations, the set of network elements from which the information for the computations is received can be different from the set of network elements to which the corresponding computation results are communicated.

Figure 2:
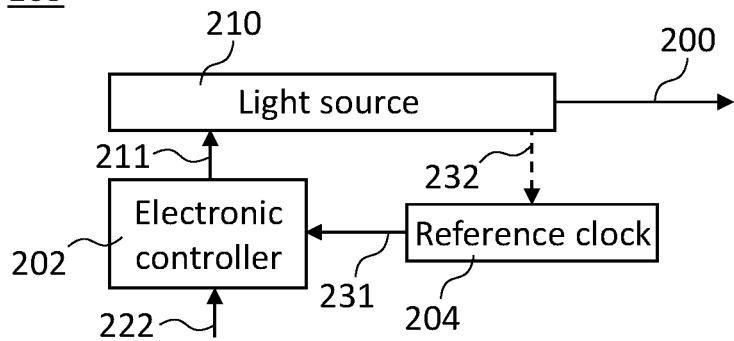
FIG. 2 shows a block diagram of an optical power supply module that can be used in the communication system of FIG. 1 according to an embodiment.

FIG. 2 shows a block diagram of an optical power supply module 103 according to an example embodiment. Optical power supply module 103 comprises a light source 210 and an electronic controller 202. Light source 210 and electronic controller 202 operate to generate a sequence 200 of optical frame templates, each optical frame template of the sequence comprising a frame header and a frame body. Each frame body comprises a respective optical pulse train (e.g., see FIGS. 3A, 3B, and 5A to 5D). Electronic controller 202 operates to generate an electrical control signal 211 used by light source 210 to imprint control information onto the light contained within at least some optical frame templates during the respective frame header time periods. The imprinted control information can be used by other network elements of system 100, e.g., as described below in reference to various example embodiments.

In some implementations, when the optical power supply module 103 is used to provide synchronization signals to remote antennas in a wireless communication system (e.g., 1150 of FIG. 14), the optical frame template does not need to include a frame header. The sequence of frame templates can include optical pulses that function as an optical clock signal that is sent to the remote antenna site.

As used herein, the term "control information" refers to information imprinted by optical power supply module 103 onto one or more optical frame templates during their respective header time periods, e.g., for controlling, managing, and/or monitoring one or more network elements of system 100, and/or for facilitating various synchronization operations within one or more network elements of system 100. In some embodiments, control information can comprise one or more of: a clock frequency, a clock phase, a synchronization time stamp, a frame delimiter, a frame counter, status information, a heartbeat signal, and a command that can be used to control the behavior of other network elements, such as a master/slave assignment or a reset command. Different types of control information can be imprinted onto the headers of optical frame templates using different features thereof. For example, some types of control information can be imprinted using any suitable data modulation of the light during the time period of the frame header. Some other types of control information can be imprinted using suppression of light within the frame header at and/or for a selected time. Some control information can be imprinted differentially during the header(s) time period(s), i.e., can be recovered by comparing two optical frame templates and using the detected differences between the two frame templates to obtain the control information encoded during the header time period(s) by such differences (see, e.g., FIG. 5D). For example, in some embodiments, electronic controller 202 can generate an electrical control signal 211 that can be used by light source 210 to implement a 180-degree optical phase shift during a header time period, resulting in a 180-degree different optical phase of the optical pulse train contained within the body of an earlier optical frame template compared to the optical pulse train contained within the body of the subsequent optical frame template. In another embodiment, electronic controller 202 can generate an electrical control signal 211 that can be used by light source 210 to implement a 90-degree optical polarization rotation during a header time period, resulting in an orthogonal optical polarization state of the optical pulse train contained within the body of an earlier optical frame template compared to the optical pulse train contained within the body of the subsequent optical frame template.

In some embodiments, electronic controller 202 can receive an input signal 222 from one or more other network elements and/or from control system 106 (also see FIG. 1). In some embodiments, electronic controller 202 can receive a clock reference signal 231 from a reference clock circuit 204. In some embodiments, electronic controller 202 can synchronize electrical control signal 221 with the optical pulse train(s) contained within one or more frame templates using clock reference signal 231. In some embodiments, reference clock circuit 204 can comprise a high-precision clock (such as an atomic clock), a receiver capable of obtaining a reference clock from a Global Positioning System (GPS), or a device with access to a stratum clock in a synchronous optical network. In some embodiments, reference clock circuit 204 can optionally use at least a portion 232 of light generated by light source 210 to generate clock reference signal 231.

Figure 3A:
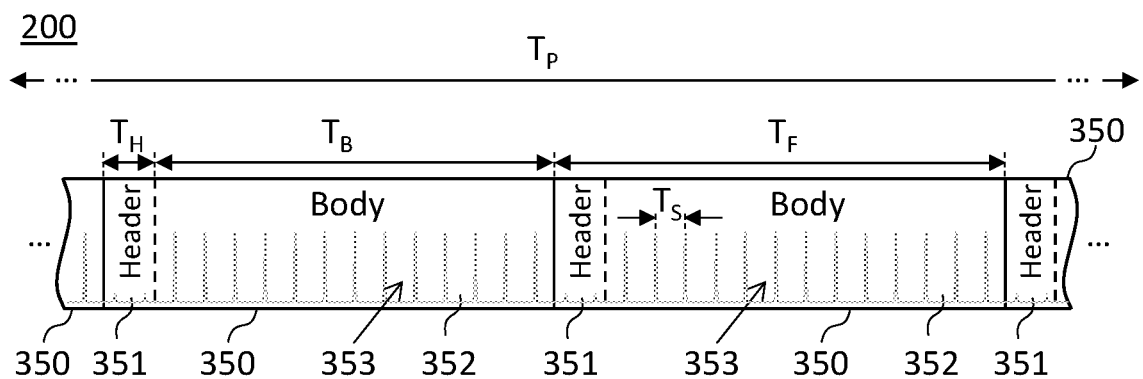
FIGS. 3A-3B graphically illustrate optical frame templates and optical frames that can be generated in the communication system of FIG. 1 according to an example embodiment.
Figure 3B:
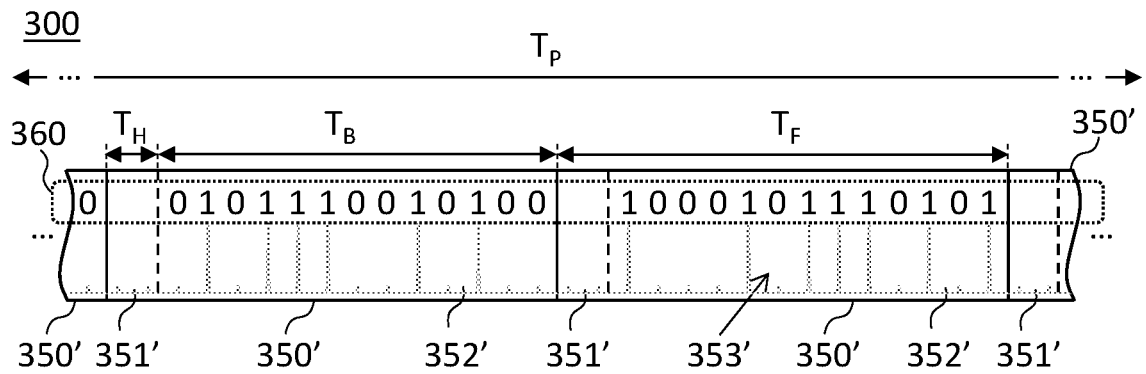

FIGS. 3A-3B graphically illustrate optical frame templates and optical frames that can be generated in communication system 100 according to an example embodiment. More specifically, FIG. 3A graphically illustrates a temporal structure of an example sequence 200 of optical frame templates 350 generated by the optical power supply module 103 of FIG. 2. FIG. 3B graphically illustrates a temporal structure of an example sequence 300 of optical frames 350' that can be generated by a network element of system 100 using optical frame templates 350 of FIG. 3A.

Referring to FIG. 3A, in an example embodiment, each optical frame template 350 has a duration $T_F$. The sequence 200 of frame templates 350 typically has a duration of $T_P \gg T_F$. In some embodiments, $T_P \geq 10\ T_F$. In some other embodiments $T_P \geq 1000\ T_F$. In some embodiments, $T_P$ can be an integer multiple of $T_F$.

Each optical frame template 350 comprises a frame header 351 of duration $T_H$ and a frame body 352 of duration $T_B \gg T_H$, where $T_H + T_B = T_F$. In some embodiments, $T_B \geq 10\ T_H$. In some embodiments, $T_B \geq 100\ T_H$. In some embodiments, $T_B \geq 1000\ T_H$.

The frame body 352 of each optical frame template 350 comprises a respective optical pulse train 353 having a pulse-repetition period $T_S \ll T_F$. In some embodiments, $T_F \geq 10\ T_S$. In some other embodiments, $T_F \geq 1000\ T_S$. In some embodiments, the reciprocal period $1/T_S$ can be equal to the symbol rate of one or more optical signals used for communication by at least some network elements of system 100. In some embodiments, the symbol rate can be at least 10 GBaud, in which case the pulse-repetition period is at most 100 ps. In some embodiments, the duration of an optical frame template $T_F$ can be an integer multiple of the pulse-repetition period $T_S$. In some embodiments, the optical pulse trains 353 of different frame templates can be "frame-synchronized," i.e., the time between the putative start of frame template 350 and the first optical pulse of the respective pulse train 353 of that frame template is the same for all frame-synchronized optical pulse trains 353 of sequence 200.

In some embodiments, the optical pulse trains 353 contained within the respective bodies 352 of a first optical frame template 350 and a second optical frame template 350 can be synchronized with each other. Herein, we refer to two optical pulse trains as being "synchronized with each other" if (i) the optical pulse trains of the first optical frame template and of the second optical frame template have approximately the same pulse-repetition period and (ii) the temporal spacing between the last pulse of the optical pulse train of the first optical frame template and the first pulse of the optical pulse train of the second optical frame template is approximately an integer multiple of said same pulse-repetition period.

In some embodiments, the optical pulse train 353 contained within the body 352 of an optical frame template 350 extends into the corresponding frame header 351.

In some embodiments, the optical pulse trains 353 of the bodies 352 of all optical frame templates 350 of sequence 200 are synchronized with each other and extend across headers 351, thereby forming a "concatenated optical pulse train," e.g., an optical pulse train that spans the full duration of sequence 200. In order for the concatenated optical pulse train to be differentiated into a sequence of optical frame templates, one or more of the parameters P of the optical field of the concatenated optical pulse train can be imprinted with control information during one or more header time periods within the duration of the sequence. In an example embodiment (e.g., see FIG. 3A), $T_S$-spaced optical pulses can be present in each of the frame bodies 352 and possibly in some or all of the corresponding frame headers 351. Some of the frame headers 351 may not contain any optical pulses or have some or all optical pulses suppressed (e.g., significantly attenuated or substantially fully extinguished) therein.

In some embodiments, module 103 can apply one or more changes to one or more parameters P of the optical field of the corresponding optical pulses of trains 353 during one or more frame-header time periods 351. Such changes can be in response to electrical control signal 211 and be configured to imprint the above-mentioned control information that can subsequently be used by one or more network elements of system 100. In various embodiments, different headers 351 within sequence 200 can encode identical or different control information.

During a frame body period 352, optical power supply module 103 typically does not make controllable changes to the corresponding optical pulse train 353 carried therein. For example, the one or more parameters P of the optical field of the optical pulse train 353 can remain substantially constant within one or more frame bodies 352. In general, frame body 352 of an optical frame template 350 is not loaded with (i.e., does not carry) payload data. However, frame body 352 of optical frame template 350 is such that it can conveniently be loaded with payload data, e.g., as described below in reference to FIG. 3B. In that sense, optical frames 350 are "templates" because such optical frame templates already carry light that can conveniently be but is not yet encoded with payload data. Optical frame templates 350 can be converted into conventional optical frames 350' (also referred-to herein as "optical frames" or "loaded optical frames") in a convenient and straightforward manner, e.g., as further described below. Such conversion can include but is not limited to: (i) modulating the portions of optical pulse trains 353 within frame bodies 352 with payload data (referred to herein as "loading" or "data loading" the optical frame template), and (ii) optionally modifying some or all of frame headers 351 to add some selected information that can typically be contained within a conventional frame header 351' of a conventional optical frame 350'.

As used herein, the term "payload data" refers to digital information imprinted onto the frame body by nodes 101 at a symbol rate $R_S$ that is significantly higher than the frame repetition rate $R_F=1/T_F$. In some embodiments, $R_S=1/T_S$. In some embodiments, $R_S \geq 10\ R_F$. Typically, the payload data form the part of the transmitted data that is and/or carries the intended message to the corresponding (e.g., remote) data receiver. Headers and metadata can be sent together with the payload data to enable delivery thereof by the corresponding data-transport system. In the networking arts, the payload data are typically encapsulated in a suitable type of a data frame. Non-limiting examples of such data frames are Ethernet frames, Point-to-Point Protocol (PPP) frames, Fiber Channel frames, and modem frames.

In some embodiments, all frame bodies 352 within sequence 200 are copies of each other. Herein, a first frame body 352 is referred to as being a "copy" of a second frame body 352 if the optical pulse train 353 contained within the first frame body has approximately the same periodicity as the optical pulse train contained within the second frame body and the optical pulse trains of the first and of the second frame body are frame-synchronized. The typically uncontrollably occurring small fluctuations of the pulse intensity and relative phase and timing jitter are not intended to be construed as affecting said "copy" relationship between such first and second frame bodies 352.

In an example embodiment, the optical pulses of frame headers 351 generated by module 103 can differ from one another by digital changes. As used herein, the term "digital change" refers to a change of the value of parameter P, according to which the resulting value of the parameter P belongs to an alphabet consisting of a finite and discrete set of values. The values of said alphabet can be such that each individual one of the values lends itself to reliable detection by an intended optical receiver in system 100.

In various embodiments, the parameter P can be any one of: intensity, phase, polarization, wavelength (optical frequency), and spatial distribution of light.

As used herein, an "optical pulse train" of period T refers to an optical signal whose intensity is periodic with time period T In some embodiments, the optical field of an optical pulse train can be periodic with an integer multiple of T, i.e., with a period of n T, where n=1, 2, 3, . . . .

As used herein, the term "periodic" refers to a signal characterized by a parameter or feature (or a change of a parameter or feature) that is repeated every time period T within a duration of time $T_D$, where $T_D$ is significantly larger than T, e.g., $T_D \geq 10\ T$ In some cases, the term "periodic" can also be applicable to a signal affected by random noise, random drifts, or small analog dither modulations using one or more sinewave dither tones at frequencies much lower than 1/T, e.g., at frequencies smaller than 1/(1000 T), as long as the effect of noise, drift, or dither is not so strong as to obscure (e.g., make substantially undetectable) the signal periodicity.

Referring to FIG. 3B, in an example embodiment, a sequence 300 of conventional optical frames 350' can be generated from sequence 200 by loading one or more bodies 352 with digital information, e.g., by modulating the corresponding trains 353 with data at symbol rate $1/T_S$, to produce data-modulated bodies 352'. Such data modulation can comprise any of intensity, phase, polarization, or frequency modulation, and any combinations thereof. In the example embodiment graphically illustrated in FIG. 3B, data modulation is performed using binary (e.g., ON/OFF) optical intensity modulation according to a bit stream 360 (which is shown in FIG. 3B as an overlay onto sequence 300).

In the example embodiment illustrated in FIG. 3B, headers 351' of frames 350' are unchanged from headers 351 of the corresponding frame templates 350 and carry frame delimiter control information. In some other embodiments, frame headers 351 of optical frame templates 350 can be modified to generate frame headers 351' of the corresponding optical frames 350'.

Figure 4A:
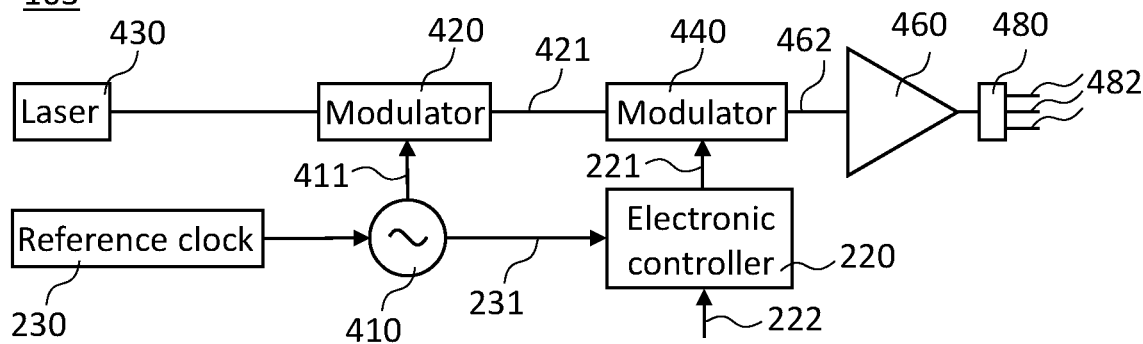
FIGS. 4A-4C show block diagrams of an optical power supply module that can be used in the communication system of FIG. 1 according to several example embodiments.
Figure 4B:
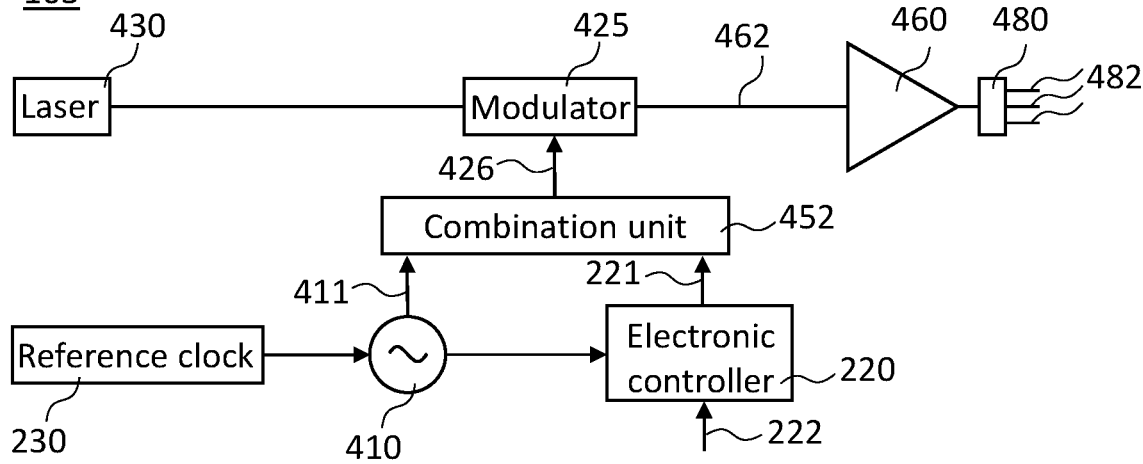
Figure 4C:
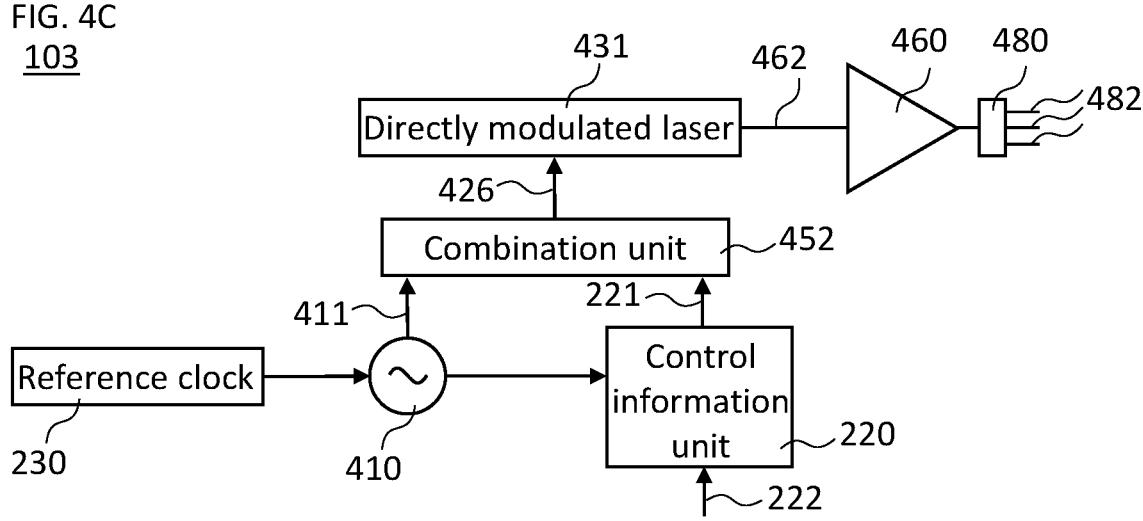

FIGS. 4A-4C show block diagrams of optical power supply module 103 according to several example embodiments.

FIG. 4A shows a block diagram of optical power supply module 103 according to an embodiment. In the embodiment of FIG. 4A, optical power supply module 103 comprises an oscillator 410 configured to generate a periodic electrical waveform 411, e.g., a sinusoidal waveform, a triangular waveform, or a rectangular waveform, etc. In some embodiments, oscillator 410 can be phase- and/or frequency-locked to reference clock 230. Oscillator 410 drives a first optical modulator 420 with electrical waveform 411 to modulate light from a CW laser 430 such that the light at an optical modulator output 421 is an optical pulse train of period $T_S$. In some embodiments, electrical waveform 411 can be periodic with period $T_S$. In some other embodiments, electrical waveform 411 can be periodic with an integer multiple of $T_S$, and modulator 420 can cause the period of its output intensity waveform to be shorter (by the integer multiple) than the period of the electrical drive waveform.

In some embodiments, the periodicity of the optical field of the optical pulse train can be periodic with an integer multiple of $T_S$, i.e., with a period of $nT_S$, n=1, 2, 3, . . . . For example, in some embodiments, modulator 420 can be a Mach-Zehnder modulator biased at its transmission peak or a Mach-Zehnder modulator biased at its transmission null, and signal 411 can be sinusoidal with period 2 $T_S$, which can in both cases result in a periodic optical intensity waveform with period $T_S$ at modulator output 421. If the Mach-Zehnder modulator is biased at its transmission null, however, the phase of the optical field can be periodic with period 2 $T_S$.

The optical pulse train at optical modulator output 421 is further modulated by a second optical modulator 440. In different embodiments, modulator 440 can be configured to modulate at least some of intensity, phase, frequency, polarization, or spatial distribution of the optical pulse train at modulator output 421 to produce sequence 200 at an optical modulator output 462. Modulator 440 is driven by electrical signal 221, which is generated by electronic controller 220. Electrical signal 221 can exhibit a digital change during the period of a frame header 351 while remaining at the same digital value during the period of a frame body 352. Some examples of electrical signal 221 and the resulting optical frame templates 200 at an optical modulator output 462 are described in more detail below in reference to FIGS. 5A-5D.

Electrical signal 221 can be autonomously generated within electronic controller 220 or can be at least in part rely on external information 222 provided to electronic controller 220 by other devices or network elements of system 100 or by control system 106. Electronic controller 220 can further accept reference signal 231 from oscillator 410 to synchronize electrical signal 221 with optical pulse train 421.

In some embodiments, one or more optical amplifiers 460 can amplify sequence 200 at an optical modulator output 462. In some embodiments, one or more optical splitters 480 can split sequence 200 into two or more signal portions (e.g., attenuated replica) 482 for output on various links 102.

FIG. 4B shows a block diagram of optical power supply module 103 according to another embodiment. In this particular embodiment, the functions of modulators 420 and 440 are combined into a single optical modulator 425, and electrical outputs 411 and 221 of signal generators 410 and 220 are converted into a single electrical drive signal 426 using an electrical signal combination unit 452. In an example embodiment, signal combination unit 452 can produce an output signal 426 using a weighted sum of signals 411 and 221. In another example embodiment, signal combination unit 452 can produce an output signal 426 using a product of signals 411 and 221.

FIG. 4C shows a block diagram of optical power supply module 103 according to yet another embodiment. In this particular embodiment, CW laser 430 and modulator 425 are replaced by a directly modulated laser 431.

FIGS. 5A-5D graphically illustrate sequence 200 and corresponding electrical control signals 221 according to several example embodiments. At least some of the shown signals 200 and 221 can be generated using some of the circuits shown in FIGS. 4A-4C. Additional circuits that can also be used to generate and/or use at least some of the shown signals 200 and 221 are described below in reference to FIGS. 6A-6C and 7A-7B.

Figure 5A:
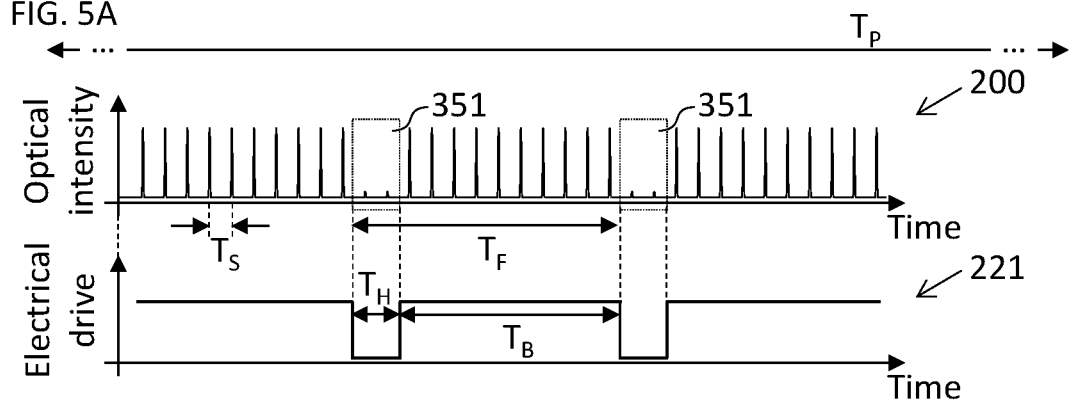
FIGS. 5A-5D graphically illustrate optical frame templates and corresponding electrical drive signals that can be generated in the communication system of FIG. 1 according to some embodiments.

In the embodiment of FIG. 5A, electrical signal 221 digitally changes its value during header time period 351 of approximate duration $T_H \approx 2\ T_S$ within every frame period $T_F \approx 12\ T_S$ and remains constant during the frame body of duration $T_B = T_F - T_H \approx 10\ T_S$. When optical modulator 440 operates as an intensity modulator, the electrical signal 221 shown in the lower panel of FIG. 5A results in the intensity waveform of sequence 200 shown in the upper panel of FIG. 5A.

In some embodiments, electrical signal 221 can remain constant for a frame body of duration $T_B \geq 100\ T_S$. In some other embodiments, electrical signal 221 can remain constant for a frame body of duration $T_B \geq 1000\ T_S$.

As shown in FIG. 5A, different headers can carry the same control information, which in this example embodiment corresponds to frame delimiters.

Figure 5B:
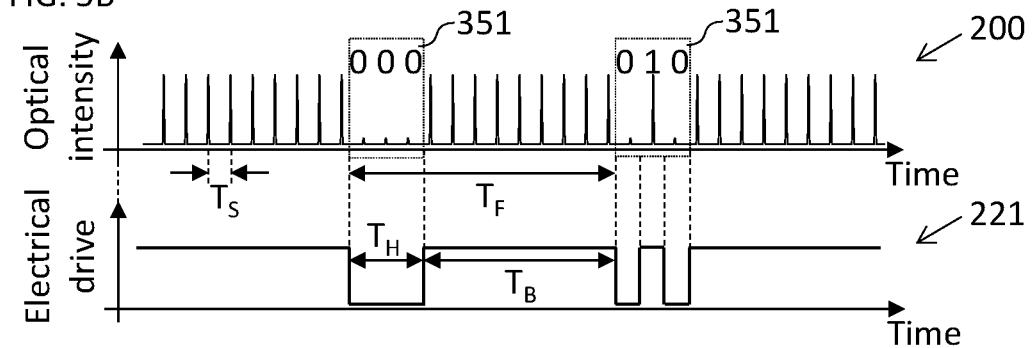

In the embodiment of FIG. 5B, electrical signal 221 can digitally change its value during header time period 351 of approximate duration $T_H \approx 3\ T_S$ within every frame period $T_F \approx 12\ T_S$ and remain constant during the frame body of duration $T_B = 9\ T_S$. When optical modulator 440 operates as an intensity modulator, the electrical signal 221 shown in the lower panel of FIG. 5B results in the intensity waveform of sequence 200 shown in the upper panel of FIG. 5B.

As indicated in FIG. 5B, different headers 351 can carry different control information. In the shown non-limiting example, one header 351 carries the binary word '0 0 0' while another header 351 carries the binary word '0 1 0'. The preset logical meaning of such differently modulated headers can be used within system 100 as control information, e.g., as frame identifiers, frame counters, synchronization time stamps, or to convey status information from optical power supply module 103 to one or more network elements.

Figure 5C:
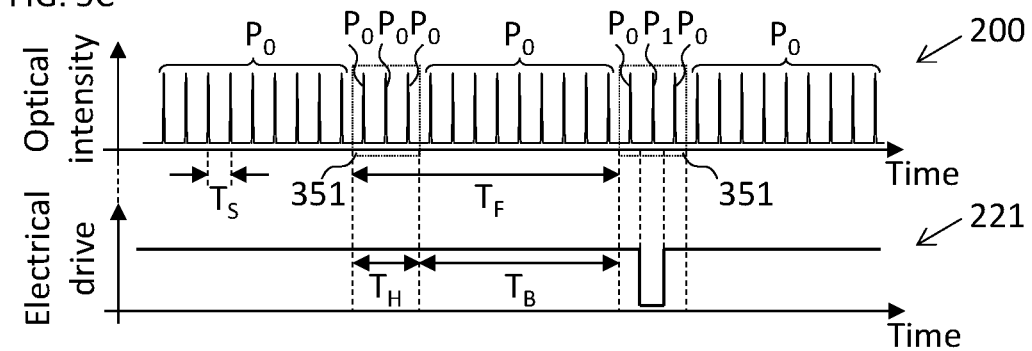

In the embodiment of FIG. 5C, electrical signal 221 can digitally change its value during some header time periods 351 of approximate duration $T_H \approx 3\ T_S$ within frame periods $T_F \approx 12\ T_S$ and remain constant during the frame bodies of duration $T_B = 9\ T_S$. When optical modulator 440 operates to modulate the parameter P of the light passing therethrough, the electrical signal 221 shown in the lower panel of FIG. 5C results in the sequence 200 having the infrequent changes of the parameter P indicated in the upper panel of FIG. 5C. In various embodiments, the parameter P can be any one of: intensity, phase, polarization, wavelength (optical frequency), and spatial distribution of light. In such embodiments, modulator 440 is an intensity modulator, a phase modulator, a polarization modulator, a frequency shifter, and a spatial light modulator, respectively.

While the example shown in FIG. 5C illustrates binary modulation of the parameter P between two values $P_0$ and $P_1$, other numbers of possible values of the parameter P can also be realized in some embodiments. For example, modulator 440 can be configured to imprint three or more different digital values of the parameter P in different modulation time slots. Furthermore, in some embodiments, modulator 440 can be configured to cause corresponding changes of two or more different parameters P (e.g., phase and intensity; or optical frequency and polarization; or phase, intensity, and optical frequency; or phase, intensity, optical frequency, and polarization).

Figure 5D:
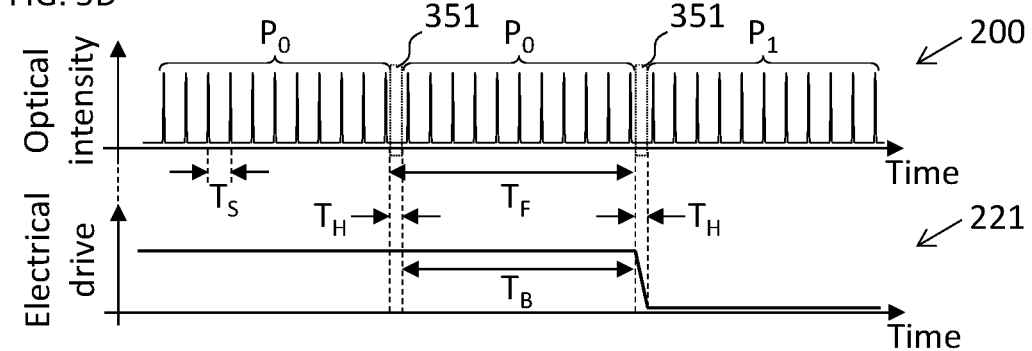

In the embodiment of FIG. 5D, electrical signal 221 can remain substantially constant for one or more frame body periods of $T_B \approx 10.4\ T_S$ and can digitally change its value during at least one header time period 351 of $T_H \approx 0.6\ T_S$. When optical modulator 440 operates to modulate the parameter P of the light passing therethrough, the electrical signal 221 shown in the lower panel of FIG. 5D results in the sequence 200 having the infrequent changes of the parameter P indicated in the upper panel of FIG. 5D. In various embodiments, the parameter P can be any one of: intensity, phase, polarization, wavelength, or spatial distribution of light. While the example shown in FIG. 5D illustrates binary modulation of the parameter P between two values $P_0$ and $P_1$, more than two values of the parameter P can be used, e.g., as already indicated above in reference to FIG. 5C. Furthermore, in some embodiments, modulator 440 can be configured to cause corresponding changes of two or more different parameters P, e.g., as also indicated above in reference to FIG. 5C.

Figure 6A:
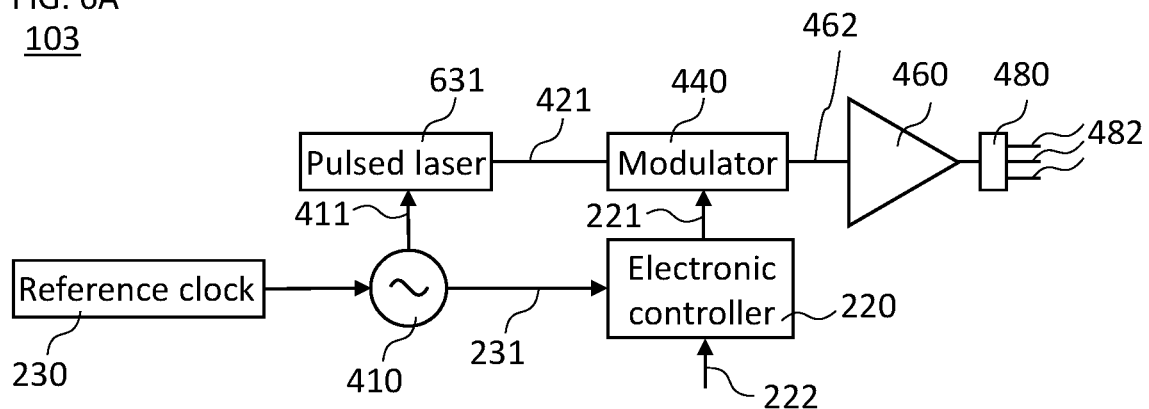
FIGS. 6A-6C show block diagrams of an optical power supply module that can be used in the communication system of FIG. 1 according to several additional embodiments.
Figure 6B:
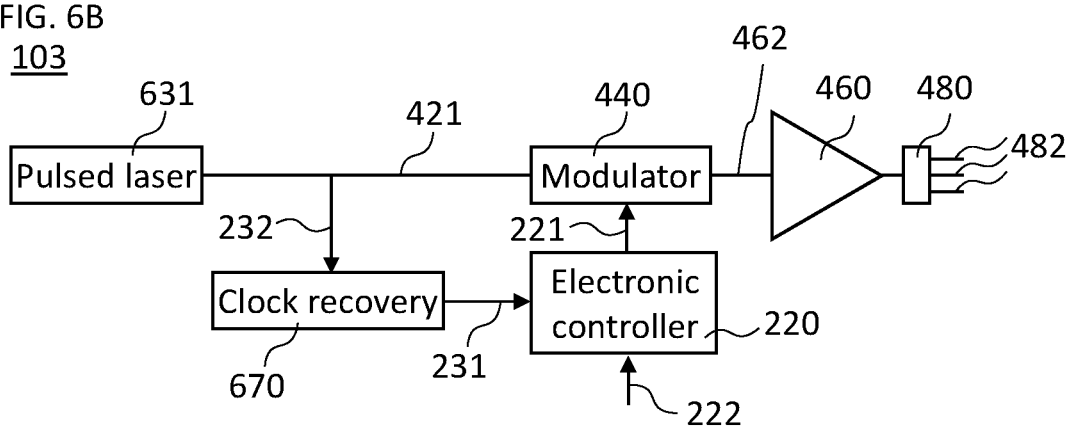
Figure 6C:
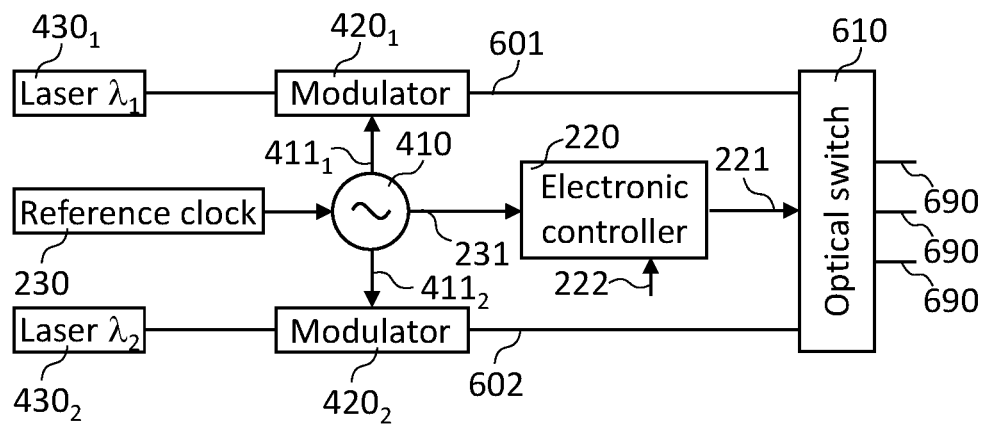

FIGS. 6A-6C show block diagrams of optical power supply module 103 according to additional example embodiments.

In the embodiment shown in FIG. 6A, oscillator 410 is used to drive a pulsed laser 631 to produce an optical waveform that is periodic in its optical intensity with period $T_S$ at the optical output 421. In some embodiments, pulsed laser 631 can be a directly modulated laser whose pump current is modulated in response to electrical waveform 411. In some other embodiments, pulsed laser 631 can be an actively mode-locked laser. In yet some other embodiments, pulsed laser 631 can be a hybrid mode-locked laser. In some embodiments, electrical waveform 411 can be periodic with period $T_S$. In some other embodiments, pulsed laser 631 can, upon modulation, produce an optical output whose intensity waveform has a different period (e.g., by an integer multiplication or division factor) than the corresponding electrical waveform 411. For example, in some embodiments, pulsed laser 631 can be a sub-harmonically driven mode-locked laser.

The optical pulse train at pulsed laser output 421 is further modulated by modulator 440. Modulator 440 can modulate any of intensity, phase, frequency, polarization, or spatial distribution of the optical pulse train at pulsed laser output 421 to produce a sequence 200 at modulator output 462.

Modulator 440 can be driven by electrical signal 221, as discussed by way of examples in reference to FIGS. 4-5.

In some embodiments, one or more optical amplifiers 460 can amplify the light of sequence 200 at modulator output 462. In some embodiments, one or more optical splitters 480 can split signal 462 into two or more signal portions 482 for being directed to various links 102.

In some embodiments, pulsed laser 631 and modulator 440 can be replaced by a single directly-modulated laser, and signals 411 and 221 can be suitably combined by a signal combination unit to generate a single electrical signal directly driving said directly-modulated laser, e.g., as described in reference to FIG. 4C.

In the embodiment shown in FIG. 6B, pulsed laser 631 can be a passively mode-locked laser that generates an optical waveform that is periodic with respect to its optical intensity with period $T_S$ at pulsed laser output 421. A clock recovery circuit 670 operates to recover the frequency and/or phase of the periodic intensity waveform using the light from tapped pulsed laser output 232. The resulting clock signal 231 can then be used by electronic controller 220, e.g., as described in reference to FIG. 4A.

In the embodiment shown in FIG. 6C, oscillator 410 is used to generate periodic electrical waveforms $411_1$ and $411_2$. In some embodiments, oscillator 410 can be locked to reference clock 230. Oscillator 410 drives optical modulators $420_1$ and $420_2$ with electrical waveforms $411_1$ and $411_2$, respectively, which are connected to modulate light from CW lasers $430_1$ and $430_2$ operating at different respective wavelengths $\lambda_1$ and $\lambda_2$ such as to produce optical waveforms that are periodic with respect to their optical intensities with period $T_S$ at modulator outputs 601 and 602. In some embodiments, the optical frequency separation of the two CW lasers $|f_1-f_2|$ is at least $1/T_S$, where $f_1=c/\lambda_1$ and $f_2=c/\lambda_2$, c being the speed of light in the medium in which the wavelengths are measured. In some embodiments, the phase difference between the two electrical waveforms $411_1$ and $411_2$ can be chosen such as to synchronize modulator outputs 601 and 602, e.g., by letting the corresponding pulses of the waveforms at modulator outputs 601 and 602 overlap in time. In some embodiments, the two combinations of CW lasers 430 and modulators 420 can be replaced by two directly modulated lasers or by two mode-locked lasers.

Optical pulse trains at modulator outputs 601 and 602 are input to an optical switch 610. Optical switch 610 is driven by electrical signal 221, which is generated by electronic controller 220, e.g., as described above. Optical switch 610 respectively switches one of its inputs 601 or 602 to one or more of its outputs 690 based on electrical signal 221. One or more outputs 690 can be directed to one or more links 102.

Figure 7A:
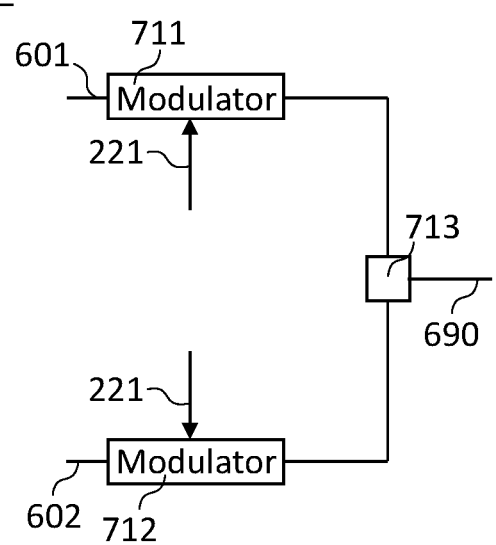
FIGS. 7A-7B show block diagrams of an optical switch that can be used in the optical power supply module of FIG. 6C according to some embodiments.
Figure 7B:
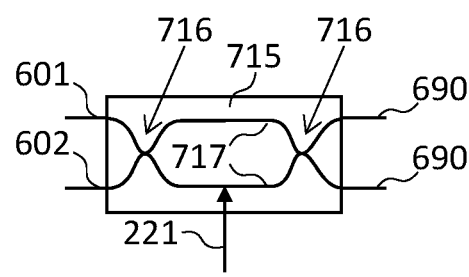

FIGS. 7A-7B show block diagrams of optical switch 610 according to some example embodiments.

In the embodiment of FIG. 7A, optical switch 610 comprises two on/off intensity modulators 711 and 712, followed by an optical coupler 713. In some embodiments, on/off intensity modulators 711 and 712 can be selected from any of: electro-absorption modulators, ring modulators, and Mach-Zehnder modulators. In operation, modulators 711 and 712 can be driven out-of-phase with respect to one another by electrical signals 221, i.e., modulator 711 lets light pass from its input to its output whenever modulator 712 blocks light from its input to its output, and vice versa.

In the embodiment of FIG. 7B, optical switch 610 comprises a Mach-Zehnder optical modulator 715 with two input ports 601 and 602 and two output ports 690. Mach-Zehnder optical modulator 715 comprises input and output power splitters 716 connected by optical waveguides 717. Electrical signal 221 is applied to appropriately modulate the optical phase difference between waveguides 717, thereby switching optical signal 601 to the upper output 690 and signal 602 to the lower output 690 and vice versa.

Figure 8:
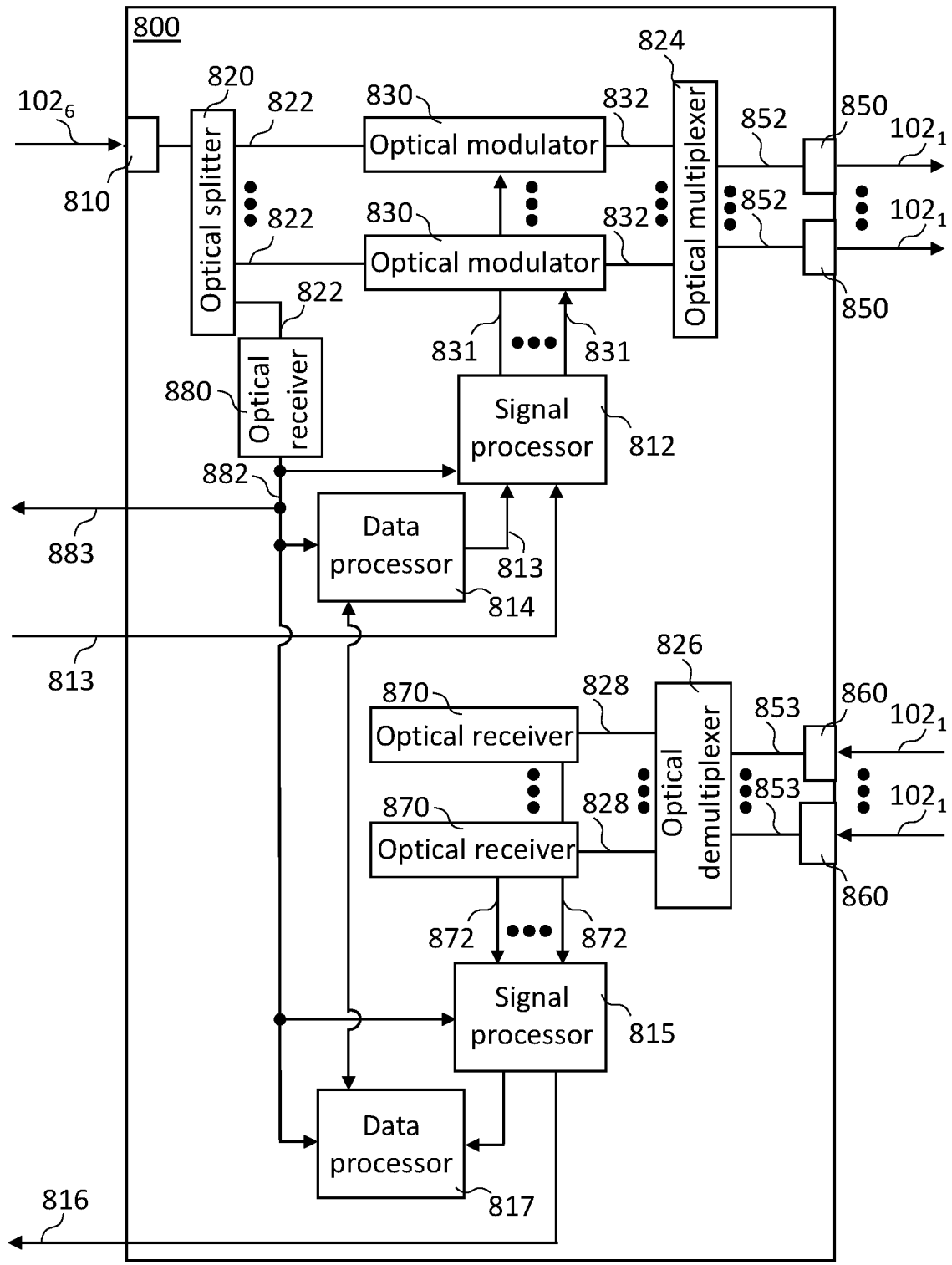
FIG. 8 shows a block diagram of a synchronizing communication transponder that can be used in the communication system of FIG. 1 according to an embodiment.

FIG. 8 shows a block diagram of a synchronizing communication transponder 800 that can be used in system 100 according to an embodiment. In different embodiments, transponder 800 can be a part of various network elements of system 100. For illustration purposes and without any implied limitation, transponder 800 is described below for an embodiment in which said transponder is a part of node $101_1$.

In operation, transponder 800 receives one or more sequences 200 from optical power supply module 103 via an optical interface 810 connected to optical link $102_6$ (also see FIG. 1). In some embodiments, optical interface 810 can comprise one or more optical connectors, one or more edge-coupling mechanisms to a photonic integrated circuit (PIC), one or more vertical coupling mechanisms to a PIC, etc. In an example embodiment, optical interface 810 can be connected to one or more (e.g., cascaded) optical splitters 820, only one of which is shown in FIG. 8 for illustration purposes. In various embodiments, an optical splitter 820 can be constructed, e.g., as known in the pertinent art, using one or more of: optical power splitters, wavelength splitters, polarization splitters, and spatial-distribution splitters, such as spatial-mode splitters or multi-core-fiber fanouts. In some embodiments, one or more of certain splitting functions of optical splitter 820 can be integrated into optical interface 810. For example, in some embodiments, a polarization-diversity vertical grating coupler can be configured to simultaneously act as a polarization splitter of optical splitter 820 and as a part of an optical interface 810.

Opto-electronic modulators 830 receive sequence(s) 200 on optical splitter outputs 822 and modulate data onto the pulses contained within bodies 352 of optical frame templates 350 using one or more electrical drive signals 831 to produce optical frames 350' on modulator outputs 832. In some embodiments, modulation can be done in intensity, phase, polarization, or frequency. In some embodiments, modulation can be done at a modulation symbol rate $1/T_S$.

In some embodiments, one or more modulators 830 can at times not modulate information onto optical frame templates 350. Alternatively or in addition, one or more of the shown modulators 830 can be omitted from (i.e., not present in) the structure of transponder 800. In such cases, optical frame templates 350 can be passed through transponder 800 on to other network elements of system 100, in accordance with the above-provided functional description of some aspects of system 100 (FIG. 1). In some embodiments, some of such passed-on optical frame templates 350 can be used by other network elements of system 100 as an optical power supply to imprint payload information and convert optical frame templates 350 into the corresponding loaded optical frames 350' thereat. In some embodiments, some of such passed-on optical frame templates 350 can be received by other network elements of system 100 to extract control information therefrom.

In some embodiments, some modulators 830 can be configured to use more than one electrical drive signal 831 to modulate light received at the corresponding input 822. Examples of such modulators 830 include but are not limited to in-phase/quadrature modulators and segmented-electrode modulators. In various embodiments, opto-electronic modulators 830 can be electro-absorption modulators, ring modulators, or Mach-Zehnder modulators. In various embodiments, opto-electronic modulators 830 can be made of semiconductor materials, materials used in Silicon Photonics, polymer materials, or Lithium Niobate. In some embodiments, opto-electronic modulators 830 can at least partially be integrated in one or more PICs (not explicitly shown in FIG. 8). In various embodiments, electrical drive signals 831 can be binary or multilevel. In some embodiments, electrical drive signals 831 can be suitably pulse-shaped or can be pre-distorted using digital or analog filters, or can be electrically amplified using electrical driver amplifiers.

In some embodiments, some of the sequence(s) 200 on optical splitter outputs 822 can be detected using one or more optical receivers 880 to extract information contained therein. Such information can be output on receiver output (s) 882. Such information can include, without limitation, one or more frequency components, one or more time skew or clock phase values, and one or more pieces of control information embedded within the sequence(s) 200.

In some embodiments, information extracted by optical receivers 880 can be provided to devices external to transponder 800 on output port 883 for further use within system 100, e.g., for use within control system 106, such as for network traffic synchronization/arbitration/scheduling, database time-stamping, and/or local clock synchronization, etc. In some embodiments, information extracted by optical receivers 880 can be fed into an electronic signal processor 812 and/or a data processor 814. In some embodiments, electronic signal processor 812 can receive one or more signals 813 from external devices and/or data from data processor 814 and can pre-process those to generate electrical drive signals 831 for modulators 830. In some embodiments, pre-processing can comprise any form of analog, digital, or mixed-signal manipulation, including but not limited to retiming, de-skewing, buffering, bit stuffing, bit removal, forward error correction coding, line coding, framing, the insertion of pilots and packet headers, time-stamping, linear and nonlinear pre-compensation, pre-equalization, pre-emphasis, and pre-distortion.

In some embodiments, sequences 300 of optical frames 350' on modulator outputs 832 can be multiplexed in wavelength, polarization, or spatial distribution of the optical field using one or more multiplexers 824 to generate one or more optical multiplexed signals 852. Multiplexed signals 852 can then be transmitted via one or more output interfaces 850 to one or more optical fibers $102_1$. In some embodiments, output interfaces 850 can be implemented, e.g., as one or more optical fiber connectors, one or more edge couplers from PIC to fibers, or one or more vertical couplers from PIC to fibers. In some embodiments, certain multiplexing functions of multiplexer 824 can be integrated into certain output interfaces 850. For example, a polarization-diversity vertical grating coupler can simultaneously act as a polarization multiplexer of multiplexer 824 and as a part of an output interface 850.

In some embodiments, each modulator output 832 can be passed directly to a corresponding optical fiber or to a corresponding optical fiber core of fiber link $102_1$ via a corresponding output interface 850, i.e., without undergoing any multiplexing therebetween. In other words, multiplexer 824 or some parts thereof may not be present in some embodiments.

Transponder 800 can further comprise input interfaces 860 connected to receive one or more optical signals 853 that can be of the same general form as signals 852. In some embodiments, input interfaces 860 can be implemented similar to output interfaces 850, e.g., using one or more optical fiber connectors, one or more edge couplers from PIC to fibers, or one or more vertical couplers from PIC to fibers. In some embodiments, input interfaces 860 can be connected to one or more optical demultiplexers 826 to demultiplex signals 853 into their constituent components, e.g., into one or more of wavelengths, polarizations, or spatial distributions of the optical field, to yield demultiplexed signals 828. Demultiplexed sequences of optical frames 350' at demultiplexer outputs 828 can be converted from optical to electrical form using optical receivers 870 to produce electrical signals 872.

In some embodiments, certain demultiplexing functions of demultiplexer 826 can be integrated into certain input interfaces 860. For example, a polarization-diversity vertical grating coupler can simultaneously act as a polarization demultiplexer of demultiplexer 826 and as a part of an input interface 860.

In some embodiments, each optical signal 853 can be passed directly to a corresponding optical data receiver 870 from a corresponding input interface 860, i.e., without undergoing any demultiplexing therebetween. In other words, demultiplexer 826 or some parts thereof may not be present in some embodiments.

In some embodiments, electrical signals 872 can be further processed using an electronic signal processor 815. In some embodiments, electronic signal processor 815 can process electrical signals 872 to generate one or more electrical data signals 816. In some embodiments, electronic signal processor 815 can further accept information 882 extracted from the sequence(s) 200 by optical receivers 880. In some embodiments, electronic signal processing can comprise any form of analog, digital, or mixed-signal manipulations, including but not limited to linear and non-linear equalization, clock recovery, retiming, de-skewing, buffering, forward error correction decoding, line decoding, de-framing, pilot removal, and the inspection and manipulation of packet headers.

In some embodiments, electronic signal processor 815 can produce data for further electronic processing by data processor 817. In some embodiments, data processor 817 can further accept information 882 extracted from the sequence(s) 200 by optical receivers 880.

FIGS. 9A-9D show block diagrams of optical receiver 880 according to some example embodiments. The circuits shown in FIGS. 9A-9D can also be used to implement various embodiments of optical receiver 870. For simplicity, the following description is given primarily in reference to optical receiver 880. From the provided description, a person of ordinary skill in the art will also be able to make and use optical receiver 870 without any undue experimentation.

Figure 9A:
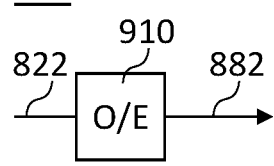
FIGS. 9A-9D show block diagrams of an optical receiver that can be used in the synchronizing communication transponder of FIG. 8 according to some embodiments.

In the embodiment illustrated in FIG. 9A, optical receiver 880 comprises an optical-to-electrical (O/E) conversion device 910 configured to convert optical signal 822 into a corresponding electrical output signal 882. In various embodiments, O/E conversion device 910 can comprise one or more p-i-n photodiodes, one or more avalanche photodiodes, one or more self-coherent receivers, or one or more analog (heterodyne/homodyne) or digital (intradyne) coherent receivers. In some embodiments, O/E conversion device 910 can further comprise analog electronic circuitry, digital electronic circuitry, mixed-signal electronic circuitry, or digital electronic signal processing functions to assist in O/E conversion, such as electronic biasing circuits, electronic monitoring circuits, trans-impedance amplifiers, digital or analog linear or nonlinear equalization circuits, and various other receiver digital signal processing elements. In some embodiments, O/E conversion device 910 can at least partially be integrated in one or more PICs (not explicitly shown in FIG. 9A).

Figure 9B:
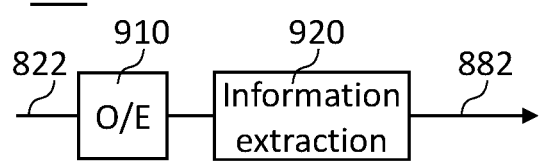

In the embodiment illustrated in FIG. 9B, O/E conversion device 910 is connected to information extraction device 920. In some embodiments, information extraction device 920 can comprise one or more electrical bandpass filters centered approximately at one or more characteristic frequency components contained in optical frame template 350 on receiver input 822, such as a main clock frequency $1/T_S$ or a main framing frequency $1/T_F$. In some embodiments information extraction device 920 can comprise a phase-locked loop. In some embodiments, information extraction device 920 can output one or more electrical sine wave signals at said characteristic frequencies, multiples thereof, or sub-harmonics thereof. In some embodiments, information extraction device 920 can comprise frame detection circuitry that examines the received framed optical pulse train and/or modulated framed optical pulse train for one or more missing pulses occurring periodically at period $T_F$ (e.g., 351, FIG. 5A) and can output on receiver output 882 synchronization pulses coinciding, e.g., with the start of each frame.

In some embodiments, information extraction device 920 can comprise header detection circuitry that examines the received signal for periodically inserted headers occurring at period $T_F$ (e.g., 351, FIG. 5A) and can output on receiver output 882, e.g., at times coinciding with the end of each header, a synchronization pulse as well as the respective value contained within the header. In some embodiments, the header can comprise the value of a timestamp counter. In some embodiments, the header can comprise state information about system 100 such as one or more logical addresses, one or more pieces of diagnostic information, etc. In some embodiments, the header can comprise control information from system 100 such as one or more reset requests, one or more master/slave assignments directed to one or more network elements of system 100, etc.

Figure 9C:
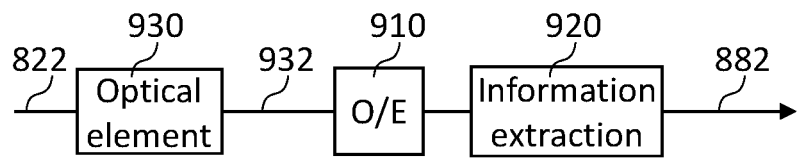

In the embodiment illustrated in FIG. 9C, O/E conversion device 910 is preceded by an optical element 930 configured to convert variously received optical frame templates 350 (or, in the case of receiver 870, loaded optical frames 350') that are encoded using parameters P of the optical field (e.g., polarizations, wavelengths, or spatial distributions) into corresponding intensity-modulated optical signal(s) 932 detectable using direct intensity detection. In some embodiments, parameters P can comprise one or more polarization states, in which case optical element 930 can comprise one or more polarizers or polarizing beam splitters. In some embodiments, parameters P can comprise various phases of the optical field, in which case optical element 930 can comprise one or more optical delay interferometers. In some embodiments, parameters P can comprise various wavelengths, in which case optical element 930 can comprise one or more optical filters. In some embodiments, parameters P can comprise various spatial modes, in which case optical element 930 can comprise one or more spatial-mode demultiplexers. The respectively pertinent choice of various optical elements to be used to convert framed optical pulse trains and/or modulated framed optical pulse trains using various parameters P to signals suitable for direct intensity detection will be understood by a person of ordinary skill in the art.

Figure 9D:
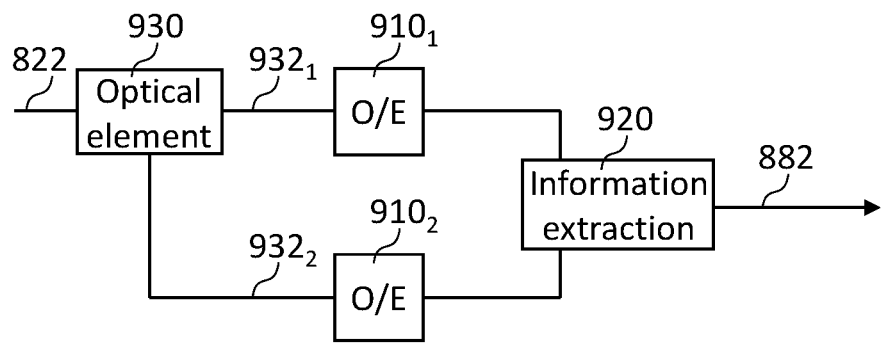

In the embodiment illustrated in FIG. 9D, various parameters P can comprise two or more optically separable parameter states, such as two orthogonal polarizations, two opposite optical phases, two or more orthogonal frequencies, or two or more orthogonal spatial modes. In such embodiments, optical element 930 can split variously encoded received optical frame templates 350 (or, in the case of receiver 870, loaded optical frames 350') into their separable parameter components, e.g., parameter component $932_1$ and $932_2$ for individual detection using two or more O/E conversion devices, e.g., $910_1$ and $910_2$. In some embodiments, parameters P can comprise various polarization states, in which case optical element 930 can comprise a polarizing beam splitter with two or more output ports. In some embodiments, parameters P can comprise various phases of the optical field, in which case optical element 930 can comprise one or more optical delay interferometers with two or more output ports. In some embodiments, parameters P can comprise various wavelengths, in which case optical element 930 can comprise a wavelength demultiplexer with two or more output ports. In some embodiments, parameters P can comprise various spatial modes, in which case optical element 930 can comprise a spatial-mode demultiplexer with two or more output ports. In some embodiments information extraction device 920 can comprise one or more difference functions to implement balanced detection.

Figure 10A:
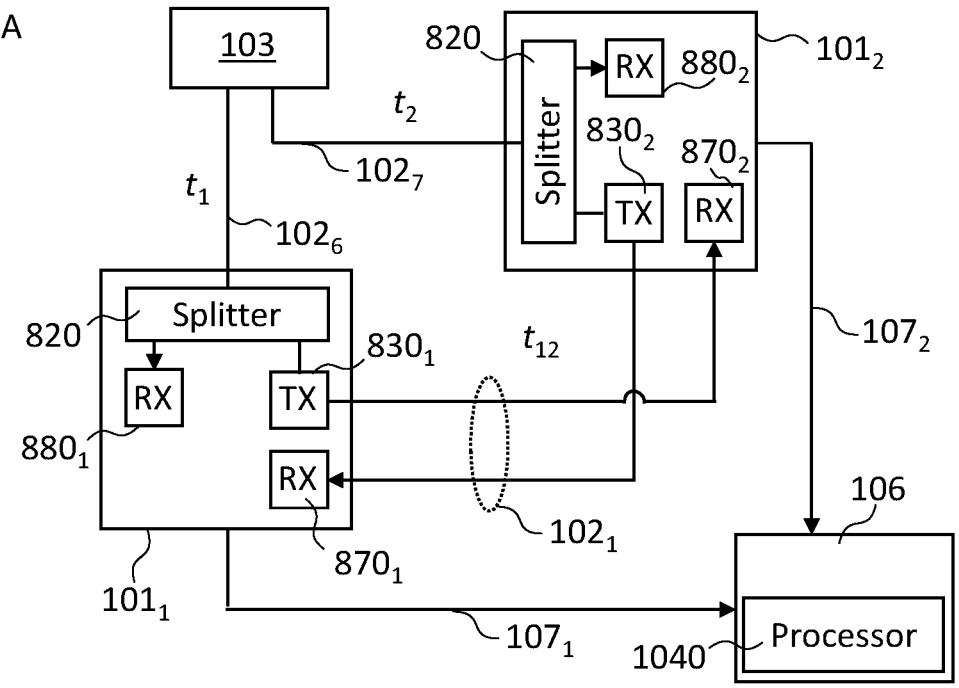
FIGS. 10A-10B illustrate a system and a method, respectively, for synchronization of various network elements that can be used in the communication system of FIG. 1 according to an embodiment.
Figure 10B:
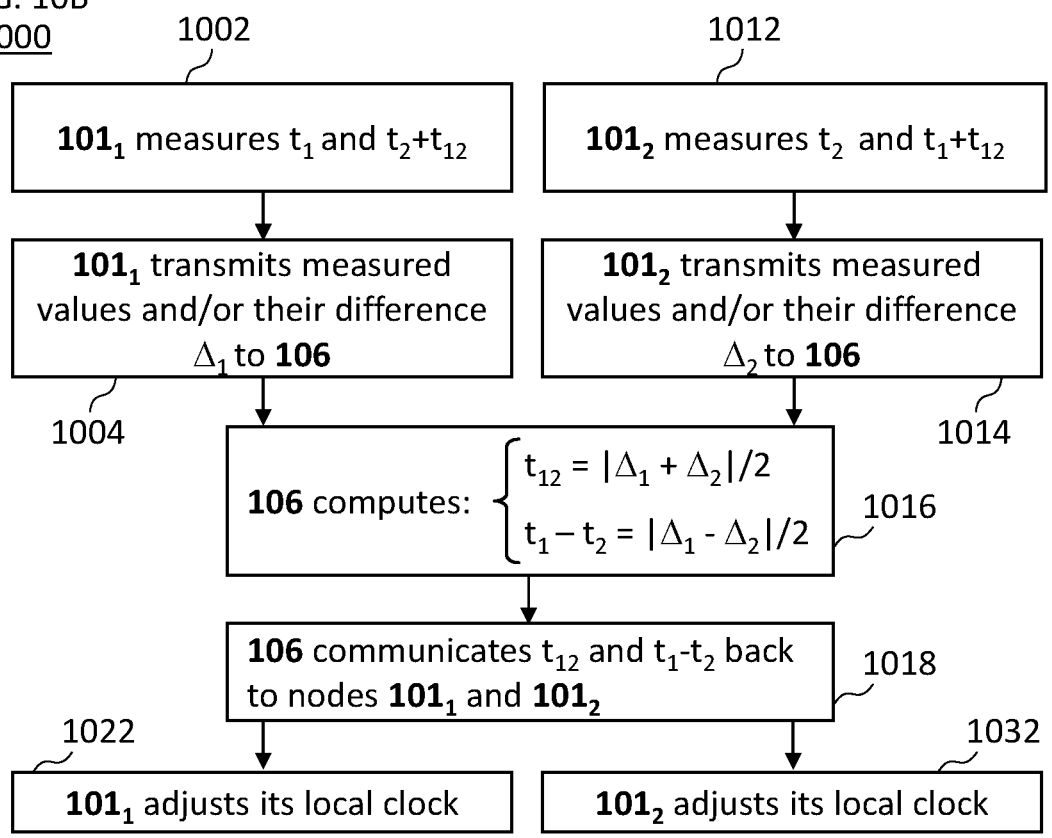

FIGS. 10A-10B illustrate a system 1001 and a method 1000, respectively, that can be used for synchronization of various network elements of system 100. In an example embodiment, system 1001 is a part of system 100, as indicated by the common reference numerals used in FIGS. 1 and 10A.

FIG. 10A shows a bock diagram of system 1001 according to an embodiment. As shown, system 1001 includes network elements $101_1$, $101_2$, 103, and control system 106 (also see FIG. 1) including a processor 1040. In operation, optical power supply module 103 of system 1001 produces a sequence 200 of optical frame templates 350 comprising framing information (e.g., 351, FIG. 5A) and/or one or more time stamps (e.g., 351, FIG. 5B) and supplies (attenuated) replica of said sequence(s) 200 to nodes $101_1$ and $101_2$ via links $102_6$ and $102_7$, respectively. Optical receiver (RX) $880_1$ of node $101_1$ extracts a frame delimiter or time stamp $T_0$ from the sequence 200 received from node 103 on link $102_6$ and records its local time $t_1$ coinciding with the extracted time stamp $T_0$. Optical receiver $880_2$ of network element $101_2$ extracts the same time stamp $T_0$ from the sequence 200 received from node 103 on link $102_7$ and records its local time $t_2$ coinciding with the extracted frame delimiter or time stamp $T_0$.

In one embodiment, in order to extract a frame delimiter or a timestamp from the sequence 200, optical receiver 880 examines the received signal for features that periodically occur at the known frame rate $1/T_F$, such as one or more missing optical pulses (e.g., 351, FIG. 5A) or a periodically occurring counter value that increases each $T_F$ (e.g., 351, FIG. 5B). Once a few (e.g., 3, 5, or 10) occurrences of an expected pattern at rate $1/T_F$ have been detected during a start-up phase of operation, optical receiver 880 is synchronized with the frame rate and is able to properly record its local time at which each subsequent frame delimiter or synchronization timestamp occurs.

Optical transmitter (TX) $830_2$ of node $101_2$ uses a replica of the sequence of nascent optical frames received on link $102_7$ as an optical power supply to modulate onto its frame bodies information destined to node $101_1$. Optical receiver $870_1$ of network element $101_1$ receives said sequence of modulated optical frames, extracts time stamp $T_0$, and records its local time $t_2+t_{12}$ coinciding with time stamp $T_0$. Here, $t_{12}$ represents the communication delay between nodes $101_1$ and $101_2$. Similarly, optical transmitter $830_1$ of node $101_1$ uses a replica of said sequence of nascent optical frames received on link $102_6$ as an optical power supply to modulate onto its frame bodies information destined to node $101_2$. Optical receiver 8702 of network element $101_2$ receives said sequence of modulated optical frames, extracts time stamp $T_0$, and records its local time $t_1+t_{12}$ coinciding with time stamp $T_0$.

Node $101_1$ communicates its recorded local times $t_1$ and $t_2+t_{12}$ and/or its recorded local time difference $\Delta_1=t_1-(t_2+t_{12})$ to processor 1040 of control system 106 on link $107_1$. Node $101_2$ communicates its recorded local times $t_2$ and $t_1+t_{12}$ and/or its recorded local time difference $\Delta_2=t_2-(t_1+t_{12})$ to processor 1040 of control system 106 on link $107_2$.

FIG. 10B shows a flow chart of a synchronization method 1000 according to an embodiment.

At steps 1002 and $101_2$, nodes $101_1$ and $101_2$, respectively, measure locally recorded times $\{t_1, t_2+t_{12}\}$ and $\{t_2, t_1+t_{12}\}$ and, at steps 1004 and $101_4$, communicate these measurements and/or their recorded local time differences $\Delta_1$ and $\Delta_2$ to processor 1040 of control system 106.

At step 1016, processor 1040 of control system 106 calculates the sum of $\Delta_1$ and $\Delta_2$ as $\Sigma_{12}=\Delta_1+\Delta_2=-2t_{12}$ and the difference of $\Delta_1$ and $\Delta_2$ as $\Delta_{12}=\Delta_1-\Delta_2=2(t_1-t_2)$ and thereby acquires knowledge of the communication delay $t_{12}$ between nodes $101_1$ and $101_2$ as well as of the propagation delay difference $(t_1-t_2)$ between optical power supply module 103 and, respectively, nodes $101_1$ and $101_2$.

At step 1018, processor 1040 of control system 106 communicates the calculated communication delay $t_{12}$ between nodes $101_1$ and $101_2$ as well as the propagation delay difference $(t_1-t_2)$ between optical power supply module 103 and, respectively, nodes $101_1$ and $101_2$, back to nodes $101_1$ and $101_2$.

At steps 1022 and 1032, nodes $101_1$ and $101_2$ use the information received at step 1018 to calibrate their local clocks relative to the timestamps received from optical power supply module 103. For example, in some embodiments, node $101_1$ can be configured to assume a master role in system 100 and node $101_2$ can be configured to assume a slave role. In this configuration, node $101_1$ can adjust its local clock to always match the respective timestamp received from optical power supply module 103, i.e., the value $V_1$ of the synchronization counter 351 of FIG. 5B received by node $101_1$ multiplied by the frame duration $T_F$ can represent absolute time $V_1 T_F$ at node $101_1$. Node $101_2$ can adjust its local clock to match the respective timestamp value $V_2$ received from optical power supply module 103 plus the propagation delay difference $(t_1-t_2)$, i.e., absolute time at note $101_2$ can be obtained as $V_2 T_F+(t_1-t_2)$.

In some embodiments, node $101_1$ can be configured to communicate information to node $101_2$ such that the information arrives at node $101_2$ precisely at time $t_0$. In this case, node $101_1$ can send its information to node $101_2$ when its local clock reads $t_0-t_{12}$.

In some embodiments, control system 106 can use its retrieved information for synchronization purposes across more than one network element of system 100. A person of ordinary skill in the art will understand that the above algorithm described for three network elements can be extended without limitation to an arbitrarily large network of arbitrarily many network elements.

In some embodiments, control system 106 can be a separate physical entity (e.g., a computer). In some embodiments, control system 106 can be distributed among different physical entities (e.g., among the network elements of system 100).

While system elements and method are described herein as examples for nodes 101, other network elements, such as nodes 103, 104, and 105 can also comprise the described optical communication elements that allow them to take part in the described time synchronization method. Hence any descriptions directed towards nodes 101 should not be construed as limiting to nodes 101 but apply equally to other network elements such as one or more optical power supply modules 103, optical multiplexing units 104, or optical switching units 105.

In some implementations, the optical power supply module 103 of FIG. 2, 4A, 4B, 4C, 6A, 6B, or 6C can be used to synchronize remote radio heads (RRH) in multi-antenna wireless systems or phased-array radar systems in the process of synthesizing directional antenna beams to improve beam steering and/or beam shaping. In the following, we first describe an example of a conventional multi-antenna wireless system, then describe an improved multi-antenna wireless system that incorporates the optical power supply module 103.

In some examples, synthesizing directional antenna beams in multi-antenna wireless systems or phased-array radar systems to achieve beam steering and/or beam shaping uses N radio waves emitted from N antennas (or remote radio heads) to have a well-defined phase relationship, e.g., chosen such that the N radio waves interfere constructively at the location of the intended mobile user (in the case of the multi-antenna wireless system) or at the location of the target (in the case of phased-array radar system). In some examples, multi-antenna wireless systems and phased-array radar systems can include co-located antenna elements fed by a single communication link or spatially distributed antenna elements fed by multiple independent communication links. Establishing and maintaining a well-defined phase relationship between spatially distributed antenna elements fed by multiple independent communication links may be more difficult. In the case of a multi-antenna wireless system, the correct phase relationship to be transmitted from a baseband processing unit (BBU) to the N antennas can be estimated from pilot signals $s_P(t)$ that are first transmitted by a mobile user and received by the baseband processing unit, e.g., whereby the baseband processing unit adjusts a phase correction term so as to maximize the received signal strength received from the mobile user. This process is described in more detail below.

In this document, when we say signals are transmitted from or received by a mobile user, we mean that the signals are transmitted from or received by a mobile device of the user. The mobile device can be, e.g., a cellular phone, a laptop computer, a tablet computer, a camera, a smart watch, a smart headset, smart eyeglasses, a radio, a positioning device, a navigation device, a robot, a vehicle configured to move in air, a vehicle configured to move in or on water, or an aerial, ground, or water vehicle driving guidance device.

A "remote radio head" can be a single localized unit including electronics and an antenna, but can also be a distributed unit in which some of the electronic components are physically separated from the antenna. For example, a remote radio heat can include: (i) a unit at the bottom of a cell tower that includes optical or electrical communication interfaces towards the network, electronic processing, and optical or electrical communication interfaces towards the top of the cell tower, (ii) a unit at the top of the cell tower that includes further electronics, (iii) a unit at the top of the cell tower that includes one or more antennas, and (iv) optical or electrical cabling connecting (i) to (iii).

Figure 11:
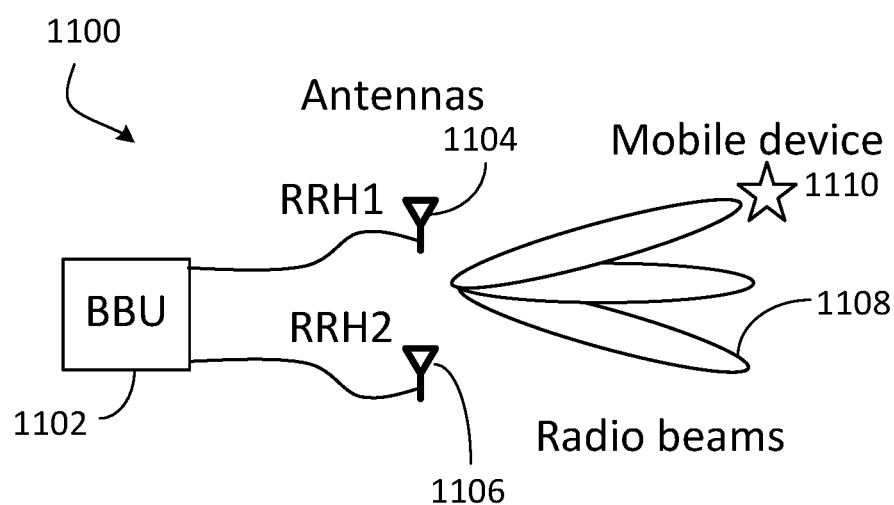
FIG. 11 is a diagram of an example multi-antenna wireless system.

FIG. 11 is a diagram of an example multi-antenna wireless system 1100 that includes a baseband processing unit (BBU) 1102, a first remote radio head 1104 and a second remote radio head 1106. In this example, two remote radio heads are shown (N=2), but it is understood that additional remote radio heads can be used, that these can be spatially co-located or distributed, and that, although called RRH herein, 1104 and 1106 can also be two elements of a multi-element antenna array, irrespective of whether or not they include all the various sub-systems typically associated with an RRH. The first and second remote radio heads 1104, 1106 generate radio waveforms that combine (e.g., interfere) and form directional beams 1108. By adjusting the phase relationships of the radio waveforms transmitted by the first and second remote radio heads 1104, 1106, it is possible to steer the directional beams 1108 toward arbitrary directions, such as toward a mobile device 1110.

Figure 12:
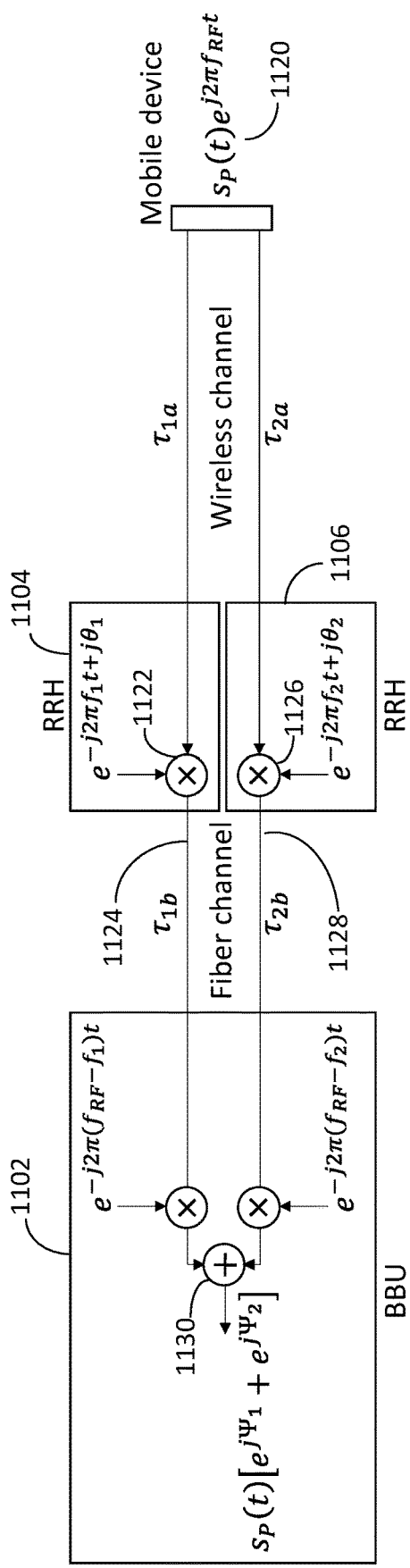
FIG. 12 is a diagram of an example of a pilot training phase.

There are multiple ways to estimate and control radio phase information in wireless systems as known in the art. One such method is shown in FIG. 12. During a pilot training phase, the mobile device 1110 transmits pilot signals (complex envelope $s_P(t)$) modulated onto radio-frequency carrier $f_{RF}$, i.e. $s_P(t)e^{j2\pi f_{RF} t}$ 1120 to the first and second remote radio heads 1104, 1106. There is a propagation delay of $\tau_{1a}$ and $\tau_{2a}$ from the mobile device 1110 to the first remote radio head 1104 and the second remote radio head 1106, respectively. The first remote radio head 1104 uses a first mixer 1122 fed by a local oscillator at frequency $f_1$ to demodulate the radio frequency pilot signal $s_P(t)$ 1120 to produce a lower-frequency signal, e.g., an intermediate-frequency signal or a baseband signal 1124, collectively referred to as a "baseband signal" herein, and sends the (typically digitally sampled) baseband signal 1124 to the baseband processing unit 1102. As the signal 1124 travels from the first mixer 1122 to the baseband processing unit 1102, there is a propagation delay of $\tau_{1b}$. The second remote radio head 1106 uses a second mixer 1126 fed by a local oscillator at frequency $f_2$ to demodulate the radio frequency pilot signal $s_P(t)$ 1120 to produce a baseband signal 1128, and sends the baseband signal 1128 to the baseband processing unit 1102. As the signal 1128 travels from the second mixer 1126 to the baseband processing unit 1102, there is a propagation delay of $\tau_{2b}$. Typically, $f_1 \approx f_2 = f$ so that any small difference between $f_1$ and $f_2$ can be captured by a slowly time varying phase, i.e., the unknown phase difference $\theta_1$ and $\theta_2$ of the local radio frequency oscillators can become slowly-varying functions of time, $\theta_1(t)$ and $\theta_2(t)$. For ease of notation, this time dependence is omitted in subsequent equations. The baseband processing unit 1102 combines the baseband signals 1124 and 1128 using an adder 1130 to generate a combined signal:

$$s_P(t)e^{j2\pi f_{RF} t}[e^{-j2\pi ft+j\Psi_1}e^{-j2\pi(f_{RF}-f)t}+e^{-j2\pi ft+j\Psi_2}e^{-j2\pi(f_{RF}-f)t}] = s_P(t)[e^{j\Psi_1}+e^{j\Psi_2}]$$

The unknown phase variables $\Psi_1$ and $\Psi_2$ can contain an unknown phase difference $\theta_1$ and $\theta_2$ of the local radio frequency oscillators of the remote radio heads 1104, 1106 and unknown propagation delay differences $\tau_{1a}, \tau_{1b}, \tau_{2a}, \tau_{2b}$. The baseband processing unit 1102 determines the phase variables $\Psi_1$ and $\Psi_2$ that maximize the received signal strength:

$$\max_{\Psi_1, \Psi_2} s_P(t)[e^{j\Psi_1} + e^{j\Psi_2}],$$

e.g., $\Psi_1 - \Psi_2 = 2\pi k$ with an integer value of k. The determined phase variables $\Psi_1$ and $\Psi_2$ reflect the channel at a certain carrier frequency and can be used to transmit data signals $s_D(t)$ at maximum constructive interference towards the mobile device 1110, for a time interval during which the randomly varying parameters do not change substantially.

Figure 13:
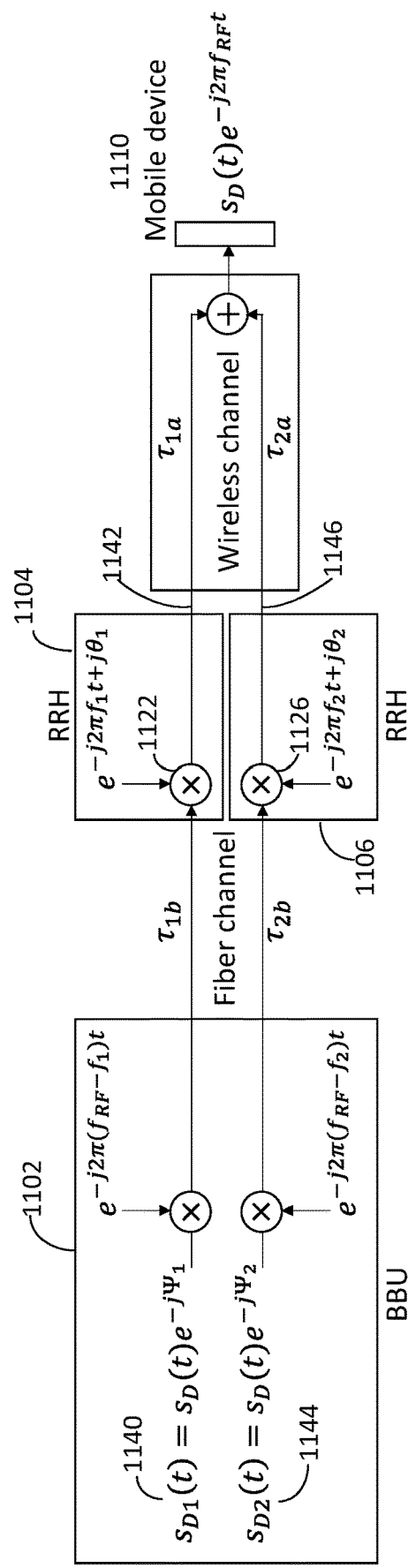
FIG. 13 is a diagram of an example of a transmit beam shaping phase.

Referring to FIG. 13, after determining the phase variables $\Psi_1$ and $\Psi_2$, the baseband processing unit 1102 transmits a first baseband data signal $$s_{D1}(t) = s_D(t)e^{-j2\pi(f_{RF}-f)t-j\Psi_1}$$

1140 to the first remote radio head 1104. As the signal travels from the baseband processing unit 1102 to the first remote radio head 1104, there is a propagation delay $\tau_{1b}$. The first remote radio head 1104 converts the first baseband data signal $s_{D1}(t)$ 1140 to a radio frequency signal 1142 by mixing, at the first mixer 1122, the first baseband data signal $s_{D1}(t)$ 1140 with the same radio frequency carrier as used for the received (pilot) signal. The first remote radio head 1104 sends the radio frequency signal 1142 to the mobile device 1110. As the signal travels from the first remote radio head 1104 to the mobile device 1110, there is a propagation delay of $\tau_{1a}$. The baseband processing unit 1102 transmits a second baseband data signal $s_{D2}(t)$ 1144 to the second remote radio head 1106. As the signal travels from the baseband processing unit 1102 to the second remote radio head 1106, there is a propagation delay $\tau_{2b}$. The second remote radio head 1106 converts the second baseband data signal $s_{D2}(t)$ 1144 to a radio frequency signal 1146 by mixing, at the second mixer 1126, the second data signal $s_{D2}(t)$ 1144 with the same radio frequency carrier as used for the received (pilot) signal. The second remote radio head 1106 sends the radio frequency signal 1146 to the mobile device 1110. As the signal travels from the second remote radio head 1106 to the mobile device 1110, there is a propagation delay of $\tau_{2a}$. The first and second radio frequency signals 1142 and 1146 combine (e.g., interfere) and form a directional beam that is directed towards the mobile device 1110, leading to the signal $s_D(t)e^{-j2\pi f_{RF} t}$ received by the mobile device.

In general, in a multi-antenna wireless system that includes N antennas, the phase relationship between N antenna paths, and the phase and frequency stability of the local radio frequency carriers, need to be maintained over a time interval over which (a) the radio channel does not substantially change, and (b) the validity of the pilot estimation is still accurate. If the phase relationship changes within that time interval, the resulting beam forming will also change in an undesired way.

In some implementations, a baseband processing unit generates the baseband equivalent signals to be modulated onto a radio frequency carrier at the remote radio heads (RRHs). For non-local remote radio heads, the carrier signals having frequencies $f_1$ and $f_2$ can be generated using individual radio frequency oscillators, which can have a frequency stability within a certain parts per million (ppm) range. The smaller the frequency stability (or the more stable the frequency is), the more expensive the radio frequency oscillator will be.

In some implementations, in order for the first and second radio frequency signals 1142 and 1146 in the example of FIG. 13 to properly combine (e.g., interfere) and be directed to the mobile device 1110, the phases of the radio frequency signals 1142 and 1146 transmitted by the two remote radio heads 1104, 1106 need to be synchronized, and the timing of the signals needs to be accurate to a fraction of the period of the radio frequency carrier. For example, if a 1 GHz radio frequency carrier signal is used, the period of the carrier signal is 1 ns, and the timing of the radio frequency signals 1142 and 1146 should be accurate to within a range of, e.g., 10 to 100 ps. Thus the baseband processing unit 1102 needs to control the relative synchronization of the remote radio heads 1104, 1106 to within a range of, e.g., 10 to 100 ps in order for the wireless signals transmitted from the remote radio heads 1104, 1106 to have sufficiently aligned phase and frequency so that the combined wireless signals form a directional beam that is directed at the intended direction, i.e., directed toward the mobile device 1110. If a 1 GHz radio frequency carrier signal is used, and the baseband processing unit 1102 cannot control the relative synchronization of the remote radio heads 1104, 1106 to within a range of, e.g., 10 to 100 ps, the combined wireless signal can form a directional beam that is not principally directed toward the mobile device 1110, resulting in a higher interference or noise at the mobile device 1110. In some implementations, the local oscillators of the mixers 1122 and 1126 are correlated in which the mixers 1122 and 1126 have crystals that are highly synchronized (e.g., by using GPS receivers or atomic clocks for synchronization). Such synchronization mechanisms are typically expensive. In some other implementations, the local oscillators of the mixers 1122 and 1126 are designed to emit RF sine waves at an accurately defined frequency that remains stable over relevant time intervals (e.g., tens or hundreds of milliseconds) and over environmental conditions (e.g., temperature). Such highly accurate and stable crystals are typically expensive.

As an alternative to using expensive radio frequency oscillators and/or complex synchronization mechanisms, in some implementations, synchronization signals can be sent together with $s_{D1}(t)$ and $s_{D2}(t)$ to establish a common frequency ($f_1=f_2$) and a common radio frequency phase ($\theta_1=\theta_2$) across multiple remote radio heads. One such frequency reference can be provided by sending an unmodulated pulse train or a pulse train carrying optical frame templates from the baseband processing unit to the remote radio heads, described in more detail below.

Figure 14:
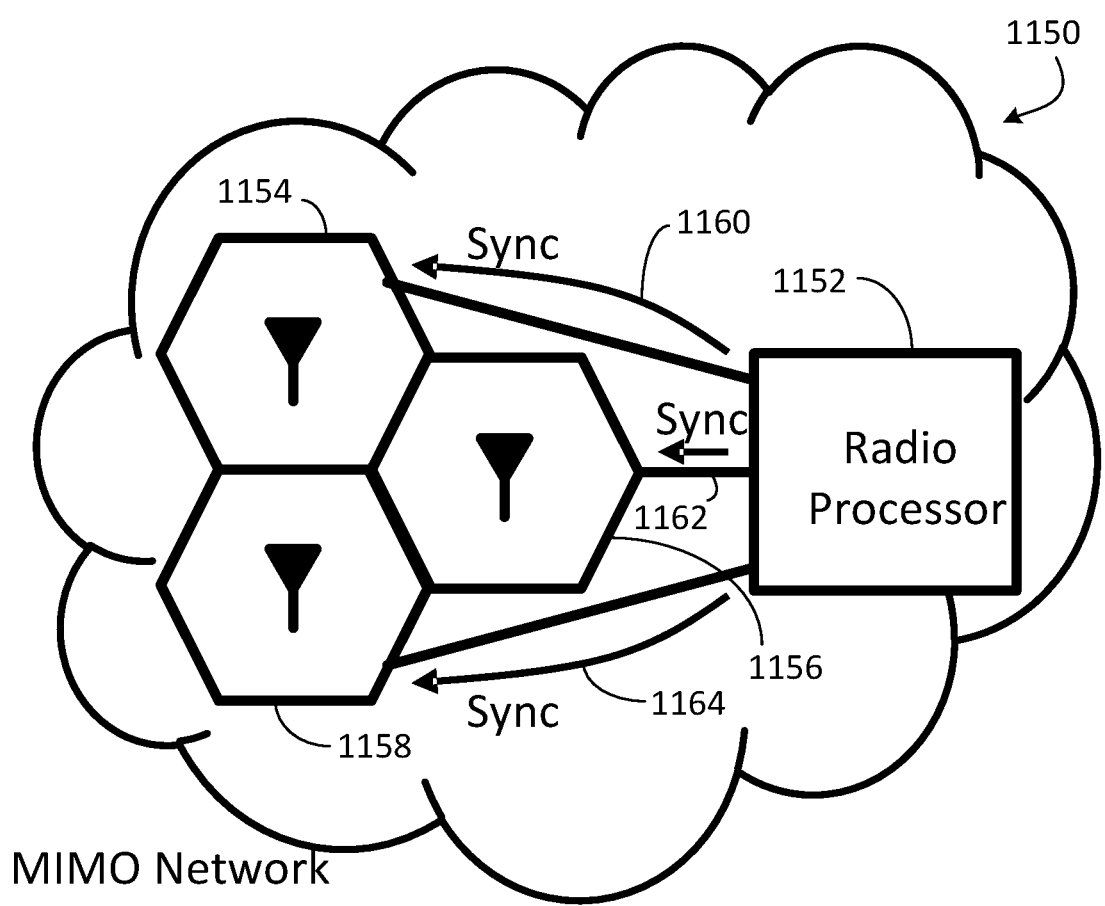
FIGS. 14 and 15 are diagrams of examples of multi-cell multiple-input and multiple-output (MIMO) wireless systems.

Referring to FIG. 14, in some implementations, a multiple-input and multiple-output (MIMO) wireless system 1150 includes a radio processor 1152 that sends baseband signals to remote antennas or remote radio heads 1154, 1156, and 1158, which convert the baseband signals to radio frequency signals that are broadcast and combine (e.g., interfere) to form directional beams. One of the features of the system 1150 is that accurate phase and frequency information can be provided to the remote antennas or remote radio heads. For example, the radio processor 1152 synchronizes the remote radio heads 1154, 1156, and 1158 using optical synchronization signals 1160, 1162, and 1164 that are generated based on a common optical source, e.g., a common optical power supply module.

Figure 15:
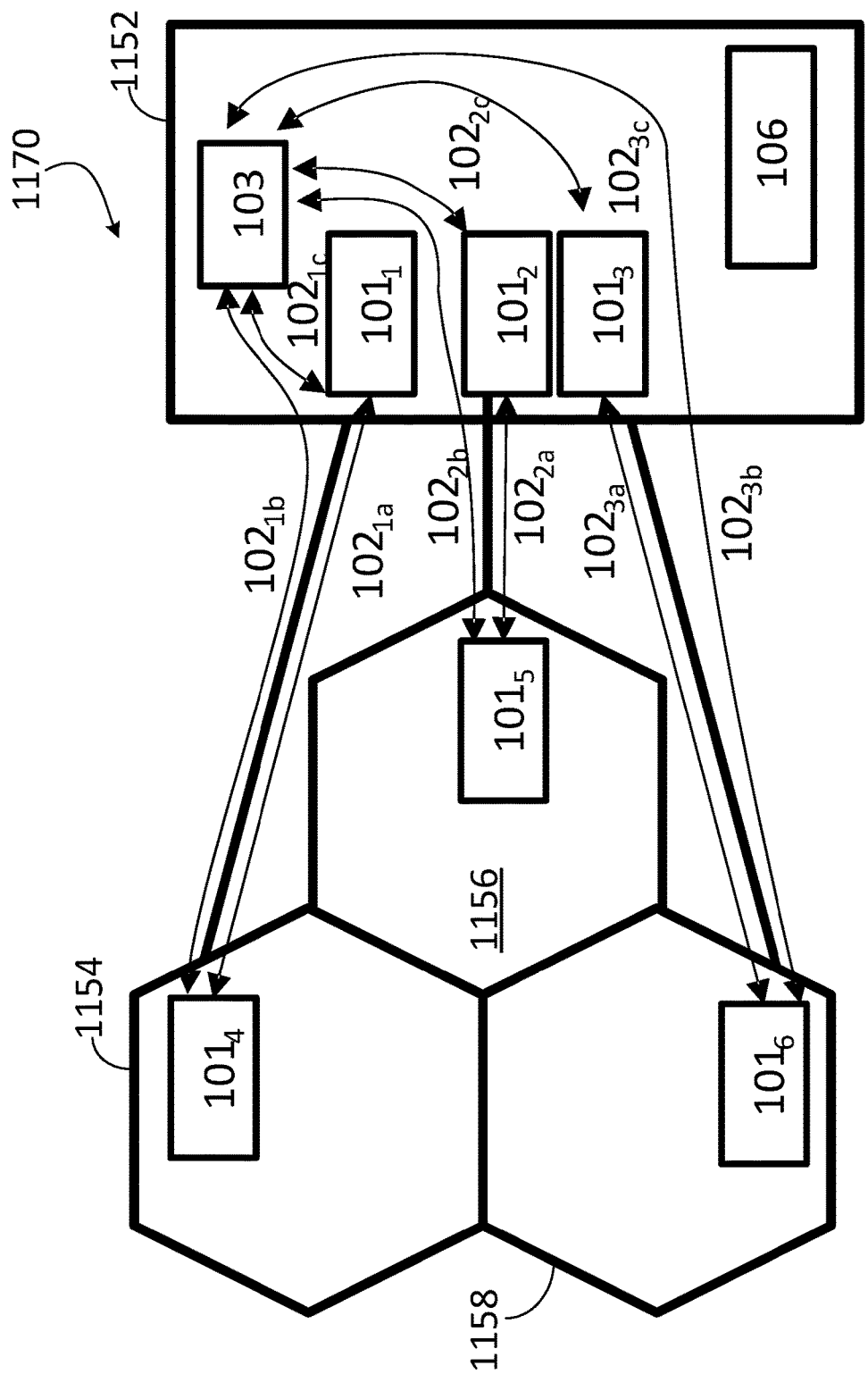

Referring to FIG. 15, in some examples, the radio processor 1152 can be implemented using an optical power supply module 103 that sends optical power supply signals (which include optical synchronization signals) to nodes $101_1$, $101_2$, $101_3$, $101_4$, $101_5$, $101_6$ through optical links $102_{1c}$, $102_{2c}$, $102_{3c}$, $102_{1b}$, $102_{2b}$, $102_{3b}$, respectively. The optical power supply module 103 can be configured similar to, e.g., the examples shown in FIG. 2, 4A, 4B, 4C, 6A, 6B, or 6C. Each of the nodes $101_1$, $101_2$, $101_3$, $101_4$, $101_5$, $101_6$ can be a transponder that includes modules similar to those of the transponder 800 of FIG. 8. The optical power supply signals provided by the optical power supply module 103 can include, e.g., a sequence 200 of optical frame templates 350 (FIG. 3A), a sequence 300 of optical frame templates 350' (FIG. 3B), or a sequence 200 of signals (FIG. 5A, 5B, 5C, or 5D). In some implementations, an unmodulated (frame-less) pulse source can be used to only transfer a frequency reference, not an absolute time.

For example, the nodes $101_1$, $101_2$, and $101_3$ can be part of the radio processor 1152. The radio processor 1152 also includes a control system 106 (which can be the same or similar to the control system 106 shown in FIG. 1) configured to control the operations of the optical power supply module 103 and the nodes $101_1$, $101_2$, and $101_3$.

In some implementations, the remote radio head 1154 includes the node $101_4$ and a local oscillator that oscillates at a frequency $f_1$. The remote radio head 1156 includes the node $101_5$ and a local oscillator that oscillates at a frequency $f_2$. The remote radio head 1158 includes the node $101_6$ and a local oscillator that oscillates at a frequency $f_3$. For example, optical signals can be transmitted between the transponders $101_1$, $101_2$, $101_3$ and the corresponding transponders $101_4$, $101_5$, $101_6$ through optical links $102_{1a}$, $102_{2a}$, $102_{3a}$, respectively. The transponders $101_4$, $101_5$, and $101_6$ recover the absolute frequency from the optical power supply signals. Because there is only one optical pulse source, i.e., the optical power supply module 103, the frequency at the various remote radio heads 1154, 1156, 1158 can be the same (or almost the same with negligible difference), and the remote radio heads 1154, 1156, 1158 can use the frequency information to synchronize the local oscillators to have the same frequency, $f_1=f_2=f_3$ (or almost the same frequency with negligible difference). This allows the remote radio heads to generate directional beams with accurate beam steering and/or beam shaping.

Figure 16:
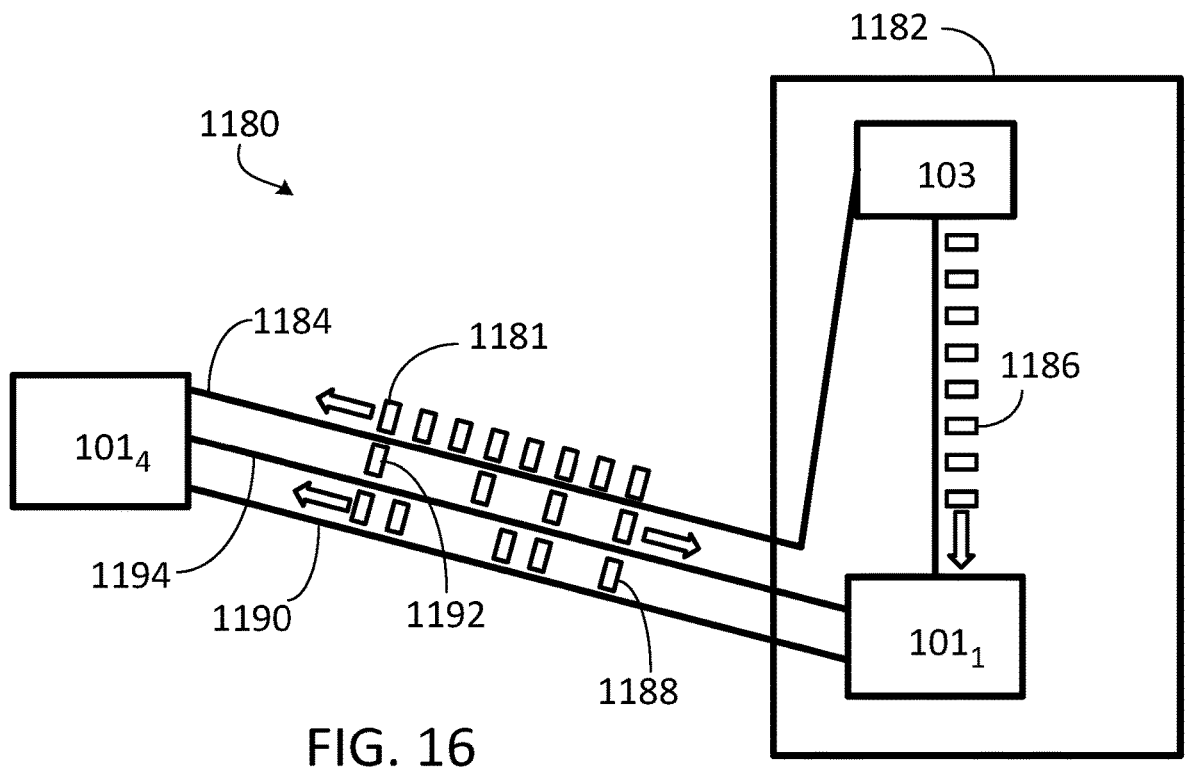
FIGS. 16 to 20 are diagrams showing examples of communication links between the radio processor and the remote radio head.
Figure 17:
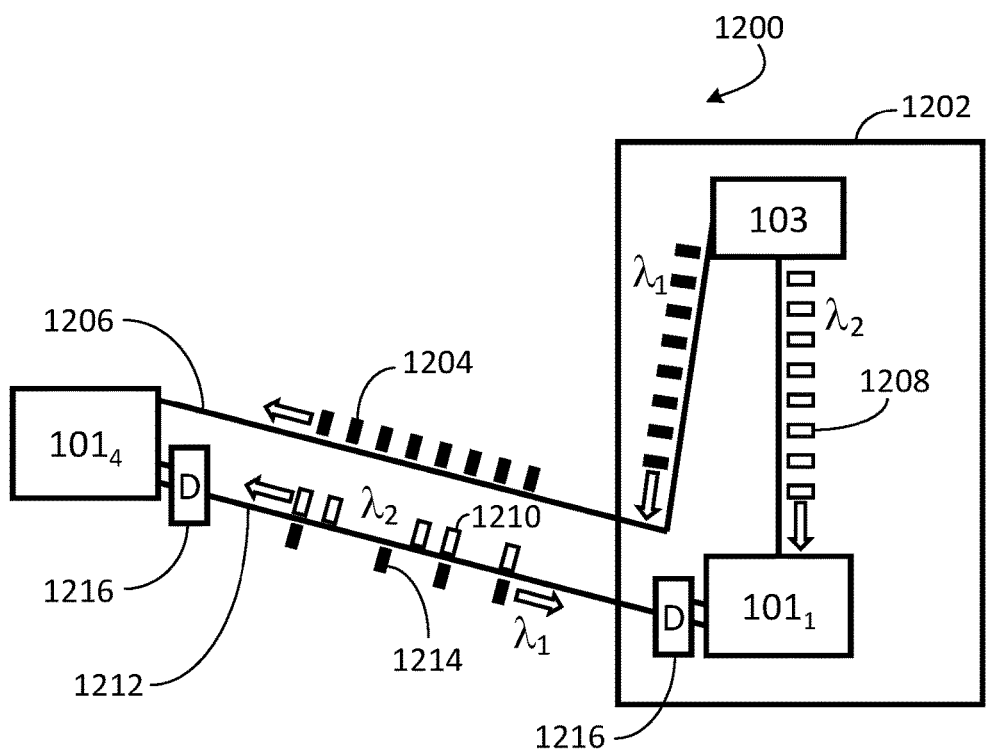
Figure 18:
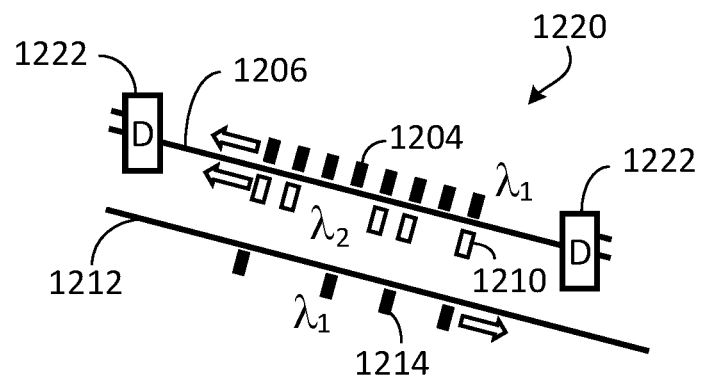
Figure 19:
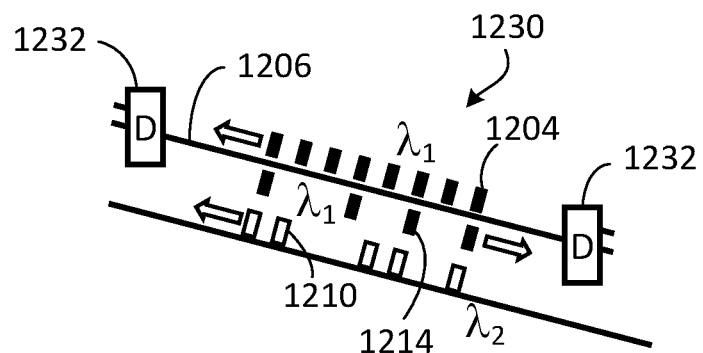
Figure 20:
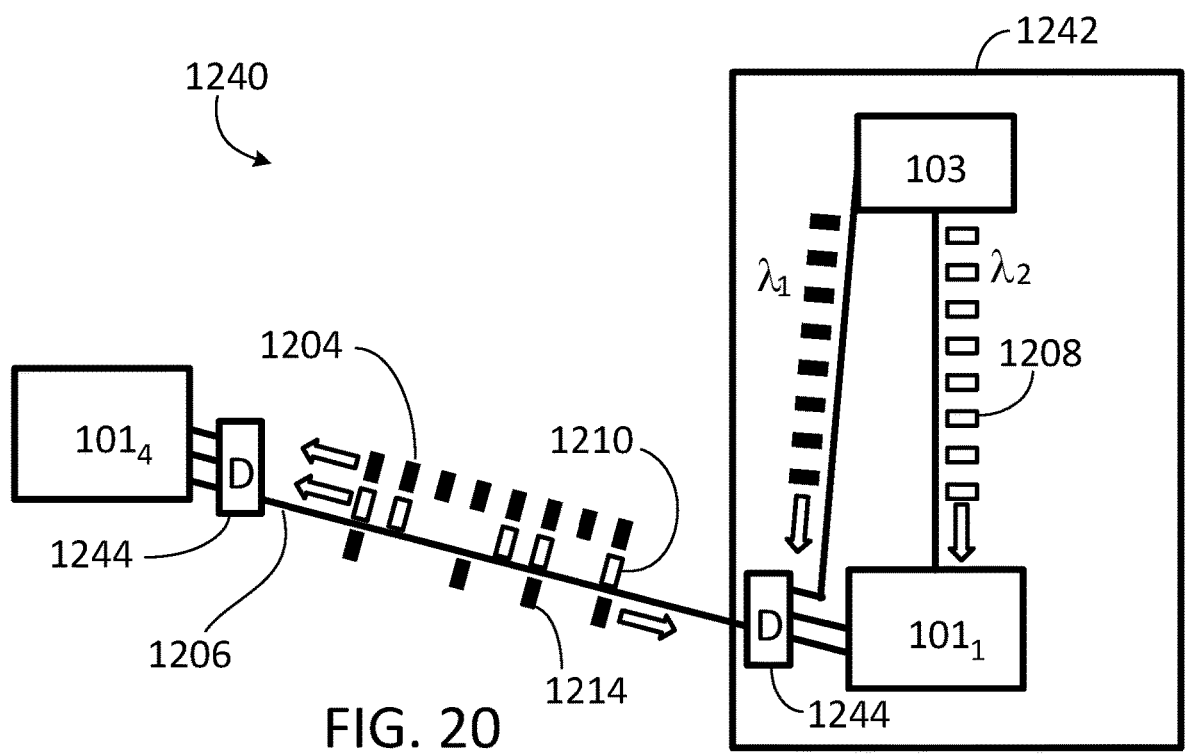

The optical links $102_{1a}$, $102_{1b}$, $102_{2a}$, $102_{2b}$, $102_{3a}$, $102_{3b}$ can include various optical fiber configurations. FIG. 16 shows an example in which three optical fibers are provided between the radio processor and the transponder in the remote radio head. FIGS. 17 to 19 show examples in which two optical fibers are provided between the radio processor and the transponder in the remote radio head. FIG. 20 shows an example in which a single optical fiber is used between the radio processor and the transponder in the remote radio head.

Referring to FIG. 16, in some implementations, a multi-antenna wireless system 1180 includes a radio processor 1182 that includes an optical power supply module 103 and a transponder $101_1$. The optical power supply module 103 sends an optical power supply signal 1181, which can include an optical pulse train and optical synchronization signals, to the transponder $101_4$ through a first optical fiber 1184. The optical power supply module 103 also sends an optical power supply signal 1186 to the transponder $101_1$. The transponder $101_1$ generates a first signal 1188 based on the optical power supply signals 1186 (e.g., by modulating the optical pulses in the optical power supply signals 1186), and sends the first signal 1188 to the transponder $101_4$ through a second optical fiber 1190. For example, the first signal 1188 can include data and/or control signals. The transponder $101_4$ generates a second signal 1192 based on the optical power supply signals 1181 (e.g., by modulating the optical pulses in the optical power supply signals 1181) and sends the second signal 1192 through a third optical fiber 1194. In this example, three different optical fibers 1184, 1190, and 1194 are used, any wavelength can be used on any of the optical fibers 1184, 1190, and 1194, and the same wavelength can be used for the signals 1181, 1188, and 1192. For example, the optical power supply module 103 can be a single-wavelength optical power supply. For example, the optical power supply module 103 can have a configuration similar to the example shown in FIG. 4A, 4B, 4C, 6A, or 6B, in which an optical splitter similar to the optical splitter 480 splits an optical power supply signal to generate the optical power supply signals 1181 and 1186.

Referring to FIG. 17, in some implementations, a multi-antenna wireless system 1200 includes a radio processor 1202 that includes an optical power supply module 103 and a transponder $101_1$. The optical power supply module 103 is configured to generate optical power supply signals with multiple wavelengths. For example, the optical power supply module 103 can have a configuration similar to the example shown in FIG. 6C. For example, the optical power supply module 103 sends a first optical power supply signal 1204 having a first wavelength λ1 to the transponder $101_4$ through a first optical fiber 1206. The optical power supply module 103 also sends a second optical power supply signal 1208 having a second wavelength λ2 to the transponder $101_1$. The transponder $101_1$ generates a first optical signal 1210 having the second wavelength λ2 based on the optical power supply signal 1208 (e.g., by modulating the optical pulses in the optical power supply signal 1208), and sends the first optical signal 1210 to the transponder $101_4$ through a second optical fiber 1212. For example, the first signal 1210 can include data and/or control signals. The transponder $101_4$ generates a second optical signal 1214 having the first wavelength λ1 based on the optical power supply signal 1204 and sends the second optical signal 1214 through the second optical fiber 1212 to the transponder $101_1$. In this example, the optical power supply 103 generates pulse trains at two different wavelengths (λ1 for upstream modulation by $101_4$ and λ2 for downstream modulation by $101_1$). The system 1200 provides (de)multiplexing elements D 1216 on the optical fiber 1212, in which the (de)multiplexing element D 1216 can be a wavelength (de)multiplexer, an optical power splitter, or a circulator.

Referring to FIG. 18, in some implementations, a system 1220 provides (de)multiplexing elements D 1222 on the optical fiber 1206, in which both the optical power supply signal 1204 (having the wavelength λ1) and the optical signal 1210 (having the wavelength λ2) are transmitted on the first optical fiber 1206. In this example, the (de)multiplexing element D 1222 can be a wavelength (de)multiplexer.

Referring to FIG. 19, in some implementations, a system 1230 provides (de)multiplexing elements D 1232 on the optical fiber 1206, in which the optical power supply signal 1204 (having the wavelength λ1) and the optical signal 1214 (having the wavelength λ1) are transmitted on the first optical fiber 1206. In this example, the (de)multiplexing element D 1232 can be an optical power splitter or circulator.

Referring to FIG. 20, in some implementations, a multi-antenna wireless system 1240 includes a radio processor 1242 that includes an optical power supply module 103 and a transponder $101_1$. The optical power supply module 103 is configured to generate optical power supply signals with multiple wavelengths. For example, the optical power supply module 103 sends a first optical power supply signal 1204 having a first wavelength λ1 to the transponder $101_4$ through an optical fiber 1206. The optical power supply module 103 also sends a second optical power supply signal 1208 having a second wavelength λ2 to the transponder $101_1$. The transponder $101_1$ generates a first optical signal 1210 having the second wavelength λ2 based on the optical power supply signal 1208 (e.g., by modulating the optical pulses in the optical power supply signal 1208), and sends the first optical signal 1210 to the transponder $101_4$ through the optical fiber 1206. For example, the first signal 1210 can include data and/or control signals. The transponder $101_4$ generates a second optical signal 1214 having the first wavelength λ1 based on the optical power supply signal 1204 and sends the second optical signal 1214 through the optical fiber 1206 to the transponder $101_1$. The system 1240 provides (de)multiplexing elements D 1244 on the optical fiber 1206. The (de)multiplexing element D 1244 can include both a wavelength-selective filter and a directional element (optical power splitter or circulator) in order to separate the three signals.

Figure 21:
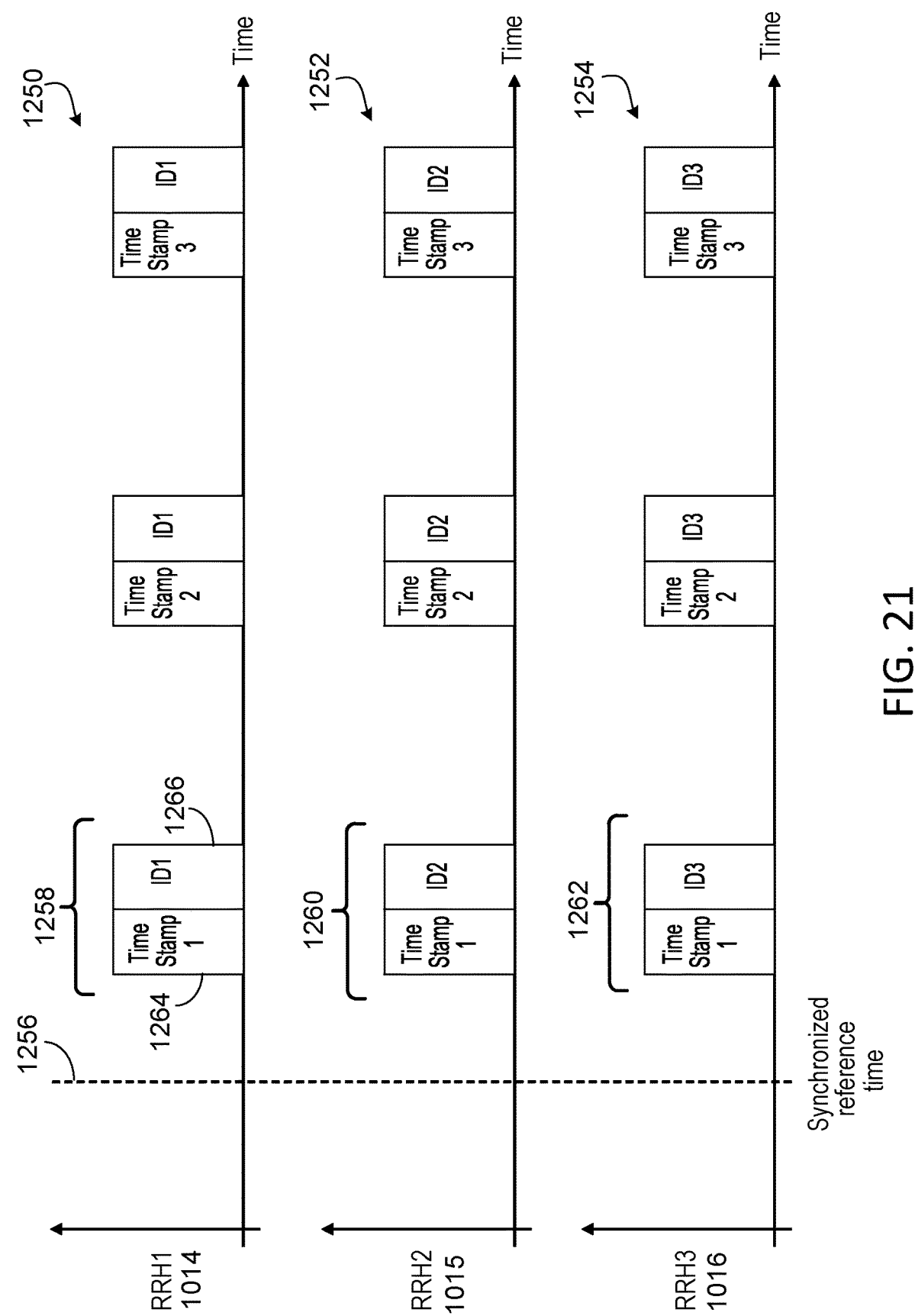
FIG. 21 shows timing diagrams of example time stamp signals.

The following describes a ranging process in which the positions of mobile users can be determined based on coordinates of the remote radio heads, and time stamps received from the remote radio heads. Referring to FIG. 21, after two or more remote radio heads (e.g., $101_4$, $101_5$, or $101_6$ in FIG. 15) are time-synchronized through a radio processor (e.g., 1152) including a control unit (e.g., 106), radio waves can be emitted by the remote radio heads in a time-synchronized manner. For example, a first diagram 1250 shows time stamp signals generated by the first remote radio head $101_4$ (RRH1), a second diagram 1252 shows time stamp signals generated by the second remote radio head $101_5$ (RRH2), and a third diagram 1254 shows time stamp signals generated by the third remote radio head $101_6$ (RRH3). As shown in the diagrams 1250, 1252, and 1254, the three remote radio heads RRH1, RRH2, and RRH3 are synchronized to a reference time 1256.

In an example embodiment, each remote radio head locally generates a sequence of periodic time stamp signals (e.g., transmitted once per microsecond, once per millisecond, or once per second) that the remote radio head transmits at a fixed time following the established synchronized reference time 1256. For example, the reference time 1256 can be locally established after each remote radio head adjusts its reference clock using, e.g., the process 1000 of FIG. 10B. For example, the first remote radio head RRH1 generates a sequence of periodic time stamp signals 1258, the second remote radio head RRH2 generates a sequence of periodic time stamp signals 1260, and the third remote radio head RRH3 generates a sequence of periodic time stamp signals 1262. Each time stamp signal can include a time stamp 1264 (e.g., a time counter) and an identifier (ID) 1266 denoting the remote radio head that the time stamp signal was transmitted from.

Figure 22:
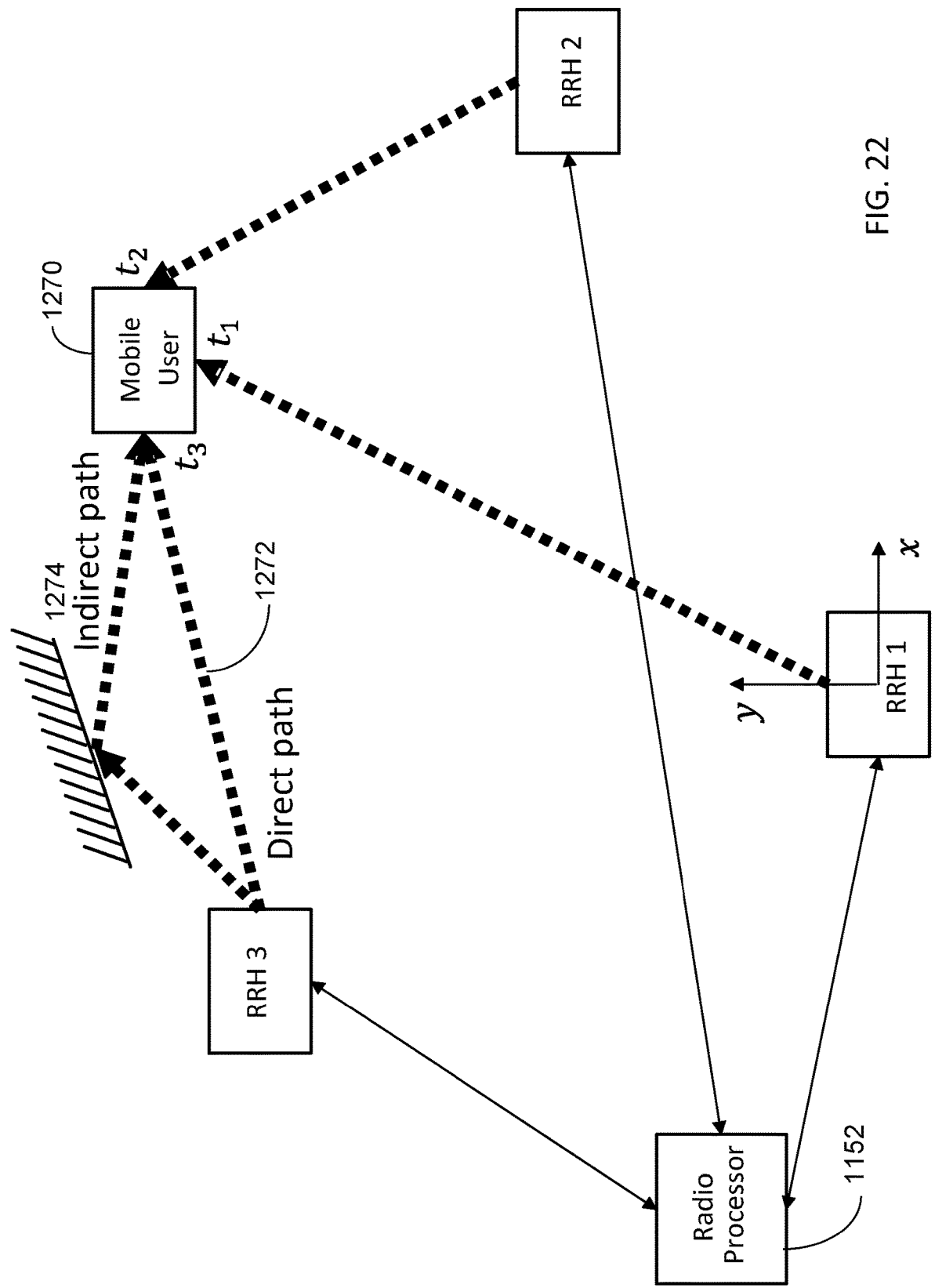
FIG. 22 is a diagram of an example environment that includes multiple remote radio heads and a mobile device.

FIG. 22 is a diagram that shows a scenario in which 3 remote radio heads RRH1, RRH2, and RRH3 are located at (x,y) positions $(x_1,y_1)=(0,0)$, $(x_2,y_2)=(2,1)$, and $(x_3,y_3)=(-1,2)$, respectively, and a mobile user 1270 is located at approximately (1.1, 2.4). The mobile user 1270 receives time stamp signals from the 3 remote radio heads RRH1, RRH2, RRH3 and records the relative time delays between receiving the time stamps: $\tau_{12}=t_1-t_2$ and $\tau_{13}=t_1-t_3$. Here, $t_1$ is the time the mobile user 1270 receives the time stamp signal containing a certain time stamp from the first remote radio head RRH1, $t_2$ is the time the mobile user 1270 receives the time stamp signal containing the same time stamp from the second remote radio head RRH2, and $\tau_{12}$ is the relative time delay between receiving the same time stamps from RRH1 and RRH2. $t_3$ is the time the mobile user 1270 receives the time stamp signal containing the same time stamp from the third remote radio head RRH3, and $\tau_{13}$ is the relative time delay between receiving the same time stamps from RRH1 and RRH3. The origin of the time stamps can be identified by the mobile user, e.g., via identifier 1266 that is part of the time stamp signal.

Figure 23:
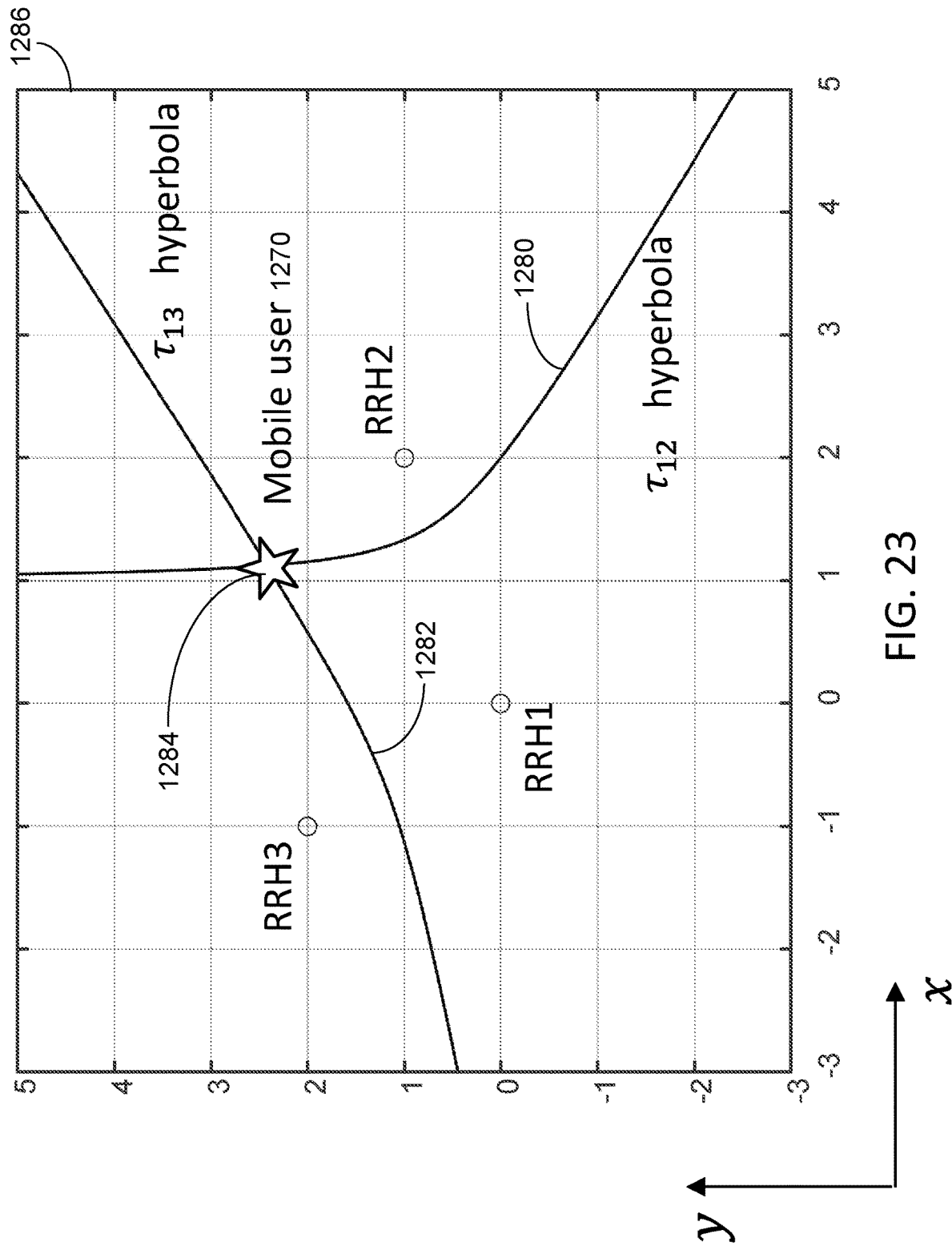
FIG. 23 is a graph showing example curves that are useful in determining the position of the mobile device.

In case of radio wave reflections, such as shown present for the signal emerging from the third remote radio head RRH3, the mobile user 1270 receives multiple versions of the time stamp signal containing the same time stamp and ID via a direct radio path 1272 and one or more indirect radio paths 1274. Among those signals, the mobile user 1270 chooses for further processing the time $t_3$ at which it receives the first of those signals, corresponding to the most direct radio path. Knowing $\tau_{12}$, $\tau_{13}$, as well as the (x,y) positions of the remote radio heads RRH1, RRH2, RRH3, the mobile user 1270 (or a central entity to which the mobile user 1270 communicates its measurements of $\tau_{12}$ and $\tau_{13}$, e.g., a central entity similar to 106 of FIG. 1) can then calculate the mobile user's position in space as follows, c denoting the speed of light: The equations $$\tau_{12}c = \sqrt{(x-x_1)^2+(y-y_1)^2} - \sqrt{(x-x_2)^2+(y-y_2)^2} \quad \text{(Equ. 1)}$$

$$\tau_{13}c = \sqrt{(x-x_1)^2+(y-y_1)^2} - \sqrt{(x-x_3)^2+(y-y_3)^2} \quad \text{(Equ. 2)}$$

describe hyperbolae, and the mobile user 1270 is located at the intersection of these hyperbolae. This is visualized in the example graph 1286 shown in FIG. 23 for $\tau_{12}c=1$ and $\tau_{13}c=0.5$ (all in normalized units), corresponding to the schematic of FIG. 22. In the graph 1286, the curve 1280 represents the hyperbola described by Equation 1, the curve 1282 represents the hyperbola described by Equation 2, and the intersection 1284 of curves 1280 and 1282 represents the location of the mobile user 1270.

The above method can be extended to include three-dimensional ranging through a 4th remote radio head. For example, the mobile user 1270 receives time stamp signals from four remote radio heads RRH1, RRH2, RRH3, RRH4 and records the relative time delays between receiving the same time stamps: $\tau_{12}=t_1-t_2$, $\tau_{13}=t_1-t_3$, and $\tau_{14}=t_1-t_4$. Here, $t_1$, $t_2$, $t_3$, $\tau_{12}$, and $\tau_{13}$ have the same definitions as described above. $t_4$ is the time the mobile user 1270 receives the time stamp signal with the same time stamp from the fourth remote radio head RRH4, and $\tau_{14}$ is the relative time delay between receiving the same time stamps from RRH1 and RRH4.

$$\tau_{12}c = \sqrt{(x-x_1)^2+(y-y_1)^2+(z-z_1)^2} - \sqrt{(x-x_2)^2+(y-y_2)^2+(z-z_2)^2} \quad \text{(Equ. 3)}$$

$$\tau_{13}c = \sqrt{(x-x_1)^2+(y-y_1)^2+(z-z_1)^2} - \sqrt{(x-x_3)^2+(y-y_3)^2+(z-z_3)^2} \quad \text{(Equ. 4)}$$

$$\tau_{14}c = \sqrt{(x-x_1)^2+(y-y_1)^2+(z-z_1)^2} - \sqrt{(x-x_4)^2+(y-y_4)^2+(z-z_4)^2} \quad \text{(Equ. 5)}$$

The intersection of $\tau_{12}c$, $\tau_{13}c$, and $\tau_{14}c$ represents the position of the mobile user 1270 in 3D space. In this document, the position of the mobile user refers to the position of the mobile device of the user.

Furthermore, the process of determining the position of the mobile user described above can be extended by not explicitly synchronizing the times at which the remote radio heads transmit their time stamp signals, but by instead knowing the delays of the transmitted time stamp signals relative to an absolute time reference established using, e.g., the process 1000 of FIG. 10B.

Figure 24:
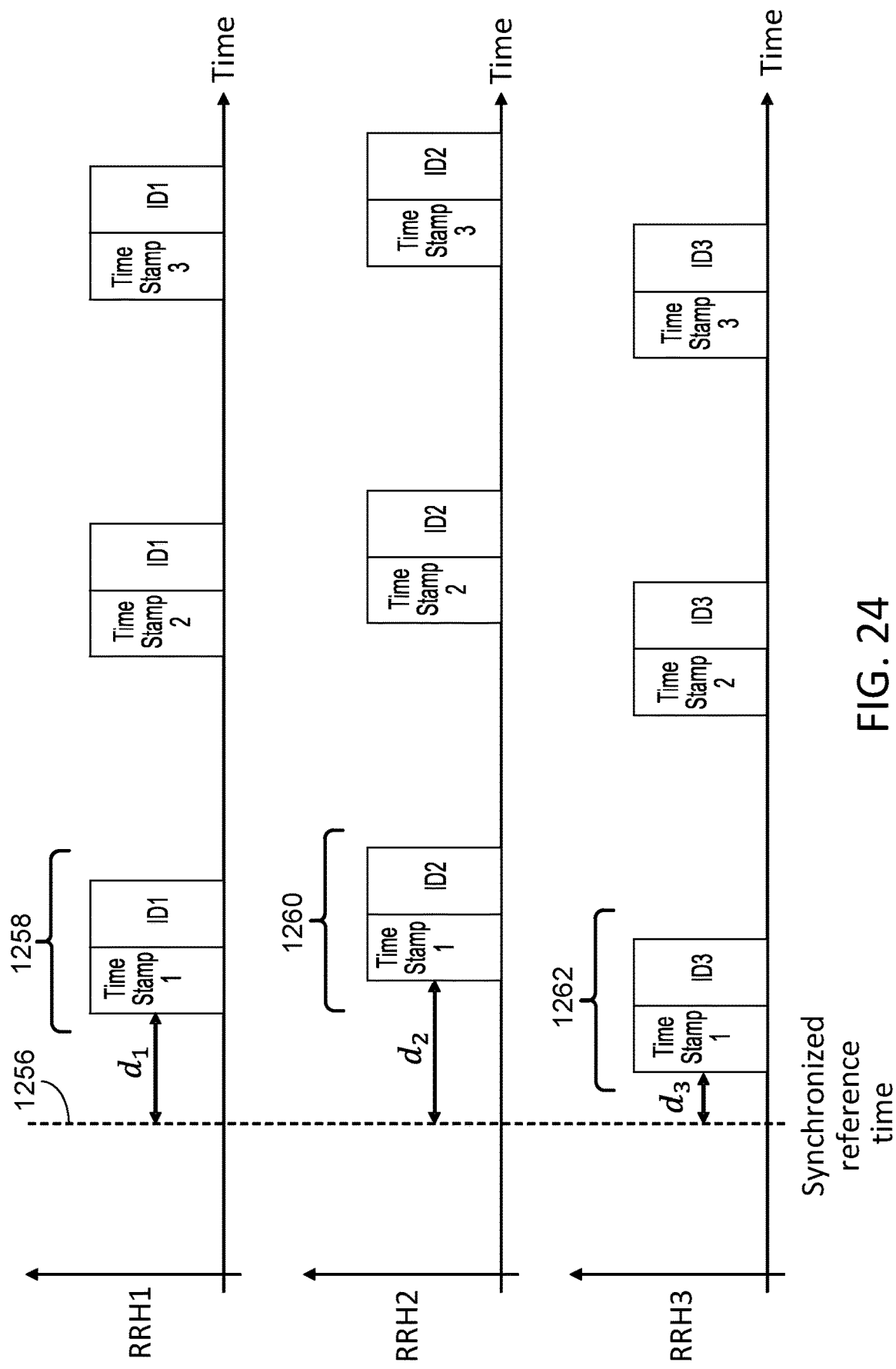
FIG. 24 shows timing diagrams of example time stamp signals.

Referring to FIG. 24, the mobile user 1270 (or a central entity to which the mobile user 1270 communicates its measurements of $\tau_{12}$ and $\tau_{13}$) corrects $\tau_{12}$ and $\tau_{13}$ to $\tau_{12} \rightarrow \tau_{12}-d_1+d_2$ and $\tau_{13} \rightarrow \tau_{13}-d_1+d_3$, respectively, before calculating the location hyperbolae (e.g., 1280, 1282). Here, $d_1$ is the delay of the time stamp signal 1258 from the first remote radio head RRH1 relative to the absolute time reference 1256, $d_2$ is the delay of the time stamp signal 1260 from the second remote radio head RRH2 relative to the absolute time reference 1256, and $d_3$ is the delay of the time stamp signal 1262 from the third remote radio head RRH3 relative to the absolute time reference 1256.

In some embodiments, the time stamp signals can be generated by a central entity, e.g., 1152 or 106 of FIG. 15. In some embodiments, the time stamp signals can be included in the frame headers 351 of FIG. 3A.

In some embodiments, the mobile user may miss or fail to properly detect one or more time stamp signals from a given RRH. For example, the mobile user may record a first time stamp from RRH1 but may miss that same first time stamp from RRH2. If the mobile user detects a second time stamp from RRH2 that is different from the first time stamp received from RRH1, the remote user can still determine $t_2$ by subtracting from its time measurement of the second time stamp from RRH2 the time period between the elapsed missed time stamps.

The process of determining the position of the mobile user 1270 can be further extended if the mobile user 1270 is time-synchronized with the remote radio heads (e.g., RRH1, RRH2, RRH3), in which case time difference measurements at the mobile user 1270 can be replaced by absolute time measurements. The mobile user 1270 records $t_1$ as the time the mobile user 1270 receives the first time stamp of a given ID from the first remote radio head RRH1, and records $t_2$ as the time the mobile user 1270 receives the first time stamp of a given ID from the second remote radio head RRH2. The elapsed time between the received time stamp from the first remote radio head RRH1 and the local time is converted to a distance from the first remote radio head by $s_1=t_1c$. The elapsed time between the received time stamp from the second remote radio head RRH2 and the local time is converted to a distance from the second remote radio head by $s_2=t_2c$. Given the distances $s_1$ and $s_2$, the position of the mobile user 1270 can be determined based on triangulation.

Figure 25:
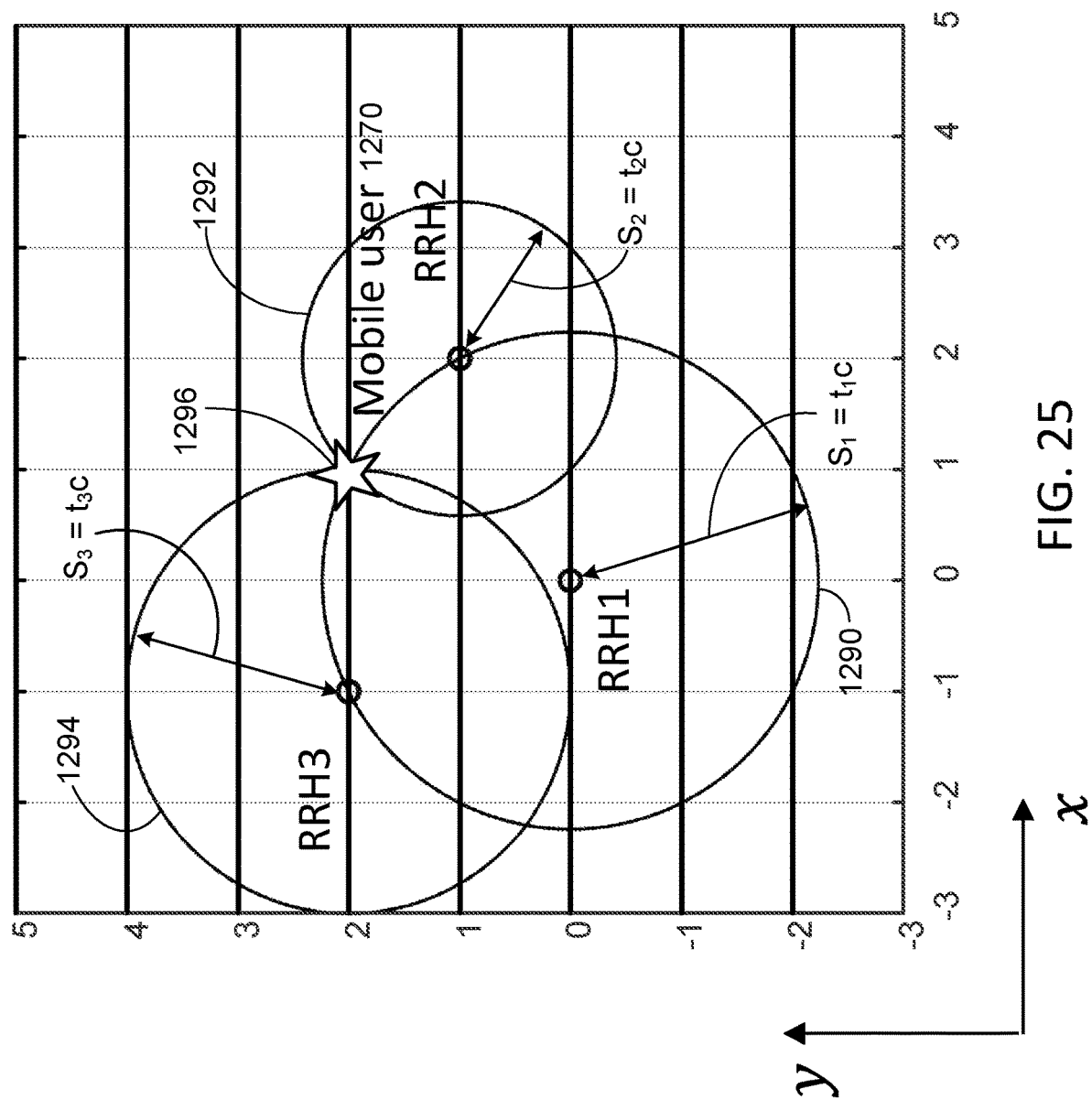
FIG. 25 is a graph showing example curves that are useful in determining the position of the mobile device.

Referring to FIG. 25, the equations $s_1=t_1c$ and $s_2=t_2c$ describe two circles 1290, 1292 in a plane, in which the mobile user 1270 is located at the intersection of the two circles 1290, 1292. Signals from further remote radio heads (e.g., RRH3) and/or the past movement history of the mobile user 1270 can be used to select one of these intersection points, as well as to extend the ranging method from the intersection of circles in a plane to the intersection of spheres in 3D space. In this example, the mobile user 1270 records $t_3$ as the time the mobile user 1270 receives the third time stamp of a given ID from the third remote radio head RRH3, the elapsed time between the received time stamp from the third remote radio head RRH3 and the local time is converted to a distance from the third remote radio head by $s_3=t_3c$, which describes a circle 1294 in the plane, in which the mobile user 1270 is located at the intersection 1296 of the three circles 1290, 1292, and 1294.

In the example above, the three circles 1290, 1292, and 1294 can be described by the following equations:

$$t_1c = \sqrt{(x-x_1)^2+(y-y_1)^2} \quad \text{(Equ. 6)}$$

$$t_2c = \sqrt{(x-x_2)^2+(y-y_2)^2} \quad \text{(Equ. 7)}$$

$$t_3c = \sqrt{(x-x_3)^2+(y-y_3)^2} \quad \text{(Equ. 8)}$$

The equations $s_1=t_1c$, $s_2=t_2c$, and $s_3=t_3c$ can also describe three spheres, as shown in Equations 9 to 11 below, in which the mobile user 1270 is located at the intersection of the three spheres in 3D space.

$$t_1c = \sqrt{(x-x_1)^2+(y-y_1)^2+(z-z_1)^2} \quad \text{(Equ. 9)}$$

$$t_2c = \sqrt{(x-x_2)^2+(y-y_2)^2+(z-z_2)^2}$$

$$t_2 c = \sqrt{(x-x_3)^2 + (y-y_3)^2 + (z-z_3)^2} \quad \text{(Equ. 11)}$$

Figure 26:
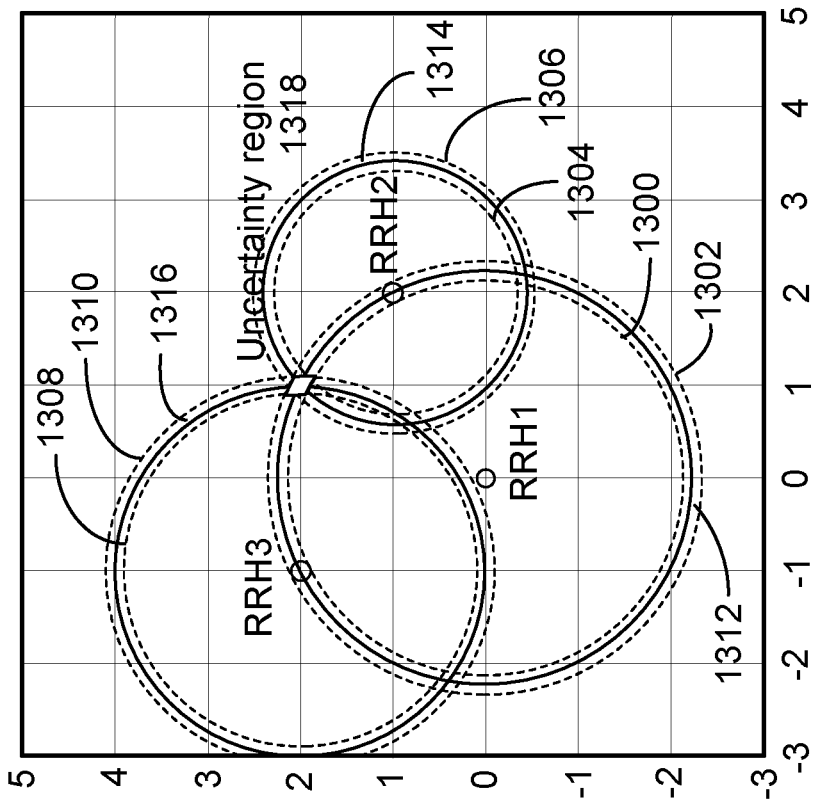

Referring to FIG. 26, in some implementations, there may be some uncertainty in the timing of the time stamp signals received at the mobile user 1270. The uncertainty translates into position uncertainty. For example, using GPS (global positioning system) receivers may introduce a timing uncertainty in the several nanosecond range, leading to a positioning accuracy of several meters. In contrast, using the synchronization technique disclosed herein can provide picosecond-level timing accuracy, which can translate into a positioning accuracy in the centimeter range. In the example of FIG. 25, there can be uncertainties as to the radiuses of the circles 1290, 1292, 1294. In some implementations, the timing uncertainty can be estimated during calibration of the system. The distance from the remote radio heads can be represented by the following equations:

$$s_1 = (t_1 * (1 \pm \Delta 1)) * c \quad \text{(Equ. 12)}$$

$$s_2 = (t_2 * (1 \pm \Delta 2)) * c \quad \text{(Equ. 13)}$$

$$s_3 = (t_3 * (1 \pm \Delta 3)) * c \quad \text{(Equ. 14)}$$

$\Delta 1$ represents the uncertainty in the timing of the time stamp signal from the first remote radio head, $\Delta 2$ represents the uncertainty in the timing of the time stamp signal from the second remote radio head, and $\Delta 3$ represents the uncertainty in the timing of the time stamp signal from the third remote radio head.

The ring 1312 between circles in dashed lines 1300 and 1302 represents the possible range of locations of the mobile user 1270 determined based on the timing of the time stamp signal from the first remote radio head RRH1 according to Equation 12. The ring 1314 between circles in dashed lines 1304 and 1306 represents the possible range of locations of the mobile user 1270 determined based on the timing of the time stamp signal from the second remote radio head RRH2 according to Equation 13. The ring 1316 between circles in dashed lines 1308 and 1310 represents the possible range of locations of the mobile user 1270 determined based on the timing of the time stamp signal from the third remote radio head RRH3 according to Equation 14. The intersection of the three rings 1312, 1314, 1316 represent the uncertainty region 1318 in which the mobile user 1270 may be located on the plane.

Equations 12 to 14 can be modified to describe three spheres each having a certain thickness, the thickness representing the uncertainty in distance, and the intersection of the three spheres represent the uncertainty region in which the mobile user 1270 may be located in the 3D space.

Figure 27:
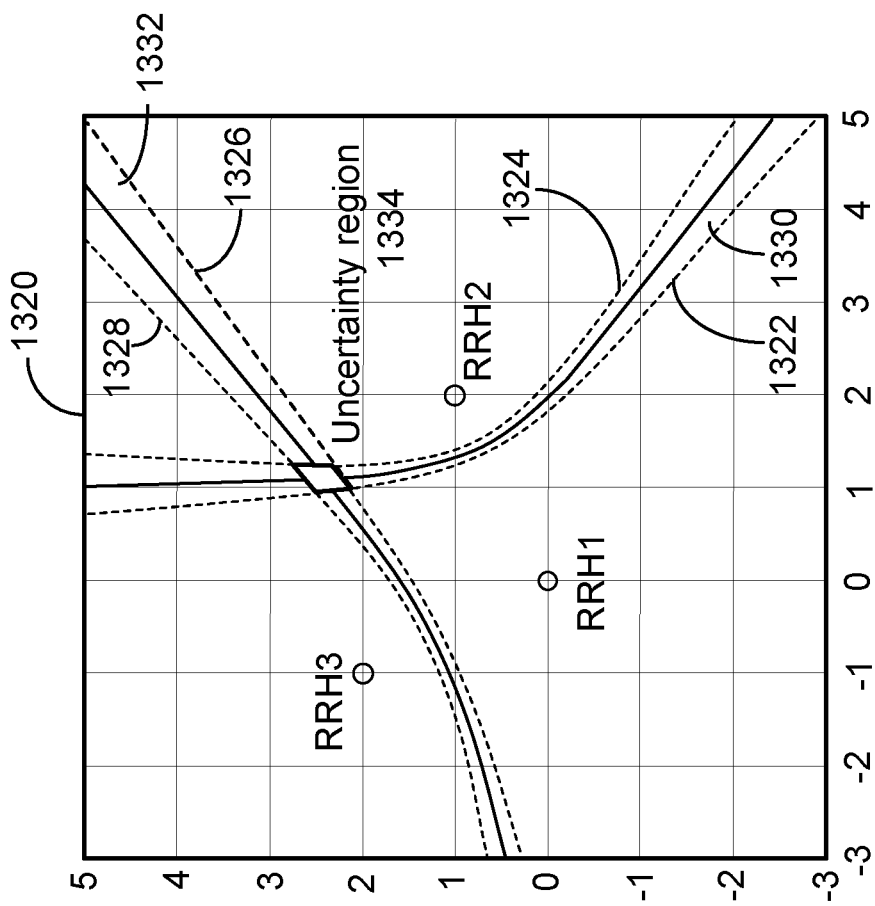
FIGS. 26 and 27 are graphs showing example curves that are useful in determining the likely positions of the mobile device.

The graph 1286 can be modified to take into account of the uncertainties in the timing of the time stamp signals from the first and second remote radio heads RRH1, RRH2, as shown in the example graph 1320 of FIG. 27. The definitions of the relative time delays between receiving the time stamps can be modified as follows:

$$\tau_{12} = t_1 * (1 \pm \Delta 1) - t_2 * (1 \pm \Delta 2) \quad \text{(Equ. 15)}$$

$$\tau_{13} = t_1 * (1 \pm \Delta 1) - t_3 * (1 \pm \Delta 3) \quad \text{(Equ. 16)}$$

Here, $\Delta 1$ represents the uncertainty in the timing of the time stamp signal from the first remote radio head RRH1, $\Delta 2$ represents the uncertainty in the timing of the time stamp signal from the second remote radio head RRH2, and $\Delta 3$ represents the uncertainty in the timing of the time stamp signal from the third remote radio head RRH3.

$$\tau_{12} * (1 \pm \Delta 1\_2) * c = \sqrt{(x-x_1)^2 + (y-y_1)^2} - \sqrt{(x-x_2)^2 + (y-y_2)^2} \quad \text{(Equ. 17)}$$

$$\tau_{13} * (1 \pm \Delta 1\_3) * c = \sqrt{(x-x_1)^2 + (y-y_1)^2} - \sqrt{(x-x_3)^2 + (y-y_3)^2} \quad \text{(Equ. 18)}$$

Here, $\Delta 1\_2 = \Delta 1 + \Delta 2$, $\Delta 1\_3 = \Delta 1 + \Delta 3$.

In the graph 1320, the curves 1322, 1324 represent the hyperbolae described by Equation 17, and the region 1330 between the curves 1322, 1324 represent the possible locations of the mobile user 1270 determined based on the time stamp signals from the first and second remote radio heads RRH1, RRH2. The curves 1326, 1328 represents the hyperbolae described by Equation 18, and the region 1332 between the curves 1326, 1328 represent the possible locations of the mobile user 1270 determined based on the time stamp signals from the first and third remote radio heads RRH1, RRH3. The intersection of the regions 1330 and 1332 represents the uncertainty region 1334 where the mobile user 1270 may be located.

According to an example embodiment disclosed above, e.g., in the summary section and/or in reference to any one or any combination of some or all of FIGS. 1-20, provided is an apparatus (e.g., 100, FIG. 1) comprising: a light source (e.g., 210, FIG. 2); and an electronic controller (e.g., 202, FIG. 2) connected to cause the light source to produce a sequence (e.g., 200, FIGS. 2, 3A) of optical frame templates (e.g., 350, FIG. 3A), each of the optical frame templates comprising a respective frame header (e.g., 351, FIG. 3A), and a respective frame body (e.g., 352, FIG. 3A); wherein each frame body comprises a respective optical pulse train (e.g., 353, FIG. 3A); and wherein the light source and the electronic controller are configured to imprint control information (e.g., 211, FIG. 2) onto light of at least some of the optical frame templates using time intervals corresponding to the respective frame headers (e.g., as indicated in FIGS. 5A-5D) of the sequence.

In some embodiments of the above apparatus, said at least some of the optical frame templates include are at least three optical frame templates.

In some embodiments of any of the above apparatus, said at least some of the optical frame templates are copies of one another (e.g., 200, FIG. 3A).

In some embodiments of any of the above apparatus, none of the respective frame bodies of the sequence of optical frame templates carry payload data (e.g., 200, FIG. 3A).

In some embodiments of any of the above apparatus, the sequence of optical frame templates has a first time duration (e.g., $T_P$, FIG. 3A); each of the respective frame headers has a second time duration (e.g., $T_H$, FIG. 3A); each of the respective frame bodies has a third time duration (e.g., $T_B$, FIG. 3A), a sum of the second and third time durations being smaller than the first time duration; and each of the respective optical pulse trains has a period of a fourth time duration (e.g., $T_S$, FIG. 3A) that is smaller than a smaller one of the second and third time durations.

In some embodiments of any of the above apparatus, the fourth time duration (e.g., $T_S$, 353, FIG. 3) is at most 100 ps.

In some embodiments of any of the above apparatus, the third time duration is at least 10 longer than the fourth time duration (e.g., $T_B \geq 10 \, T_S$, 352, 353, FIG. 3).

In some embodiments of any of the above apparatus, the third time duration is at least 100 longer than the fourth time duration (e.g., $T_B \geq 100 \, T_S$, 352, 353, FIG. 3).

In some embodiments of any of the above apparatus, the third time duration is at least 1000 longer than the fourth time duration (e.g., $T_B \geq 1000 \, T_S$, 352, 353, FIG. 3).

In some embodiments of any of the above apparatus, the second time duration is at most 10% of the third time duration (e.g., a $T_H \leq 0.1 \, T_B$, 351, 352, FIG. 3).

In some embodiments of any of the above apparatus, the second time duration is at most 1% of the third time duration (e.g., a $T_H \leq 0.01 \, T_B$, 351, 352, FIG. 3).

In some embodiments of any of the above apparatus, the first time duration is at least 10 times longer than the third time duration (e.g., a $T_P \geq 10 \, T_B$, 200, 352, FIG. 3).

In some embodiments of any of the above apparatus, the first time duration is an integer multiple of the sum of the second and third time durations (e.g., a $T_P$ is an integer multiple of a $T_F$, 200, FIG. 3).

In some embodiments of any of the above apparatus, the sum of the second and third time durations is an integer multiple of the fourth time duration (e.g., a $T_F$ is an integer multiple of a $T_S$, 200, FIG. 3).

In some embodiments of any of the above apparatus, the sequence of optical frame templates is periodic with a period equal to the sum of the second and third time durations (e.g., $T_F = T_H + T_B$, 351, 352, FIGS. 3; 200, FIG. 5A).

In some embodiments of any of the above apparatus, the apparatus further comprises a reference clock, the reference clock comprising at least one of: a high-precision clock, a receiver capable of obtaining a reference clock from a Global Positioning System, and a device connectable to a stratum clock of a synchronous optical network.

In some embodiments of any of the above apparatus, the second and third time durations are derived from the reference clock.

In some embodiments of any of the above apparatus, the fourth time duration is derived from the reference clock.

In some embodiments of any of the above apparatus, the respective optical pulse trains of at least two optical frame templates of the sequence are frame-synchronized (e.g., 200, FIG. 3A, cf. definition in [78]).

In some embodiments of any of the above apparatus, the respective optical pulse trains of at least two optical frame templates are synchronized with one another (e.g., 200, FIG. 3A, cf. definition in [79]).

In some embodiments of any of the above apparatus, the respective optical pulse train of at least one optical frame template extends into the respective frame header thereof (e.g., 200, FIG. 3A).

In some embodiments of any of the above apparatus, the light source and the electronic controller are configured to imprint the control information using digital changes of an optical-field parameter (e.g., P, FIGS. 5C, 5D); and the optical-field parameter is selected from a parameter set consisting of: an intensity of light, a phase of light, a carrier frequency of light, and a polarization of light.

In some embodiments of any of the above apparatus, the control information comprises at least one of: a clock frequency, a clock phase, a synchronization time stamp, a frame delimiter, a frame counter, status information, a heartbeat signal, and a control command for a network element.

In some embodiments of any of the above apparatus, the light source comprises one or more of: a continuous-wave laser (e.g., 430, FIGS. 4A-4B, FIG. 6C), an optical modulator (e.g., 420, 440, 425, FIGS. 4A-4B), a directly modulated laser (e.g., 431, FIG. 4C), an actively mode-locked laser (e.g., 631, FIG. 6A), a passively mode-locked laser (e.g., 631, FIG. 6B), and an optical switch (e.g., 610, FIG. 6C).

In some embodiments of any of the above apparatus, the optical modulator (e.g., 440, FIG. 4A) comprises one or more of: an intensity modulator, a phase modulator, a polarization modulator, and a frequency shifter.

In some embodiments of any of the above apparatus, the apparatus further comprises an optical splitter (e.g., 480, FIG. 4A) configured to split the sequence of optical frame templates into two or more portions.

In some embodiments of any of the above apparatus, the light source comprises: a first optical pulse source (e.g., combination of $420_1$ and $430_1$, FIG. 6C) configured to emit light at a first carrier frequency (also referred to as a first optical carrier frequency); a second optical pulse source (e.g., combination of $420_2$ and $430_2$, FIG. 6C) configured to emit light at a second carrier frequency (also referred to as a second optical carrier frequency) different from the first carrier frequency; and an optical switch (e.g., 610, FIG. 6C) configured to select either the light emitted by the first optical pulse source (e.g., 601, FIG. 6C) or the light emitted by the second optical pulse source (e.g., 602, FIG. 6C).

In some embodiments of any of the above apparatus, a difference between the first carrier frequency and the second carrier frequency is greater than a pulse-repetition rate of the respective optical pulse train (e.g., $|f_1 - f_2| \geq 1/T_S$).

In some embodiments of any of the above apparatus, the apparatus further comprises an optical modulator (e.g., 830, FIG. 8) configured to load different respective payload-data sequences into the respective frame bodies of different ones of the optical frame templates (e.g., as indicated in FIG. 3B).

In some embodiments of any of the above apparatus, the optical modulator and the light source are optically connected by way of at least one optical fiber (e.g., 102, FIG. 1).

In some embodiments of any of the above apparatus, the at least one optical fiber has a length of at least one meter.

According to another example embodiment disclosed above, e.g., in the summary section and/or in reference to any one or any combination of some or all of FIGS. 1-10, provided is an apparatus (e.g., 800, FIG. 8) comprising: a first optical interface (e.g., 810, FIG. 8) connectable to receive a sequence of optical frame templates (e.g., 200, FIG. 3A), each of the optical frame templates comprising a respective frame header (e.g., 351, FIG. 3A) and a respective frame body (e.g., 352, FIG. 3A), the frame body comprising a respective optical pulse train (e.g., 353, FIG. 3A); an optical splitter (e.g., 820, FIG. 8) connected to the first optical interface; an optical modulator (e.g., 830, FIG. 8) connected to a first output of the optical splitter and configured to load data (e.g., 813, FIG. 8) into the respective frame bodies to convert the sequence of optical frame templates into a corresponding sequence of loaded optical frames (e.g., 852, FIG. 8); and an optical receiver (e.g., 880, FIG. 8) connected to a second output of the optical splitter and configured to extract control information (e.g., 882, FIG. 8) from the respective frame headers.

In some embodiments of the above apparatus, the extracted information comprises at least one of: a clock frequency, a clock phase, a synchronization time stamp, a frame delimiter, a frame counter, status information, a heartbeat signal, and a control command for a network element.

In some embodiments of any of the above apparatus, the optical modulator is configured to modulate one or more of: an intensity of light, a phase of light, a carrier frequency of light, and a polarization of light.

In some embodiments of any of the above apparatus, the optical modulator is configured to modulate at a symbol rate equal to a pulse-repetition rate of the respective optical pulse train.

In some embodiments of any of the above apparatus, the optical modulator is configured to modulate individual pulses of the respective optical pulse train.

In some embodiments of any of the above apparatus, the optical receiver comprises one or more of: a p-i-n photodetector, an avalanche photodetector, a coherent receiver (e.g., 910, FIGS. 9A-9D), electronic processing circuitry (e.g., 920, FIGS. 9B-9D), and one or more optical elements configured to convert encoded optical signals into optical signals detectable using intensity detection (e.g., 930, FIGS. 9C-9D).

In some embodiments of any of the above apparatus, the one or more optical elements comprise one or more of: a polarization filter, a polarization splitter, a delay interferometer, a wavelength filter, a wavelength demultiplexer, and a spatial-mode demultiplexer.

In some embodiments of any of the above apparatus, the apparatus further comprises a second optical interface (e.g., 860, FIG. 8) connectable to receive another sequence of loaded optical frames (e.g., 853, FIG. 8); and a second optical receiver (e.g., 870, FIG. 8) connected to the second optical interface and configured to extract information (e.g., 872, 816, FIG. 8) from said another sequence.

In some embodiments of any of the above apparatus, the extracted information comprises at least one of: a clock frequency, a clock phase, a synchronization time stamp, a frame delimiter, a frame counter, status information, a heartbeat signal, and a control command for a network element.

According to another example embodiment disclosed above, e.g., in the summary section and/or in reference to any one or any combination of some or all of FIGS. 1-10, provided is an apparatus (e.g., 100, FIG. 1) comprising a control system (e.g., 106, FIG. 1) configured to synchronize two or more network elements (e.g., $101_1$-$101_6$, FIG. 1), the control system comprising: a first port (e.g., $107_1$, FIG. 10A) configured to receive a first local time information from a first network element (e.g., $101_1$, FIG. 10A); a second port (e.g., $107_2$, FIG. 10A) configured to receive a second local time information from a second network element (e.g., $101_2$, FIG. 10A); a processor (e.g., 1040, FIG. 10A) configured to compute, from the first and second local time information, one or more global time values; and a third port (e.g., $107_{105}$, FIG. 1) configured to transmit the one or more global time values to the first network element or to a third network element (e.g., 105, FIG. 1) different from the first and second network elements.

In some embodiments of the above apparatus, the first local time information and the second local time information each comprise two respective local time values, said local time values being associated with a same time stamp (e.g., $T_0$) extracted by each of the first and second network elements from respective sequences (e.g., 200, 300, FIG. 3A) of optical frame templates and loaded optical frames received thereat.

In some embodiments of any of the above apparatus, the first local time information and the second local time information each represent a function of two local time values, said local time values being associated with a same time stamp (e.g., $T_0$) extracted by each of the first and second network elements from respective sequences (e.g., 200, 300, FIG. 3A) of optical frame templates and loaded optical frames received thereat.

In some embodiments of any of the above apparatus, the control system is configured to compute a sum of the received first local time information and the received second local time information (e.g., at 1016, FIG. 10B).

In some embodiments of any of the above apparatus, the control system is configured to compute a difference of the received first local time information and the received second local time information (e.g., at 1016, FIG. 10B).

In some embodiments of any of the above apparatus, the processor is a distributed processor having parts thereof located at different computers.

In some embodiments of any of the above apparatus, the processor is physically integrated into one or more network elements.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

The optical synchronization signals sent from the baseband processing unit to the remote radio heads do not necessarily need to have a sequence of optical frame templates, in which each optical frame template includes a frame header and a frame body, as shown in the example of FIG. 3A. Instead, an optical clock signal that includes a sequence of optical pulses, without separate frame headers and frame bodies, can be used to synchronize the various remote radio heads. In the example of FIG. 15, instead of using an optical power supply module 103 to provide the optical synchronization signals to the remote radio heads 1154, 1156, 1158, it is possible to use an optical clock signal generator to provide an optical clock signal to the remote radio heads 1154, 1156, 1158. The optical clock signal generator can include a light source, and an electronic controller that controls the light source to generate a sequence of optical pulses that is used as an optical clock signal. The remote radio heads 1154, 1156, 1158 use the optical clock signals to synchronize the local oscillators.

In the examples of FIGS. 22, 23, 25, 26, and 27, the position of the mobile device 1270 is determined. The positions of stationary devices, or devices that do not move frequently, can also be determined using the same process. For example, security cameras or sensors can be mounted at various locations, and the coordinates of the security cameras or sensors can be determined using the ranging process described above.

Some embodiments can be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure can be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled or referred to as "processors" and/or "controllers," can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

As used in this application, the term "circuitry" can refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Some details of the systems, apparatuses, or modules of the various embodiments described in this document are described in U.S. patent application Ser. No. 16/816,171, filed on Mar. 11, 2020, U.S. patent application Ser. No. 16/822,103, filed on Mar. 18, 2020, U.S. patent application Ser. No. 16/888,890, filed on Jun. 1, 2020, published as US 2021/0376950, U.S. provisional patent application 63/145,368, filed on Feb. 3, 2021, PCT application PCT/US2021/027306, filed on Apr. 14, 2021, published as WO 2021/211725, U.S. patent application Ser. No. 17/592,232, filed on Feb. 3, 2022, and U.S. Pat. No. 11,153,670, issued on Oct. 19, 2021. The contents of the above applications and patent are incorporated herein by reference in their entirety.

It should be appreciated by those of ordinary skill in the art that any block diagrams herein represent conceptual views of illustrative circuitry embodying the principles of the disclosure.

Although the present invention is defined in the attached claims, it should be understood that the present invention can also be defined in accordance with the following embodiments:

Embodiment 1: An apparatus comprising:
baseband processing circuitry configured to generate a baseband signal that is transmitted to a first network element and a second network element; and an optical power supply configured to generate a first optical signal and a second optical signal, transmit the first optical signal to the first network element, and transmit the second optical signal to the second network element, wherein the first optical signal and the second optical signal include information that enables synchronization of the first and second network elements.

Embodiment 2: The apparatus of embodiment 1 wherein the first optical signal comprises optical pulses, and the second optical signal comprises optical pulses.

Embodiment 3: The apparatus of embodiment 1 or 2 wherein the first network element comprises a first remote radio head, the second network element comprises a second remote radio head, and the first and second optical signals include information that enables the first and second remote radio heads to synchronize.

Embodiment 4: The apparatus of embodiment 3 in which the first and second optical signals include information that enables the first and second remote radio heads to synchronize respective local oscillators.

Embodiment 5: The apparatus of embodiment 4 wherein the first and second remote radio heads are configured to:
use the first and second optical signals to synchronize the respective local oscillators,
convert the baseband signal to radio frequency signals using mixers that are associated with the respective local oscillators, and
transmit the radio frequency signals to generate directional wireless beams.

Embodiment 6: The apparatus of any of embodiments 1 to 5 wherein the optical power supply comprises:
a light source; and
an electronic controller configured to control the light source to produce a sequence of optical frame templates and imprint control information onto light of at least some of the optical frame templates.

Embodiment 7: The apparatus of embodiment 6 wherein each of the optical frame templates comprises a respective frame header, and a respective frame body; and
wherein each frame body comprises a respective optical pulse train.

Embodiment 8: The apparatus of embodiment 7 wherein the frame bodies of said at least some of the optical frame templates are copies of one another.

Embodiment 9: The apparatus of embodiment 7 or 8 wherein none of the respective frame bodies of the sequence of optical frame templates carry payload data.

Embodiment 10: The apparatus of any of embodiments 7 to 9 wherein the sequence of optical frame templates has a first time duration;
wherein each of the respective frame headers has a second time duration;
wherein each of the respective frame bodies has a third time duration, a sum of the second and third time durations being smaller than or equal to the first time duration;
wherein each of the respective optical pulse trains has a period of a fourth time duration that is smaller than a smaller one of the second and third time durations;
wherein the third time duration is at least 10 times longer than the fourth time duration;
wherein the second time duration is at most 10% of the third time duration; and
wherein the first time duration is at least 10 times longer than the third time duration.

Embodiment 11: The apparatus of any of embodiments 7 to 10 wherein the respective optical pulse trains of at least two optical frame templates of the sequence are frame-synchronized.

Embodiment 12: The apparatus of any of embodiments 7 to 10 wherein the respective optical pulse trains of at least two optical frame templates are synchronized with one another.

Embodiment 13: The apparatus of any of embodiments 7 to 10 wherein the respective optical pulse train of at least one optical frame template extends into the respective frame header thereof.

Embodiment 14: The apparatus of any of embodiments 6 to 13 wherein the light source and the electronic controller are configured to imprint the control information using digital changes of an optical-field parameter; and
wherein the optical-field parameter is selected from a parameter set consisting of: an intensity of light, a phase of light, a carrier frequency of light, and a polarization of light.

Embodiment 15: The apparatus of any of embodiments 6 to 14 wherein the control information comprises at least one of: a clock frequency, a clock phase, a synchronization time stamp, a frame delimiter, a frame counter, a node identifier, status information, a heartbeat signal, and a control command for a network element.

Embodiment 16: The apparatus of any of embodiments 6 to 15 wherein the light source comprises:
a first optical pulse source configured to emit light at a first optical carrier frequency;
a second optical pulse source configured to emit light at a second optical carrier frequency different from the first optical carrier frequency; and
an optical switch configured to select either the light emitted by the first optical pulse source or the light emitted by the second optical pulse source.

Embodiment 17: The apparatus of any of embodiments 7 to 16, further comprising an optical modulator configured to load different respective payload-data sequences into the respective frame bodies of different ones of the optical frame templates.

Embodiment 18: The apparatus of any of embodiments 1, 2, and 6 to 17 wherein the first network element comprises a first server computer in a first data center, and the second network element comprises a second server computer in the first data center or a second data center.

Embodiment 19: An apparatus comprising:
a first optical interface connectable to receive a sequence of optical frame templates, each of the optical frame templates comprising a respective frame header and a respective frame body, the frame body comprising a respective optical pulse train;
an optical splitter connected to the first optical interface;
an optical modulator connected to a first output of the optical splitter and configured to load data into the respective frame bodies to convert the sequence of optical frame templates into a corresponding sequence of loaded optical frames; and
an optical receiver connected to a second output of the optical splitter and configured to extract control information from the respective frame headers.

Embodiment 20: The apparatus of embodiment 19 wherein the extracted information comprises at least one of: a clock frequency, a clock phase, a synchronization time stamp, a frame delimiter, a frame counter, a node identifier, status information, a heartbeat signal, and a control command for a network element.

53

Embodiment 21: The apparatus of embodiment 19 wherein the optical modulator is configured to modulate at a symbol rate equal to a pulse-repetition rate of the respective optical pulse train.

Embodiment 22: The apparatus of embodiment 19, further comprising
- a second optical interface connectable to receive another sequence of loaded optical frames; and
- a second optical receiver connected to the second optical interface and configured to extract information from said another sequence.

Embodiment 23: The apparatus of embodiment 22 wherein the extracted information comprises at least one of: a clock frequency, a clock phase, a synchronization time stamp, a frame delimiter, a frame counter, a node identifier, status information, a heartbeat signal, and a control command for a network element.

Embodiment 24: An apparatus comprising a control system configured to synchronize two or more network elements, the control system comprising:
- a first port configured to receive a first local time information from a first network element;
- a second port configured to receive a second local time information from a second network element;
- a processor configured to compute, from the first and second local time information, one or more global time values; and
- a third port configured to transmit the one or more global time values to the first network element or to a third network element different from the first and second network elements.

Embodiment 25: The apparatus of embodiment 24 wherein the first local time information and the second local time information each comprise two respective local time values, said local time values being associated with a same time stamp extracted by each of the first and second network elements from respective sequences of optical frame templates and loaded optical frames received thereat.

Embodiment 26: The apparatus of embodiment 24 or 25 wherein the control system is configured to compute a sum of the received first local time information and the received second local time information.

Embodiment 27: The apparatus of any of embodiments 24 to 26 wherein the control system is configured to compute a difference of the received first local time information and the received second local time information.

Embodiment 28: The apparatus of embodiment 6 in which the sequence of optical frame templates provides phase synchronization information to the first and second remote radio heads.

Embodiment 29: The apparatus of embodiment 6 or 28 in which the sequence of optical frame templates provides frequency synchronization information to the first and second remote radio heads.

Embodiment 30: The apparatus of embodiment 6, 28, or 29, comprising:
- a first transponder configured to modulate the sequence of optical frame templates or a copy of the sequence of optical frame templates to generate a first modulated signal, and send the first modulated signal to the first remote radio head; and
- a second transponder configured to modulate the sequence of optical frame templates or a copy of the sequence of optical frame templates to generate a second modulated signal, and send the second modulated signal to the second remote radio head.

Embodiment 31: A system comprising:

54

- an optical power supply module configured to generate a first optical signal, a second optical signal, a third optical signal, and a fourth optical signal, wherein the optical power supply module is configured to transmit the first optical signal to a first network element, and transmit the second optical signal to a second network element;
- a first transponder configured to modulate the third optical signal to generate a first modulated signal, and transmit the first modulated signal to the first network element; and
- a second transponder configured to modulate the fourth optical signal, and transmit the second modulated signal to the second network element;
- wherein the first and second optical signals include information that enables synchronization of the first and second network elements.

Embodiment 32: The system of embodiment 31 wherein the first network element comprises a first remote radio head, the second network element comprises a second remote radio head, and the first and second optical signals include information that enables the first and second network elements to synchronize one or more signals processed within the first or the second remote radio head.

Embodiment 33: The system of embodiment 32 in which the first and second optical signals include information that enables the first and second network elements to synchronize respective local oscillators and operate in combination to generate directional wireless beams.

Embodiment 34: The system of embodiment 32, comprising the first and second remote radio heads.

Embodiment 35: The system of embodiment 32 or 34 wherein the first optical signal comprises a first sequence of optical pulses.

Embodiment 36: The system of embodiment 35 wherein the second optical signal comprises a second sequence of optical pulses.

Embodiment 37: The system of embodiment 36 wherein the third optical signal comprises a third sequence of optical pulses.

Embodiment 38: The system of embodiment 37 wherein the fourth optical signal comprises a fourth sequence of optical pulses.

Embodiment 39: The system of any of embodiments 32 to 38, comprising:
- a baseband processing unit configured to generate baseband signals that are transmitted to the first and second remote radio heads, in which the baseband processing unit comprises an electronic controller configured to control the optical power supply module to produce the sequence of optical pulses.

Embodiment 40: The system of embodiment 39 wherein the optical power supply is part of the baseband processing unit.

Embodiment 41: The system of any of embodiments 32 to 40 in which the optical power supply module is configured to transmit optical signals to the first remote radio head through a first optical fiber, the first transponder is configured to transmit optical signals to the first remote radio head through a second optical fiber, and the first remote radio head is configured to transmit optical signals to the first transponder through a third optical fiber.

Embodiment 42: The system of any of embodiments 32 to 40 in which the optical power supply module is configured to transmit optical signals to the first remote radio head through a first optical fiber, the first transponder is configured to transmit optical signals to the first remote radio head through a second optical fiber, and the first remote radio head is configured to transmit optical signals to the first transponder through the second optical fiber.

Embodiment 43: The system of any of embodiments 32 to 40 in which the optical power supply module is configured to transmit optical signals to the first remote radio head through a first optical fiber, the first transponder is configured to transmit optical signals to the first remote radio head through the first optical fiber, and the first remote radio head is configured to transmit optical signals to the first transponder through a second optical fiber.

Embodiment 44: The system of any of embodiments 32 to 40 in which the optical power supply module is configured to transmit optical signals to the first remote radio head through a first optical fiber, the first transponder is configured to transmit optical signals to the first remote radio head through a second optical fiber, and the first remote radio head is configured to transmit optical signals to the first transponder through the first optical fiber.

Embodiment 45: The system of any of embodiments 32 to 40 in which the optical power supply module is configured to transmit optical signals to the first remote radio head through a first optical fiber, the first transponder is configured to transmit optical signals to the first remote radio head through the first optical fiber, and the first remote radio head is configured to transmit optical signals to the first transponder through the first optical fiber.

Embodiment 46: The system of any of embodiments 32 to 45 in which the optical power supply module is configured to transmit optical signals with a first wavelength to the first remote radio head, and the first transponder is configured to transmit optical signals with a second wavelength to the first remote radio head, and the first wavelength is different from the second wavelength.

Embodiment 47: The system of any of embodiments 35 to 46 in which the optical power supply module comprises:
a light source; and
an electronic controller connected to cause the light source to produce the sequences of optical pulses.

Embodiment 48: The system of any of embodiments 31 to 46 in which the optical power supply module comprises:
a light source; and
an electronic controller connected to cause the light source to produce a sequence of optical frame templates, each of the optical frame templates comprising a respective frame header, and a respective frame body;
wherein each frame body comprises a sequence of optical pulses; and
wherein the light source and the electronic controller are configured to imprint control information onto light of at least some of the optical frame templates using time intervals corresponding to the respective frame headers of the sequence.

Embodiment 49: The system of any of embodiments 35 to 48 wherein the optical power supply comprises an optical splitter to split an initial sequence of optical pulses into at least two of the first, second, third, and fourth sequences of optical pulses.

Embodiment 50: The system of any of embodiments 31 to 49 wherein the optical power supply comprises a first light source, a second light source, and an optical switch,
wherein the first light source is configured to generate light having a first wavelength, the second light source is configured to generate light having a second wavelength,
wherein the optical switch has a first input optically coupled to the first light source and a second input optically coupled to the second light source, and the optical switch is configured to switch one of the inputs to one of its outputs that are optically coupled to the first network element and the first transponder.

Embodiment 51: The apparatus of any of embodiments 31 and 47 to 50 wherein the first network element comprises a first server computer in a first data center, and the second network element comprises a second server computer in the first data center or a second data center.

Embodiment 52: The system of embodiment 31, comprising the first and second network elements.

Embodiment 53: The system of embodiment 31 or 52 wherein the first optical signal comprises a first sequence of optical pulses.

Embodiment 54: The system of embodiment 53 wherein the second optical signal comprises a second sequence of optical pulses.

Embodiment 55: The system of embodiment 54 wherein the third optical signal comprises a third sequence of optical pulses.

Embodiment 56: The system of embodiment 55 wherein the fourth optical signal comprises a fourth sequence of optical pulses.

Embodiment 57: The system of any of embodiments 53 to 56, comprising an electronic controller configured to control the optical power supply module to produce the sequence of optical pulses.

Embodiment 58: The system of any of embodiments 31 and 52 to 57 in which the optical power supply module is configured to transmit optical signals to the first network element through a first optical fiber, the first transponder is configured to transmit optical signals to the first network element through a second optical fiber, and the first network element is configured to transmit optical signals to the first transponder through a third optical fiber.

Embodiment 59: The system of any of embodiments 31 and 52 to 57 in which the optical power supply module is configured to transmit optical signals to the first network element through a first optical fiber, the first transponder is configured to transmit optical signals to the first network element through a second optical fiber, and the first network element is configured to transmit optical signals to the first transponder through the second optical fiber.

Embodiment 60: The system of any of embodiments 31 and 52 to 57 in which the optical power supply module is configured to transmit optical signals to the first network element through a first optical fiber, the first transponder is configured to transmit optical signals to the first network element through the first optical fiber, and the first network element is configured to transmit optical signals to the first transponder through a second optical fiber.

Embodiment 61: The system of any of embodiments 31 and 52 to 57 in which the optical power supply module is configured to transmit optical signals to the first network element through a first optical fiber, the first transponder is configured to transmit optical signals to the first network element through a second optical fiber, and the first network element is configured to transmit optical signals to the first transponder through the first optical fiber.

Embodiment 62: The system of any of embodiments 31 and 52 to 57 in which the optical power supply module is configured to transmit optical signals to the first network element through a first optical fiber, the first transponder is configured to transmit optical signals to the first network element through the first optical fiber, and the first network element is configured to transmit optical signals to the first transponder through the first optical fiber.

Embodiment 63: The system of any of embodiments 31 and 52 to 57 in which the optical power supply module is configured to transmit optical signals with a first wavelength to the first network element, and the first transponder is configured to transmit optical signals with a second wavelength to the first network element, and the first wavelength is different from the second wavelength.

Embodiment 64: The system of any of embodiments 53 to 63 in which the optical power supply module comprises:
a light source; and
an electronic controller connected to cause the light source to produce the sequences of optical pulses.

Embodiment 65: The system of any of embodiments 52 to 64 in which the optical power supply module comprises:
a light source; and
an electronic controller connected to cause the light source to produce a sequence of optical frame templates, each of the optical frame templates comprising a respective frame header, and a respective frame body;
wherein each frame body comprises a sequence of optical pulses; and
wherein the light source and the electronic controller are configured to imprint control information onto light of at least some of the optical frame templates using time intervals corresponding to the respective frame headers of the sequence.

Embodiment 66: The system of any of embodiments 56 to 65 wherein the optical power supply comprises an optical splitter to split an initial sequence of optical pulses into at least two of the first, second, third, and fourth sequences of optical pulses.

Embodiment 67: The system of any of embodiments 52 to 66 wherein the optical power supply comprises a first light source, a second light source, and an optical switch,
wherein the first light source is configured to generate light having a first wavelength, the second light source is configured to generate light having a second wavelength,
wherein the optical switch has a first input optically coupled to the first light source and a second input optically coupled to the second light source, and the optical switch is configured to switch one of the inputs to one of its outputs that are optically coupled to the first network element and the first transponder.

Embodiment 68: The apparatus of any of embodiments 52 to 67 wherein the first network element comprises a first server computer in a first data center, and the second network element comprises a second server computer in the first data center or a second data center.

Embodiment 69: A system comprising:
an optical power supply module configured to generate a first optical signal and a second optical signal;
a first remote radio head that is configured to receive the first optical signal;
a second remote radio head that is configured to receive the second optical signal;
wherein the first and second remote radio heads use the first and second optical signals to synchronize one or more signals processed in the first and second remote radio heads.

Embodiment 70: The system of embodiment 69 in which the first and second remote radio heads use the first and second optical signals to synchronize local oscillators and operate in combination to generate directional wireless beams.

Embodiment 71: The system of embodiment 69 wherein the first optical signal comprises a first sequence of optical pulses.

Embodiment 72: The system of embodiment 71 wherein the second optical signal comprises a second sequence of optical pulses.

Embodiment 73: The system of any of embodiments 69 to 72 wherein the optical power supply comprises an optical splitter to split an initial optical signal to generate the first and second optical signals.

Embodiment 74: The system of any of embodiments 69 to 73, comprising baseband processing circuitry configured to generate a baseband signal that is transmitted to the first remote radio head and the second remote radio head, wherein the first and second remote radio heads are configured to convert the baseband signal to radio frequency signals, and transmit the radio frequency signals to generate the directional wireless beams.

Embodiment 75: A system comprising:
a first remote radio head configured to receive a first optical signal from an optical power supply, wherein the first remote radio head comprises an optical receiver configured to extract synchronization information contained in the first optical signal, and wherein the first remote ratio head is configured to use the synchronization information to synchronize a first local oscillator and operate in combination with a second remote radio head to generate directional wireless beams.

Embodiment 76: The system of embodiment 75 wherein the first remote radio head is configured to convert a baseband signal to a first radio frequency signal, and
wherein the first remote radio head comprises an antenna configured to transmit the first radio frequency signal.

Embodiment 77: A method comprising:
providing a first optical signal from an optical power supply to a first remote radio head;
providing a second optical signal from the optical power supply to a second remote radio head;
at the first remote radio head, using the first optical signal to synchronize a first local oscillator;
at the second remote radio head, using the second optical signal to synchronize a second local oscillator; and
operating the first and second remote radio heads in combination to generate directional wireless beams.

Embodiment 78: The method of embodiment 77, comprising:
providing a baseband signal to the first remote radio head and the second remote radio head,
at the first remote radio head, converting the baseband signal to a first radio frequency signal, and transmitting the first radio frequency signal,
at the second remote radio head, converting the baseband signal to a second radio frequency signal, and transmitting the second radio frequency signal,
wherein the baseband signal includes information intended to be transmitted to a user device, and the first and second radio frequency signals are configured to constructively combine at the user device.

Embodiment 79: A method comprising:
at a first device, receiving time stamp signals from at least three network elements, in which the network elements are coordinated based on optical signals received from an optical power supply; and
determining a position of the first device based on the time stamp signals.

Embodiment 80: The method of embodiment 79 in which a first network element receives a first optical signal from the optical power supply, a second network element receives a second optical signal from the optical power supply, the first network element uses the first optical signal to synchronize a first local clock, the second network element uses the second optical signal to synchronize a second local clock, the first network element generates the first time stamp signal using the first local clock, and the second network element generates the second time stamp signal using the second local clock.

Embodiment 81: The method of embodiment 80 in which the first optical signal comprises a first sequence of optical pulses, and the second optical signal comprises a second sequence of optical pulses.

Embodiment 82: The method of any of embodiments 79 to 81 in which the first device determines the position of the first device based on the time stamp signals.

Embodiment 83: The method of any of embodiments 79 to 81 in which the first device sends first information about the timing at which the time stamp signals are received at the first device and second information included in the time stamp signals to a control device, and the control device determines the position of the first device based on the first information and the second information.

Embodiment 84: The method of embodiment 79, comprising:
 determining a reference time based on an optical signal from the optical power supply;
 determining a relative time delay between the reference time and each of the time stamp signals;
 wherein determining the position of the first device comprises determining the position of the first device based on the time stamp signals and information about the relative time delays between the reference time and the time stamp signals.

Embodiment 85: The method of embodiment 84 in which the first device determines the position of the first device based on the time stamp signals and information about the relative time delays between the reference time and the time stamp signals.

Embodiment 86: The method of embodiment 84 in which the first device sends first information about the timing at which the time stamp signals are received at the first device and second information included in the time stamp signals to a control device, and the control device determines the position of the first device based on the first information, the second information, and the information about the relative time delays between the reference time and the time stamp signals.

Embodiment 87: The method of any of embodiments 79 to 81 in which the network elements comprise remote radio heads that use the optical signals received from the optical power supply to synchronize local clocks.

Embodiment 88: The method of embodiment 87 in which the remote radio heads are configured to convert baseband signals to radio frequency signals using mixers that are associated with the respective local clocks, and the radio frequency signals include the time stamp signals.

Embodiment 89: The method of any of embodiments 79 to 88 in which the first device comprises at least one of a cellular phone, a laptop computer, a tablet computer, a camera, a smart watch, a smart headset, a smart goggle, smart eyeglasses, a radio, a positioning device, a map service device, a robot, a vehicle configured to move on land, a robot, a vehicle configured to move in air, a vehicle configured to move in or on water, a navigation device, or a driving direction guidance device.

Embodiment 90: The method of any of embodiments 79 to 89 wherein each of at least some of the time stamp signals comprises a time stamp and a network element identifier.

Embodiment 91: The method of any of embodiments 79 to 89, comprising:
 determining distances between the first device and each of the network elements based on the time stamp signals transmitted from the respective network elements; and
 determining the position of the first device based on the distances between the first device and each of the network elements.

Embodiment 92: The method of embodiment 91 in which determining distances between the first device and each of the network elements comprises:
 determining a first distance between the first device and a first network element based on a first time stamp signal transmitted from the first network element;
 determining a second distance between the first device and a second network element based on a second time stamp signal transmitted from the second network element; and
 determining a third distance between the first device and a third network element based on a third time stamp signal transmitted from the third network element;
 wherein determining the position of the first device comprises determining the position of the first device based on the first distance, the second distance, and the third distance.

Embodiment 93: The method of any of embodiments 79 to 89, comprising:
 determining time delays for the time stamp signals to travel from respective network elements to the first device based on the respective time stamp signals;
 determining distances between the first device and each of the network elements based on the time delays for the time stamp signals to travel from respective network elements to the first device; and
 determining the position of the first device based on the distances between the first device and each of the network elements.

Embodiment 94: The method of any of embodiments 79 to 89, comprising:
 determining relative time delays between receiving time stamps from pairs of network elements; and
 determining the position of the first device based on the relative time delays between receiving time stamps from the pairs of network elements.

Embodiment 95: The method of embodiment 94 in which determining relative time delays between receiving time stamps from pairs of network elements comprises:
 determining a first relative time delay between receiving a first time stamp from a first network element and receiving a second time stamp from a second network element; and
 determining a second relative time delay between receiving the first time stamp from the first network element and receiving a third time stamp from a third network element;
 wherein determining the position of the first device comprises determining the position of the first device based on the first relative time delay and the second relative time delay.

Embodiment 96: The method of embodiment 94 or 95, comprising:

solving formulas that describe hyperbolae based on the relative time delays between receiving time stamps from pairs of network elements; and determining coordinates of an intersection of the hyperbolae, in which the intersection of the hyperbolae represents the position of the first device.

Embodiment 97: A method comprising:

at a first device, receiving a first time stamp signal from a first remote radio head;

at the first device, receiving a second time stamp signal from a second remote radio head;

at the first device, receiving a third time stamp signal from a third remote radio head;

determining a first distance between the first device and the first remote radio head based on the first time stamp;

determining a second distance between the first device and the second remote radio head based on the second time stamp;

determining a third distance between the first device and the third remote radio head based on the third time stamp;

determining coordinates of the first device based on coordinates of the first remote radio head, coordinates of the second remote radio head, coordinates of the third remote radio head, the first distance, the second distance, and the third distance;

wherein at least one of:
(iii) the first time stamp, the second time stamp, and the third time stamp are time synchronized using optical signals provided by an optical power supply to the first remote radio head, the second remote radio head, and the third remote radio head, or
(iv) a synchronized time reference is established using optical signals provided by an optical power supply to the first remote radio head, the second remote radio head, and the third remote radio head.

Embodiment 98: The method of embodiment 97 in which the first device comprises a mobile device.

Embodiment 99: The method of embodiment 98 in which the mobile device comprises at least one of a cellular phone, a laptop computer, a tablet computer, a camera, a smart watch, a smart headset, smart eyeglasses, a radio, a positioning device, a robot, a vehicle configured to move on land, a vehicle configured to move in air, a vehicle configured to move in or on water, a navigation device, or a vehicle driving guidance device.

Embodiment 100: A method comprising:

at a first device, receiving a first time stamp signal from a first remote radio head;

at the first device, receiving a second time stamp signal from a second remote radio head;

at the first device, receiving a third time stamp signal from a third remote radio head;

determining a first distance between the first device and the first remote radio head based on the first time stamp, and a first delay of the first time stamp relative to a time reference;

determining a second distance between the first device and the second remote radio head based on the second time stamp, and a second delay of the second time stamp relative to the time reference;

determining a third distance between the first device and the third remote radio head based on the third time stamp, and a third delay of the third time stamp relative to the time reference;

determining coordinates of the first device based on coordinates of the first remote radio head, coordinates of the second remote radio head, coordinates of the third remote radio head, the first distance, the second distance, and the third distance;

wherein the first delay, the second delay, and the third delay are determined using optical signals provided by an optical power supply to the first remote radio head, the second remote radio head, and the third remote radio head.

Embodiment 101: The method of embodiment 100 in which the first device comprises a mobile device.

Embodiment 102: The method of embodiment 101 in which the mobile device comprises at least one of a cellular phone, a laptop computer, a tablet computer, a camera, a smart watch, a smart headset, smart eyeglasses, a radio, a positioning device, a robot, a vehicle configured to move on land, a vehicle configured to move in air, a vehicle configured to move in or on water, a navigation device, or a vehicle driving guidance device.

Embodiment 103: A method comprising:

at a first device, receiving a first time stamp signal from a first remote radio head;

at the first device, receiving a second time stamp signal from a second remote radio head;

at the first device, receiving a third time stamp signal from a third remote radio head;

determining a first time delay for the first time stamp signal to travel from the first remote radio head to the first device;

determining a second time delay for the second time stamp signal to travel from the second remote radio head to the first device;

determining a third time delay for the first time stamp signal to travel from the third remote radio head to the first device;

determining a first distance between the first device and the first remote radio head based on the first time delay;

determining a second distance between the first device and the second remote radio head based on the second time delay;

determining a third distance between the first device and the third remote radio head based on the third time delay;

determining coordinates of the first device based on coordinates of the first remote radio head, coordinates of the second remote radio head, coordinates of the third remote radio head, the first distance, the second distance, and the third distance;

wherein the first time stamp, the second time stamp, and the third time stamp are time synchronized using optical signals provided by an optical power supply to the first remote radio head, the second remote radio head, and the third remote radio head.

Embodiment 104: The method of embodiment 103 in which the first device comprises a mobile device.

Embodiment 105: The method of embodiment 104 in which the mobile device comprises at least one of a cellular phone, a laptop computer, a tablet computer, a camera, a smart watch, a smart headset, smart eyeglasses, a radio, a positioning device, a map service device, a robot, a vehicle configured to move on land, a robot, a vehicle configured to move in air, a vehicle configured to move in or on water, a navigation device, or a vehicle driving guidance device.

Embodiment 106: A method comprising:

at a first device, receiving a first time stamp signal from a first remote radio head;

at the first device, receiving a second time stamp signal from a second remote radio head;

at the first device, receiving a third time stamp signal from a third remote radio head;

determining a first time delay for the first time stamp signal to travel from the first remote radio head to the first device;

determining a second time delay for the second time stamp signal to travel from the second remote radio head to the first device;

determining a third time delay for the first time stamp signal to travel from the third remote radio head to the first device;

determining a first distance between the first device and the first remote radio head based on the first time delay, and a first time stamp delay of the first time stamp relative to a time reference;

determining a second distance between the mobile device and the second remote radio head based on the second time delay, and a second time stamp delay of the second time stamp relative to the time reference;

determining a third distance between the mobile device and the third remote radio head based on the third time delay, and a third time stamp delay of the third time stamp relative to the time reference;

determining coordinates of the mobile device based on coordinates of the first remote radio head, coordinates of the second remote radio head, coordinates of the third remote radio head, the first distance, the second distance, and the third distance;

wherein the first time stamp delay, the second time stamp delay, and the third time stamp delay are determined using optical signals provided by an optical power supply to the first remote radio head, the second remote radio head, and the third remote radio head.

Embodiment 107: A method comprising:

from at least three network elements, transmitting time stamp signals to a first device, in which the network elements are synchronized based on optical signals received from an optical power supply;

receiving from the first device timing information representing timing of when the first device received the time stamp signals;

determining coordinates of the first device based on the timing information representing timing of when the first device received the time stamp signals.

Embodiment 108: The method of embodiment 107, comprising:

at a first network element, receiving a first optical signal from the optical power supply, using the first optical signal to synchronize a first local clock, and generating the first time stamp signal using the first local clock; and at a second network element, receiving a second optical signal from the optical power supply, using the second optical signal to synchronize a second local clock, and generating the second time stamp signal using the second local clock.

Embodiment 109: The method of embodiment 108 in which the first optical signal comprises a first sequence of optical pulses, and the second optical signal comprises a second sequence of optical pulses.

Embodiment 110: The method of any of embodiments 107 to 109 in which the network elements comprise remote radio heads that use the optical signals received from the optical power supply to synchronize local clocks.

Embodiment 111: The method of embodiment 110 in which the remote radio heads are configured to convert baseband signals to radio frequency signals using mixers that are associated with the respective local clocks, and the radio frequency signals include the time stamp signals.

Embodiment 112: The method of any of embodiments 107 to 111 in which the first device comprises at least one of a cellular phone, a laptop computer, a tablet computer, a camera, a smart watch, a smart headset, a smart goggle, smart eyeglasses, a radio, a positioning device, a map service device, a robot, a vehicle configured to move on land, a robot, a vehicle configured to move in air, a vehicle configured to move in or on water, a navigation device, or a driving direction guidance device.

What is claimed is:

1. An apparatus comprising:
   baseband processing circuitry configured to generate a baseband signal that is transmitted to a first network element and a second network element;
   an optical power supply configured to generate a first optical signal and a second optical signal, transmit the first optical signal to the first network element, and transmit the second optical signal to the second network element, wherein the first optical signal and the second optical signal include information that enables synchronization of the first and second network elements;
   wherein the optical power supply comprises:
     a light source; and
     an electronic controller configured to control the light source to produce a sequence of optical frame templates and imprint control information onto light of at least some of the optical frame templates;
   wherein each of the optical frame templates comprises a respective frame header, and a respective frame body;
   wherein each frame body comprises a respective optical pulse train;
   wherein the sequence of optical frame templates has a first time duration;
   wherein each of the respective frame headers has a second time duration;
   wherein each of the respective frame bodies has a third time duration, a sum of the second and third time durations being smaller than or equal to the first time duration;
   wherein each of the respective optical pulse trains has a period of a fourth time duration that is smaller than a smaller one of the second and third time durations;
   wherein the third time duration is at least 10 times longer than the fourth time duration;
   wherein the second time duration is at most 10% of the third time duration; and
   wherein the first time duration is at least 10 times longer than the third time duration.

2. The apparatus of claim 1 wherein the first optical signal comprises optical pulses, and the second optical signal comprises optical pulses.

3. The apparatus of claim 1 wherein the first network element comprises a first remote radio head, the second network element comprises a second remote radio head, and the first and second optical signals include information that enables the first and second remote radio heads to synchronize.

4. The apparatus of claim 3 in which the first and second optical signals include information that enables the first and second remote radio heads to synchronize respective local oscillators.

5. The apparatus of claim 4 wherein the first and second remote radio heads are configured to:

use the first and second optical signals to synchronize the respective local oscillators,
convert the baseband signal to radio frequency signals using mixers that are associated with the respective local oscillators, and
transmit the radio frequency signals to generate directional wireless beams.

6. The apparatus of claim 1, wherein the frame bodies of said at least some of the optical frame templates are copies of one another.

7. The apparatus of claim 1, wherein none of the respective frame bodies of the sequence of optical frame templates carry payload data.

8. The apparatus of claim 1, wherein the respective optical pulse trains of at least two optical frame templates of the sequence are frame-synchronized.

9. The apparatus of claim 1, wherein the respective optical pulse trains of at least two optical frame templates are synchronized with one another.

10. The apparatus of claim 1, wherein the respective optical pulse train of at least one optical frame template extends into the respective frame header thereof.

11. The apparatus of claim 1,
wherein the light source and the electronic controller are configured to imprint the control information using digital changes of an optical-field parameter; and
wherein the optical-field parameter is selected from a parameter set consisting of: an intensity of light, a phase of light, a carrier frequency of light, and a polarization of light.

12. The apparatus of claim 1, wherein the control information comprises at least one of: a clock frequency, a clock phase, a synchronization time stamp, a frame delimiter, a frame counter, a node identifier, status information, a heartbeat signal, and a control command for a network element.

13. The apparatus of claim 1, wherein the light source comprises:
a first optical pulse source configured to emit light at a first optical carrier frequency;
a second optical pulse source configured to emit light at a second optical carrier frequency different from the first optical carrier frequency; and
an optical switch configured to select either the light emitted by the first optical pulse source or the light emitted by the second optical pulse source.

14. The apparatus of claim 1, further comprising an optical modulator configured to load different respective payload-data sequences into the respective frame bodies of different ones of the optical frame templates.

15. The apparatus of claim 1, wherein the first network element comprises a first server computer in a first data center, and the second network element comprises a second server computer in the first data center or a second data center.

16. The apparatus of claim 3, wherein the sequence of optical frame templates provides phase synchronization information to the first and second remote radio heads.

17. The apparatus of claim 3, wherein the sequence of optical frame templates provides frequency synchronization information to the first and second remote radio heads.

18. The apparatus of claim 3, comprising:
a first transponder configured to modulate the sequence of optical frame templates or a copy of the sequence of optical frame templates to generate a first modulated signal, and send the first modulated signal to the first remote radio head; and
a second transponder configured to modulate the sequence of optical frame templates or a copy of the sequence of optical frame templates to generate a second modulated signal, and send the second modulated signal to the second remote radio head.

19. A method comprising:
providing a first optical signal from an optical power supply to a first network element;
providing a second optical signal from the optical power supply to a second network element;
at the first network element, using the first optical signal to synchronize a first local oscillator; and
at the second network element, using the second optical signal to synchronize a second local oscillator;
operating the first and second remote radio heads in synchronization;
wherein each of the first optical signal and the second optical signal comprises a sequence of optical frame templates with control information imprinted onto light of at least some of the optical frame templates;
wherein each of the optical frame templates comprises a respective frame header, and a respective frame body;
wherein each frame body comprises a respective optical pulse train;
wherein the sequence of optical frame templates has a first time duration;
wherein each of the respective frame headers has a second time duration;
wherein each of the respective frame bodies has a third time duration, a sum of the second and third time durations being smaller than or equal to the first time duration;
wherein each of the respective optical pulse trains has a period of a fourth time duration that is smaller than a smaller one of the second and third time durations;
wherein the third time duration is at least 10 times longer than the fourth time duration;
wherein the second time duration is at most 10% of the third time duration; and
wherein the first time duration is at least 10 times longer than the third time duration.

20. The method of claim 19, wherein the first network element comprises a first remote radio head, and the second network element comprises a second remote radio head;
wherein operating the first and second remote radio heads in synchronization comprises operating the first and second remote radio heads in combination to generate directional wireless beams.

21. The method of claim 20, comprising:
providing a baseband signal to the first remote radio head and the second remote radio head;
at the first remote radio head, converting the baseband signal to a first radio frequency signal, and transmitting the first radio frequency signal;
at the second remote radio head, converting the baseband signal to a second radio frequency signal, and transmitting the second radio frequency signal;
wherein the baseband signal includes information intended to be transmitted to a user device, and the first and second radio frequency signals are configured to constructively combine at the user device.

* * * * *